(12) United States Patent
Durr et al.

(10) Patent No.: US 11,846,772 B2
(45) Date of Patent: Dec. 19, 2023

(54) OPTICAL DESIGN METHODS FOR IMAGING SYSTEMS AND OPTICAL SYSTEMS DESIGNED THEREWITH

(71) Applicant: VRIJE UNIVERSITEIT BRUSSEL, Brussels (BE)

(72) Inventors: Fabian Durr, Karlsruhe (DE); Hugo Thienpont, Gooik (BE)

(73) Assignee: VRIJE UNIVERSITEIT BRUSSEL, Brussels (BE)

(*) Notice: Subject to any disclaimer, the term of this patent is extended or adjusted under 35 U.S.C. 154(b) by 589 days.

(21) Appl. No.: 16/959,029

(22) PCT Filed: Dec. 28, 2018

(86) PCT No.: PCT/EP2018/097117
§ 371 (c)(1),
(2) Date: Jun. 29, 2020

(87) PCT Pub. No.: WO2019/129872
PCT Pub. Date: Jul. 4, 2019

(65) Prior Publication Data
US 2020/0355912 A1    Nov. 12, 2020

(30) Foreign Application Priority Data
Dec. 28, 2017  (EP) ..................... 17210835

(51) Int. Cl.
*G02B 27/00*     (2006.01)
*G06F 30/10*     (2020.01)
*G06F 111/10*    (2020.01)

(52) U.S. Cl.
CPC ..... *G02B 27/0012* (2013.01); *G02B 27/0025* (2013.01); *G06F 30/10* (2020.01); *G06F 2111/10* (2020.01)

(58) Field of Classification Search
CPC .......... G06T 15/06; G06T 17/05; G06T 7/90; G06T 7/00; G02B 27/0062;
(Continued)

(56) References Cited

U.S. PATENT DOCUMENTS 6,950,243 B2     9/2005  Wiese et al.
2014/0107984 A1* 4/2014  Yamaguchi ........ G02B 27/0012
                                                        703/1
(Continued)

FOREIGN PATENT DOCUMENTS

EP          3147697 A1    3/2017

OTHER PUBLICATIONS

Wassermann et al., "On the Theory of Aplanatic Aspheric Systems," Optical Group, Dec. 17, 1948, 8 Pages.
(Continued)

*Primary Examiner* — Travis S Fissel
(74) *Attorney, Agent, or Firm* — WORKMAN NYDEGGER

(57) ABSTRACT

Methods to design centered imaging systems by solving differential equations derived from Fermat's principle consist of a sequence of (moveable or fixed) spherical or aspherical surfaces, or combinations thereof. The power series solution approach allow calculating of a predefined number of surfaces parameters equal to a number of selected aberration terms to vanish nominally. The methods provide mapping functions coefficients that allow describing exactly where arbitrary rays intersect each individual surface.

21 Claims, 20 Drawing Sheets

(58) Field of Classification Search
CPC .............. G02B 27/0056; G02B 27/005; G02B 27/0025; G02B 27/0012; G06F 30/10; G06F 2111/10
USPC ..................................... 359/900; 703/1, 2, 6
See application file for complete search history.

(56) References Cited

U.S. PATENT DOCUMENTS

| | | | |
|---|---|---|---|
| 2015/0130806 A1* | 5/2015 | Yang .................. | G02B 27/0012 345/426 |
| 2017/0299856 A1* | 10/2017 | Sitter, Jr. ............... | G02B 17/08 |

OTHER PUBLICATIONS

Feder, "Automatic Optical Design," Applied Optics, vol. 2, No. 12, Dec. 31, 1963, pp. 1209-1226.
Barakat et al., "The Aberrations of Non-Rotationally Symmetric Systems and their Diffraction Effects," Optica Acta, vol. 13, No. 1, at least as early as Dec. 31 of 1966, pp. 1-30.
Korsch, "Closed Form Solution for Three-Mirror Telescopes, Corrected for Spherical Aberration, Coma, Astigmatism, and Field Curvature," Applied Optics, vol. 11, No. 12, Dec. 31, 1972, pp. 2986-2987.
Korsch, "Closed-Form Solutions for Imaging Systems, Corrected for Third-Order Aberrations," Journal of the Optical Society of America, vol. 63, No. 6, Jun. 30, 1973, pp. 667-672.
Schulz, "Primary Aberration-Free Imaging by Three Refracting Surfaces," Journal of the Optical Society of America, vol. 70, No. 9, Sep. 30, 1980, pp. 1149-1152.
Schulz, "Higher Order Aplanatism," Optics Communications, vol. 41, No. 5, May 1, 1982, pp. 315-319.
Schulz, "Aberration-Free Imaging of Large Fields with Thin Pencils," Optica Acta: International Journal of Optics, vol. 32, No. 11, Feb. 20, 1985, pp. 1361-1371.
Friedman et al., "Optimal Design of an Optical Lens," Institute for Mathematics and its Applications, University of Minnesota Minneapolis, Aug. 18, 1986, pp. 147-164.
Van-Brunt, "Mathematical Possibility of Certain Systems in Geometrical Optics," Journal of the Optical Society of America, vol. 11, No. 11, Nov. 30, 1994, pp. 2905-2914.
Yeh et al., "Two-Optical-Component Method for Designing Zoom System," Optical Engineering, vol. 34, No. 6, Jun. 30, 1995, pp. 1826-1834.
Park et al., "Zoom Lens Design Using Lens Modules," Optical Engineering, Society of Photo-Optical Instrumentation Engineers, vol. 35, No. 6, Jun. 30, 1996, pp. 1668-1676.
Hariharan, "Apochromatic Lens Combinations: A Novel Design Approach," Optics & Laser Technology, vol. 29, No. 4, Oct. 21, 1996, pp. 217-219.
Shannon, "The Art and Science of Optical Design," University of Arizona, Cambridge University Press, at least as early as Dec. 31, 1997, 313 Pages.
Mansuripur, "Parallel Processing: Abbe's Sine Condition," Optics & Photonics News, Feb. 28, 1998, pp. 56-60.
Hariharan, "Superachromatic Lens Combinations," Optics & Laser Technology, vol. 31, Feb. 3, 1999, pp. 115-118.
Zhao et al., "Criteria for Correction of Quadratic Field-Dependent Aberrations," Journal of the Optical Society of America, vol. 19, No. 11, Nov. 30, 2002, pp. 2313-2321.
Rakich, "Four-Mirror Anastigmats, Part 1: A Complete Solution Set for All-Spherical Telescopic Systems," Optical Engineering, vol. 46, No. 10, Oct. 31, 2007, pp. 103001-1-103001-12.
Minano et al., "An Application of the SMS Method for Imaging Designs," Optical Society of America, Optics Express, vol. 17, No. 26, Dec. 21, 2009, pp. 24036-24044.
De Albuquerque et al., "Method of Glass Selection for Color Correction in Optical System Design," Optics Express, vol. 20, No. 13, Jun. 18, 2012, pp. 13592-13611.
Hristov, "Exact Analytical Theory of Aberrations of Centered Optical Systems," Optical Review, vol. 20, No. 5, May 27, 2013, pp. 395-419.
Kryszczynski et al., "Structural Optical Design of the Complex Multi-Group Zoom Systems by Means of Matrix Optics," Optics Express, vol. 21, No. 17, Aug. 26, 2013, pp. 19634-19647.
Park et al., "Paraxial Design Method Based on an Analytics Calculation and its Application to a Three-Group Inner-Focus Zoom System," Journal of the Korean Physical Society, vol. 64, No. 11, Jun. 30, 2014, pp. 1671-1676.
Benitez et al., "Conditions for Perfect Focusing Multiple Point Sources with the SMS Design Method," The International Society for Optical Engineering, vol. 9191, No. 919102, Aug. 20, 2014, 9 Pages.
Valencia-Estrada et al., "Singlet Lenses Free of All Orders of Spherical Aberration," Proceedings of the Royal Society A, vol. 471, No. 2175, Dec. 22, 2014, pp. 1-23.
International Search Report and Written Opinion from corresponding PCT Application No. PCT/EP2018/097117, dated Apr. 26, 2019.
Extended European Search Report from corresponding EP Application 17210835.9, dated May 31, 2018.

* cited by examiner

| $\varepsilon_{x,1}$ | a | b | c | d | e | f | g | h |
|---|---|---|---|---|---|---|---|---|
| 1 | | $\partial x$ | | $\partial x^3$ | | $\partial x^5$ | | $\partial x^7$ |
| 2 | $\partial t$ | | $\partial x^2 \partial t$ | | $\partial x^4 \partial t$ | | $\partial x^6 \partial t$ | |
| 3 | | $\partial x \partial t^2$ | | $\partial x^3 \partial t^2$ | | $\partial x^5 \partial t^2$ | | ... |
| 4 | $\partial t^3$ | | $\partial x^2 \partial t^3$ | | $\partial x^4 \partial t^3$ | | ... | |
| 5 | | $\partial x \partial t^4$ | | $\partial x^3 \partial t^4$ | | ... | | |
| 6 | $\partial t^5$ | | $\partial x^2 \partial t^5$ | | ... | | | |
| 7 | | $\partial x \partial t^6$ | | ... | | | | |
| 8 | $\partial t^7$ | | ... | | | | | |

Fig. 3

| $\varepsilon_{x,2}$ | a | b | c | d | e | f | g | h |
|---|---|---|---|---|---|---|---|---|
| 1 | | $\partial y$ | | $\partial y^3$ | | $\partial y^5$ | | $\partial y^7$ |
| 2 | $\partial t$ | | $\partial y^2 \partial t$ | | $\partial y^4 \partial t$ | | $\partial y^6 \partial t$ | |
| 3 | | $\partial y \partial t^2$ | | $\partial y^3 \partial t^2$ | | $\partial y^5 \partial t^2$ | | ... |
| 4 | $\partial t^3$ | | $\partial y^2 \partial t^3$ | | $\partial y^4 \partial t^3$ | | ... | |
| 5 | | $\partial y \partial t^4$ | | $\partial y^3 \partial t^4$ | | ... | | |
| 6 | $\partial t^5$ | | $\partial y^2 \partial t^5$ | | ... | | | |
| 7 | | $\partial y \partial t^6$ | | ... | | | | |
| 8 | $\partial t^7$ | | ... | | | | | |

Fig. 4

| $\varepsilon_{y,2}$ | a | b | c | d | e | f | g | h |
|---|---|---|---|---|---|---|---|---|
| 1 | | $\partial y$ | | $\partial y^3$ | | $\partial y^5$ | | $\partial y^7$ |
| 2 | $\partial t$ | | $\partial y^2\partial t$ | | $\partial y^4\partial t$ | | $\partial y^6\partial t$ | |
| 3 | | $\partial y\partial t^2$ | | $\partial y^3\partial t^2$ | | $\partial y^5\partial t^2$ | | ... |
| 4 | $\partial t^3$ | | $\partial y^2\partial t^3$ | | $\partial y^4\partial t^3$ | | ... | |
| 5 | | $\partial y\partial t^4$ | | $\partial y^3\partial t^4$ | | ... | | |
| 6 | $\partial t^5$ | | $\partial y^2\partial t^5$ | | ... | | | |
| 7 | | $\partial y\partial t^6$ | | ... | | | | |
| 8 | $\partial t^7$ | | ... | | | | | |

Fig. 5

| $\varepsilon_{x,3}$ | a | b | c | d | e | f | g | h |
|---|---|---|---|---|---|---|---|---|
| 1 | | $\partial q_3$ | | $\partial q_3^3$ | | $\partial q_3^5$ | | $\partial q_3^7$ |
| 2 | $\partial t$ | | $\partial q_3^2\partial t$ | | $\partial q_3^4\partial t$ | | $\partial q_3^6\partial t$ | |
| 3 | | $\partial q_3\partial t^2$ | | $\partial q_3^3\partial t^2$ | | $\partial q_3^5\partial t^2$ | | $\partial q_3^7\partial t^2$ |
| 4 | $\partial t^3$ | | $\partial q_3^2\partial t^3$ | | $\partial q_3^4\partial t^3$ | | $\partial q_3^6\partial t^3$ | |
| 5 | | $\partial q_3\partial t^4$ | | $\partial q_3^3\partial t^4$ | | $\partial q_3^5\partial t^4$ | | ... |
| 6 | $\partial t^5$ | | $\partial q_3^2\partial t^5$ | | $\partial q_3^4\partial t^5$ | | ... | |
| 7 | | $\partial q_3\partial t^6$ | | $\partial q_3^3\partial t^6$ | | ... | | |
| 8 | $\partial t^7$ | | $\partial q_3^2\partial t^7$ | | ... | | | |

Fig. 6

| $\varepsilon_{y,3}$ | a | b | c | d | e | f | g | h |
|---|---|---|---|---|---|---|---|---|
| 1 | | $\partial q_3$ | | $\partial q_3^3$ | | $\partial q_3^5$ | | $\partial q_3^7$ |
| 2 | $\partial t$ | | $\partial q_3^2 \partial t$ | | $\partial q_3^4 \partial t$ | | $\partial q_3^6 \partial t$ | |
| 3 | | $\partial q_3 \partial t^2$ | | $\partial q_3^3 \partial t^2$ | | $\partial q_3^5 \partial t^2$ | | $\partial q_3^7 \partial t^2$ |
| 4 | $\partial t^3$ | | $\partial q_3^2 \partial t^3$ | | $\partial q_3^4 \partial t^3$ | | $\partial q_3^6 \partial t^3$ | |
| 5 | | $\partial q_3 \partial t^4$ | | $\partial q_3^3 \partial t^4$ | | $\partial q_3^5 \partial t^4$ | | $\partial q_3^7 \partial t^4$ |
| 6 | $\partial t^5$ | | $\partial q_3^2 \partial t^5$ | | $\partial q_3^4 \partial t^5$ | | $\partial q_3^6 \partial t^5$ | |
| 7 | | $\partial q_3 \partial t^6$ | | $\partial q_3^3 \partial t^6$ | | $\partial q_3^5 \partial t^6$ | | ... |
| 8 | $\partial t^7$ | | $\partial q_3^2 \partial t^7$ | | $\partial q_3^4 \partial t^7$ | | ... | |

Fig. 7

| $\varepsilon_{x,y,2}$ | a | b | c | d | e | f | g | h |
|---|---|---|---|---|---|---|---|---|
| 1 | | $\partial y$ | | $\partial y^3$ | | $\partial y^5$ | | $\partial y^7$ |
| 2 | $\partial t$ | | $\partial y^2 \partial t$ | | $\partial y^4 \partial t$ | | $\partial y^6 \partial t$ | |
| 3 | | $\partial y \partial t^2$ | | $\partial y^3 \partial t^2$ | | $\partial y^5 \partial t^2$ | | ... |
| 4 | $\partial t^3$ | | $\partial y^2 \partial t^3$ | | $\partial y^4 \partial t^3$ | | ... | |
| 5 | | $\partial y \partial t^4$ | | $\partial y^3 \partial t^4$ | | ... | | |
| 6 | $\partial t^5$ | | $\partial y^2 \partial t^5$ | | ... | | | |
| 7 | | $\partial y \partial t^6$ | | ... | | | | |
| 8 | $\partial t^7$ | | ... | | | | | |

OPTICAL DESIGN METHODS FOR IMAGING SYSTEMS AND OPTICAL SYSTEMS DESIGNED THEREWITH

FIELD OF THE INVENTION

The present invention is generally related to the field of methods of optical design of imaging systems, and enables both correcting and/or calculating optical aberration coefficients, furthermore including calculating ray mapping coefficients that provide ray trace related information and software for carrying out the methods. The methods are suitable for determining spherical, aspherical or freeform surfaces.

BACKGROUND

Today's optical design largely relies on software implementation of efficient ray tracing and optimization algorithms. The different parameters of the optical system (e.g. radii and positions of the lenses) are varied to optimize a defined merit function that measures the image quality for a given field of view, (D. P. Feder, "Automatic optical design," Appl. Opt. 2, 1209-1226 (1963)). These merit functions are typically "wild" with many local minima, and there is no guarantee that local or global optimization algorithms will find an excellent solution. Thus, a successful and often used optimization-based optical design strategy is to choose a well-known optical system as a starting point (e.g. from patents or publications) and achieve incremental improvements. This approach to optical design requires considerable experience, guesswork and intuition, which is therefore sometimes referred to as "art and science" (Shannon, Robert R. "The art and science of optical design," Cambridge University Press (1997)).

To ease or overcome this laborious and often hardly reproducible procedure of optimization-based optical design, various optical design approaches have been developed and proposed that target a deterministic calculation of surfaces or surface coefficients to find excellent starting points for a fast and final optimization. One known method (and a related analytic method), the simultaneous multiple surfaces (SMS) design method, is based on the constant optical path length condition for a discrete set of on- and off-axis fields that are then perfectly imaged onto the image plane through a number of surface profiles. (J. C. Minano, P. Benitez, W. Lin, J. Infante, F. Muñoz, and A. Santamaria, "An application of the SMS method for imaging designs," Opt. Express 17, 24036-24044 (2009)). The number of imaged fields is typically equal to the number of surfaces, but can be also higher under special circumstances, (P. Benitez, J. C. Minano, M. Nikolic, J. Liu, J. Infante, F. Duerr, "Conditions for perfect focusing multiple point sources with the SMS design method" Proc. SPIE 9191, 919102 (2014)). These methods are limited by the number of surfaces (currently up to six) that can be calculated, and do not provide an easy scalability to go to a larger number or surfaces. (P. Benitez, J. C. Minano, M. Nikolic, J. Liu, J. Infante, F. Duerr, "Conditions for perfect focusing multiple point sources with the SMS design method" Proc. SPIE 9191, 919102 (2014)). A related approach has been used for laser beam shaping systems, but is not applicable to imaging systems design (F. Duerr, H. Thienpont, "Optical Zoom System", EP 3 147 697 A1). Furthermore, these direct design methods do not use commonly used imaging optics concepts and language such as the focal length or aberrations.

More common and well known from literature, aberration theory can be used to describe and quantify the deviation of light in an imaging system from ideal focusing. In a modern representation, the ray aberrations $\epsilon^{(i)}$ describe the deviated intersection with the image plane $h = h_0 + \epsilon^{(1)} + \epsilon^{(3)} + \epsilon^{(5)} + \ldots$ as a series expansion in the object and pupil variables of the system. Several concepts and methods do exist that allow canceling a certain number of aberration coefficients. The underlying idea is always the same, to calculate an initial design that is free of certain aberrations, and then rely on standard optimization techniques to balance all aberrations and yield best overall imaging performance. This design strategy is widely used and very successful, but has been limited to few distinct low-order aberration terms so far.

Gaussian or ABCD matrix optics allow canceling only first order aberrations (Shannon, R. R. "The art and science of optical design," Cambridge University Press (1997)). It is also known how spherical aberration can be cancelled for all orders, (J. C. Valencia-Estrada, R. B. Flores-Hernndez, D. Malacara-Hernndez, "Singlet lenses free of all orders of spherical aberration," Proc. R. Soc. A 471, 20140608 (2015)). Published in 1879, Abbe's sine condition can be used to cancel all orders of coma, the aberrations with a linear dependency on the object variable, (M. Mansuripur, "Abbe's Sine Condition," Optics & Photonics News 9(2), 56-60 (1998)). By cancelling both spherical aberration and coma, it is possible to design a so-called aplanatic system, (Wassermann, G. D., and E. Wolf "On the theory of aplanatic aspheric systems." Proceedings of the Physical Society. Section B 62.1 (1949)). Seidel's formulas can be used to calculate third-order aberrations through the optical paths difference of an oblique pencil and the principle ray for one surface (Shannon, R. R. "The art and science of optical design," Cambridge University Press (1997)). Seidel's formulas have been used or reformulated in order to derive few closed-form solutions for all-spherical two, three or four element systems, corrected for (part of) third-order aberrations, (D. Korsch, "Closed Form Solution for Three-Mirror Telescopes, Corrected for Spherical Aberration, Coma, Astigmatism, and Field Curvature," Appl. Opt. 11, 2986-2987 (1972), D. Korsch, "Closed-form solutions for imaging systems, corrected for third-order aberrations," J. Opt. Soc. Am. 63, 667-672 (1973), Rakich A, "Four-mirror anastigmats, part 1: a complete solution set for all-spherical telescopic systems," Opt. Eng. 46(10), 103001 (2007)). G. Schulz has shown how to design three refracting surfaces (two aspherical and one spherical surface) free from all five monochromatic Seidel aberrations, (G. Schulz, "Primary aberration-free imaging by three refracting surfaces," J. Opt. Soc. Am. 70, 1149-1152 (1980)). The same author has also developed a point wise successive construction method that allows designing second order aplanatic systems consisting of four lenses, (G Schulz, "Higher order aplanatism," Optics Communications 41, 315-319 (1982), Schulz, G. "Aberration-free imaging of large fields with thin pencils." Journal of Modern Optics 32, 1361-1371 (1985)). Importantly, the obtained points then still have to be fitted in order to retrieve a closed-form aspherical surface description. Criteria for correction of quadratic field-dependent aberrations have been derived, based on tracing a thin bundle of rays, (Zhao C., and Burge J. H. "Criteria for correction of quadratic field-dependent aberrations." JOSA A 19, 2313-2321 (2002)). Hristov's "Theory of Aberrations of Centered Optical Systems" is based on conformal and matrix transformations in the sagittal and tangential planes and paraxial transformations in the optical axis region for a set of aperture rays in order to cancel Seidel's aberrations, (Hristov, B. A. Optical Review 20, 395-419 (2013)).

In case of zoom systems, several Gaussian/matrix optics based design methods do exist, e.g. Yeh M, Shiue S, Lu M, "Two-optical-component method for designing zoom system," Opt. Eng. 34, 1826-1834 (1995), Park, S C. & Lee, "Paraxial design method based on an analytic calculation and its application to a three-group inner-focus zoom system," Journal of the Korean Physical Society 64, 1671-1676 (2014),] T. Kryszczyński and J. Mikucki, "Structural optical design of the complex multi-group zoom systems by means of matrix optics," Opt. Express 21, 19634-19647 (2013). Gaussian optics and Seidel's formulas have been used in order to design a zoom lens by applying these formulas to each individual lens module, (Park S, Shannon R. R, "Zoom lens design using lens modules," Opt. Eng. 35, 1668-1676 (1996)). If more than one wavelength is considered, formulas do exist to correct primary (linear dependencies on wavelength, field and aperture) longitudinal and transverse chromatic aberrations (Shannon, R. R. "The art and science of optical design," Cambridge University Press (1997)). However, most of the work with respect to chromatic aberrations deals with methods of how to select properly lens materials combinations, e.g. P. Hariharan, "Apochromatic lens combinations: a novel design approach," Optics & Laser Technology 29, 217-219 (1997), B. F. Carneiro de Albuquerque, J. Sasian, F. Luis de Sousa, and A. Silva Montes, "Method of glass selection for color correction in optical system design," Opt. Express 20, 13592-13611 (2012), GE Wiese, F Dumont, "Refractive multispectral objective lens system and methods of selecting optical materials therefor," U.S. Pat. No. 6,950,243 (2005), P Hariharan, "Superachromatic lens combinations," Optics & Laser Technology 31, 115-118 (1999).

Despite the vast number of proposed design methods, there does not exist any design method that allows canceling a number of aberration terms that is equal to the number of calculated surfaces coefficients for an arbitrary system. So far, the number of surfaces is one limiting factor, and existing methods only tap their full potential for systems consisting of up to six all-spherical surfaces, and systems with up to three aspherical surfaces. Some methods (e.g. ABCD or Seidel's formulas) work for any number of surfaces, but only allow controlling a fixed amount of low-order aberrations that does not scale with the increasing number of surfaces. Furthermore, all the existing design methods have in common, that they do not provide the information where the rays intersect each individual surface without performing additional ray tracing for the entire optical system. This information is very important for three main reasons. First, it provides directly the clear apertures of all optical surfaces. Second, together with the surfaces expressions, it allows to verify immediately that no total internal reflection occurs throughout an entire lens system. Third, and related to the second argument, it allows furthermore evaluating the angle of incidence, which is an important factor when it comes to tolerances of optical systems. The presented invention does not only provide these ray intersections for all surfaces, but it also scales the number of cancelled aberrations with the number of used optical surfaces, making it the first holistic, deterministic and fully scalable approach towards imaging design.

SUMMARY OF THE INVENTION

According to an aspect of embodiments of the present invention, there is provided a computer based method for designing an imaging system having optical surfaces, the method being for nominally cancelling at least one ray aberration, the method comprising:
Inputting to a computer a first system specifications comprising:
imaging system parameters,
wavelength dependency of materials,
types and number of surface coefficients of the optical surfaces,
pupil characteristics (stop position),
object and image spaces characteristics,
translating using the computer the first set of system specifications to a set of differential equations by applying Fermat's principle,
translating using the computer the differential equations to algebraic equations by using the power series method up to a given combined order, to seek power series solutions to the derived differential equations
inputting at least one ray aberration coefficient to be zero; for each ray aberration coefficient set to zero, select one surface coefficient to be unknown, whereas said pair(s) of ray aberration and surface coefficient must appear simultaneously in at least one of the algebraic equations
inputting to a computer values for all surface coefficients that have not been applied to cancel aberrations in the previous step
solving the algebraic equations to calculate at least one surface coefficient for the optical surfaces, all mapping function (which define the ray trace and their intersection with the optical surfaces and therefore each clear aperture therefrom) and aberration coefficients up to the given combined order.

The dependent claims each define further embodiments of the present invention.

The present invention provides methods to design imaging systems, including optical zoom systems, both for mono- and polychromatic light, and/or to design a free form or rotationally symmetric imaging system. These imaging systems can consist of a number of spherical and/or aspherical and/or freeform lenses or mirrors, or combinations thereof, whereby these optical elements are either centered along one common axis (co-axial alignment) or rotated with respect to each other without a common optical axis. The design methods then allow to nominally canceling at least one or up to a maximum number of ray aberration terms of the power series expansion for a given number of unknown optical surfaces coefficients. The number of surfaces coefficients that are calculated is always equal to the number of nominally cancelled aberration terms. Furthermore, any non-cancelled aberration coefficients can be calculated up to a given order as well.

The methods of embodiments of the present invention provide directly to the user an optical design which is nominally free of a group of aberrations and which can fulfill the requirements to be obtained. Thus, the method provides directly the best or one of the best solutions which can be obtained for the system specifications which have been inputted in the computer program. This results in an important gain of time for the optical designer but also ensures the user that the optimal solution has been found. Furthermore, it allows a structured investigation of a given system layout by varying the aberrations to be cancelled and evaluate the obtained imaging performance for the given specifications. Advantageously, this allows an optical designer to streamline a common design process: to calculate and evaluate initial designs that are free of certain aberrations, and then rely on standard optimization techniques to balance all aberrations to yield best overall imaging performance.

In another aspect of the present invention, the step of inputting to the computer system specifications being imaging system parameters comprises inputting a sequence of $N_s$ optical surfaces, wherein each optical surface has an optical surface profile $f_i$, and wherein the sequence of the $N_s$ optical surfaces defines an optical axis of the imaging system.

In another aspect of the present invention, the step of inputting to the computer system specifications being the surface coefficients of the optical surfaces comprises defining each optical surface to be spherical or aspherical; and wherein each optical surface is expressed as a function of a single radial variable r.

In another aspect of the present invention, the step of inputting to the computer system specifications being the pupil characteristics comprises inputting a position for a pupil plane along the optical axis.

In another aspect of the present invention, the step of inputting to the computer system specifications being the object and image spaces comprises selecting a first image point in an image plane along the optical axis.

In another aspect of the present invention, the step of inputting to the computer system specifications being the pupil characteristics comprises inputting a position for an aperture stop along the optical axis, wherein the aperture stop is the entrance pupil, an aperture stop between two optical surfaces, or the exit pupil.

If the aperture stop coincides with one of the optical surfaces, replacing the ray mapping function coordinates of said optical surface by the pupil coordinates. If the aperture stop is between two optical surfaces, expressing that the cross product of the direction vector from the preceding optical surface towards the aperture stop, and the direction vector from the aperture stop towards the succeeding optical surface is zero, thereby adding three additional equations to the original differential equations. If the aperture stop coincides with the exit pupil; expressing that the cross product of the direction vector from the last surface to the aperture stop and the direction vector from the stop to the image plane coincide, thus, the cross product of the two vectors is zero and three additional equations are added to the original differential equations. If the aperture stop coincides with the entrance pupil, the direction vector from the object to the stop and the direction vector from the stop to the first surface coincide, thus the cross product of the two vectors is zero and three additional equations are added to the original differential equations.

In case of static systems (fixed focal length), the user can thus further define at least one design wavelength (the polychromatic case is discussed later), the number and type of surfaces (and number of coefficients per surface). An object at finite or infinite distance, the object and image spaces, which includes an object to image relationship (effective focal length or magnification or any other functional relationship) and the place of the pupil (a surface or an individual aperture stop).

In another aspect of the present invention, the step of inputting to the computer system specifications being the pupil characteristics further comprises selecting $m_p$ fixed pupil plane cross sections p of the pupil plane, wherein $m_p \geq 1$. Each pupil plane cross section is defined by an angle $$\theta_p = \frac{\pi}{p}$$

for p=1 ... $m_p$ (the order corresponds to tangential, sagittal, and further skew ray planes). Alternative sequences are possible.

Each pupil plane cross section is further defined by a single pupil radial variable $q_p$, which expresses where a ray coming from the object space and passing through the pupil plane coordinates at $(x_p, y_p, 0) = (q_p \cos(\theta_p), q_p \sin(\theta_p), 0)$ intersects the image plane.

In another aspect of the present invention, the step of inputting to the computer system specifications being the object and image spaces comprises selecting an object point at infinite distance or finite distance.

The step of selecting an object point at finite distance further comprises the step of selecting an object point in an object plane along the optical axis.

In another aspect of the present invention, the step of translating using the computer the first set of system specifications to a set of differential equations further comprises the step of expressing the optical surfaces as functions of ray mapping functions. These functions describe where a ray coming from the object point or under a field angle and going through the fixed pupil plane cross section p intersects each optical surface for said pupil plane cross section.

The ray mapping functions can further be expressed as $(u_{i,p}(q_p, t), v_{i,p}(q_p, t))$ wherein variable t defines the object and the fixed pupil plane cross section $\theta_p$ has pupil coordinates $(q_p, \theta_p)$, such that the optical surfaces $f_i$ for said pupil plane cross section are expressed as a function of the ray mapping functions $f_i((u_{i,p}(q_p, t), v_{i,p}(q_p, t)))$.

In another aspect of the present invention, the step of inputting to the computer system specifications being the imaging system parameters comprises selecting a sequence of $N_s+1$ materials having each a refractive index distribution $n_{N_s}(\lambda)$ for a at least one design wavelength $\lambda_0$. The sequence of the object plane, the $N_s$ optical surfaces and the image plane defining a sequence of $N_s+1$ sections having optical path lengths $d_i$.

In a further aspect of the invention, the step of translating using the computer the first set of system specifications to differential equations further comprises the step of applying Fermat's principle to each pair of two consecutive optical path length sections by mathematically expressing that the optical path length between two fixed points is an extremum along a light ray. Optionally Fermat's principle can be applied to each pair of two consecutive sections as a function of the ray mapping functions to derive two sets of differential equations.

It is an advantage that through the introduction of surfaces and mapping functions for an arbitrary but fixed pupil plane cross section, the paths of arbitrary rays through this pupil plane cross section can be described. By applying Fermat's principle, two sets of differential equations are derived. These two sets of differential equations, this is new, can be identified as the x- and y-components of the associated ray aberration series. The way Fermat's principle is applied is always the same throughout all embodiments. The arbitrary ray path from object to image is expressed as optical path length sections and Fermat's principle is applied pairwise, leading to N+1 sections for N optical surfaces. Very importantly, the translation from the above-defined system description to differential equations follows basic rules, (A. Friedman and B. McLeod, "Optimal design of an optical lens," Archive for Rational Mechanics and Analysis 99, 147-164 (1987), B. Van-Brunt, "Mathematical possibility of certain systems in geometrical optics," JOSA A 11, 2905-2914 (1994)). This means, consequently, there is no intrinsic limitation on the number of optical surfaces that can be treated with these methods. They can be readily scaled to systems with many more than just six optical surfaces for all embodiments of the present invention. We suppose the number of optical surfaces can be limited to 30 or optionally up to 50, as optical systems with more than 30 surfaces are unlikely to occur, or would only occur in very special applications such as optionally up to 50.

In another aspect of the present invention, the step of inputting to the computer system specifications being the object and image spaces comprises the step of expressing a second image point for each fixed pupil plane cross sections to be the sum of the first image point incremented by optical aberrations. The optical aberrations can be expressed as a ray aberration series of ray aberration coefficients for each pupil plane cross section.

It is an advantage of the present invention that the common approach to optical aberrations provides a very important indication. Whether it is wave or ray aberrations, these functions are commonly expressed in terms of power series expansions in the considered variables. This hint leads to the idea to use the power series method to seek power series solutions in said variables to the derived differential equations. In general, this solution approach substitutes the power series representations of all involved functions into the differential equations to find a recurrence relation for the unknown coefficients. This means, the optical surfaces, mapping functions and real image function (ideal object to image function plus the ray aberration terms) are expressed as power series expansions. A closed-form recurrence relation for infinite orders cannot be typically derived; however, it is possible to solve the resulting algebraic equations for the unknown coefficients with this solution approach for a finite order of all involved functions. A key element in doing so is by working in a defined sequence of pupil plane cross sections (see matrix representation or visualizations in FIGS. 3 to 9) and by following the given order of pupil plane cross sections and ray aberrations for the identified x- and y-components in said pupil plane cross sections.

In case all surfaces coefficients for a system consisting of N surfaces are well defined and known, the proposed finite power series method enables the calculation of all unknown mapping functions and ray aberration coefficients for the defined sequence of pupil planes cross sections and in ascending order. Due to an unambiguous correlation between the here used ray aberrations for said pupil plane cross sections and the well-known ray or wave aberrations from literature, it is easily possible to convert between these different representations.

In another embodiment of this method, a number of available and not yet known surfaces coefficients are used to select an equal number of aberration coefficients in one or more pupil plane cross section(s) to cancel nominally. Optionally this can be done by following the Selection-Consistency-Distribution (SCD) rules in certain embodiments of the present invention. The selected and nominally cancelled aberration coefficients define which orders and for which pupil plane cross sections the finite power series method is applied to calculate all mapping functions, the unknown surfaces coefficients and non-cancelled aberration coefficients.

In case of (all)-spherical systems, this approach leads to a nonlinear system of equations of all unknown coefficients that can be solved using standard methods such as the Newton-Raphson algorithm or others. For remaining higher order calculations, due to additional aspherical coefficients but also in case of all-aspherical systems, the finite power series method leads to a linear system of equations of the unknown coefficients per ascending aberration order in the considered pupil plane cross sections that can be solved using standard solvers such as the Gaussian elimination algorithm. In case of all-aspherical systems, only the first aberration order calculations lead to a nonlinear system of equations that can be solved as explained for all-spherical systems. These relationships between spherical/aspherical surfaces and the (non-) linearity of derived system of equations hold for all embodiments of the invention, including freeform optical surfaces.

In another aspect of the present invention, the step of inputting to the computer system specifications the surface coefficients of the rotationally symmetric optical surfaces comprises expanding each optical surface profile as a series expansion with surface coefficients $f_{i,2j}$ for the $i^{th}$ surface and of $2j^{th}$ order.

In another aspect of the present invention, the step of inputting to the computer system specifications being the surface coefficients of freeform optical surfaces comprises expanding each optical surface as a series expansion with surface coefficients $f_{i,j,k}$ for the $i^{th}$ surface and of $j^{th}$ order in x, and $k^{th}$ order in y. This monomial expansion can be furthermore translated to alternative freeform surface representations, such as Zernike, Chebyshev, Forbes, or alike.

Furthermore, the step of translating using the computer the first set of system specifications to differential equations comprises expanding the ray mapping functions in a series expansion of ray mapping function coefficients. Optionally, in some embodiments the system specifications are translated to two sets of $N_s$ differential equations.

In a preferred embodiment of the present invention, the step of solving the differential equations further comprises the step of employing a power series method to find solutions to the differential equations to calculate the series coefficients of the mapping functions and the optical surfaces as a function of the cancelled optical ray aberrations.

Optionally, in some embodiments the step of applying partial derivatives of order k, l to the two sets of $N_s$ differential equations, said orders k, l being provided by using pre-defined aberration matrices for each pupil plane cross section, wherein each pre-defined aberration matrix associates each optical ray aberration of the subgroup to a partial derivative of order k, l of the ray aberration series expansion in said pupil plane cross section, to derive a system of equations for the optical surfaces coefficients and the ray mapping functions coefficients.

Preferably, the step of solving the differential equations further comprises the step of deriving from the calculated coefficients of the optical surfaces the surface profiles or shapes of each optical surface.

Advantageously, the step of solving the differential equations further comprises the step of deriving from the calculated series coefficients of the mapping functions the clear aperture of each optical element.

Furthermore, the step of inputting to a computer system specifications, comprising surface coefficients of the optical surfaces further comprises selecting each surface to be spherical or aspherical. Furthermore the method includes the step of expressing each surface as a function of a single radial variable $r=\sqrt{x^2+y^2}$ and of expanding each surface as a series such as a Taylor polynomial having Taylor coefficients $f_{i,2j}$ for j=1, 2 ... up to 10 or optionally up to 30 and i=1, 2, ... 30 or optionally up to 50.

The methods are based on sets of (non-)linear equations and solution schemes that define how the optical surfaces coefficients that are used to cancel aberration terms can be calculated as power series coefficients such as Taylor power series coefficients up to an arbitrary order (typically not exceeding $20^{th}$ order but optionally in some embodiments up to $30^{th}$ order). We suppose the number of surfaces does not exceed 30 or optionally in some embodiments up to 50, as discussed above.

In another aspect, the step of selecting a first image point further comprises the step of expressing the first image point with a function, which prescribes the object to image relationship. The step of expressing the second image further can comprise the step of expressing the second image in the chosen pupil plane cross section as the sum of the first image plus optical ray aberrations in x- and y-direction, wherein the optical ray aberrations are related to known ray aberrations expansions and wave aberrations expansions.

In another aspect of the present invention, the method further comprises the step of selecting at least two different materials for at least two design wavelengths.

In another aspect, the method further comprises the step selecting at least two different materials for one design wavelength to cancel nominally at least one chromatic aberration coefficient.

In another aspect of the present invention, the method further comprises the step of repeating said methods for at least a second design wavelength, e.g. to cancel monochromatic aberrations at more than one wavelength.

In a further aspect of the present invention, the method comprising the step of inputting to the computer system specifications the imaging system parameters further comprises the step of expressing each optical path length $d_i$ as a function of the wavelength by means of the refractive index distribution $n_{N_s}(\lambda)$ of each material for the at least one design wavelength $\lambda_0$.

In case of polychromatic designs, there are three options available for both static and zoom systems alike, while at least two different materials are used (e.g., Flint and Crown glass). First, the above-mentioned monochromatic methods are directly used without any modifications, whereas the polychromatic performance is solely controlled through a suitable choice of lens materials. Second, at least two design wavelengths are defined that lead to different refractive indices in the optical path length sections, whereas two sets of differential equations are derived from Fermat's principle for each design wavelength. Very similar to monochromatic zoom systems, the aberration terms to cancel nominally are now distributed among the considered design wavelengths. The solutions for mapping functions, aberrations coefficients and surfaces coefficients, are again obtained by the proposed power series method, this time for multiple wavelengths. In other words, this allows canceling nominally the selected monochromatic aberrations at each defined design wavelength and thus controlling the polychromatic imaging performance.

Thirdly, the aberration power series is extended to include also dependencies on the wavelength by multiplying the monochromatic aberration series by ascending orders in $\lambda$. Fermat's principle is applied as done in the monochromatic cases for one design wavelength. The only difference is that the refractive indices in the optical path length sections are now functions of $\lambda$, expressed for example through Sellmeier equation. In case all surfaces coefficients (and zoom configurations) are well defined, the proposed power series method allows calculating all mapping functions and aberration coefficients (including chromatic terms) for the defined sequence of pupil plane cross sections and in ascending order. In another embodiment, a number of available and not yet known surfaces coefficients are used to select an equal number of aberration coefficients with at least one chromatic aberration coefficient selected to cancel nominally. Optionally, this can be done by following the extended SCD rules for chromatic aberrations of this invention. As before, the unknown mapping and surfaces coefficients can be calculated by using a power series method.

In a further aspect of the present invention, the system specifications inputted to the computer program are calculated or varied using an optimization method.

The step of inputting to the computer system specifications comprises calculating with an optimization method an initial position for at least one optical surface defined by its vertex $f_{i,0}$ along the optical axis.

In a further aspect, the optimization method is a Monte Carlo optimization.

It is a well-known strategy to calculate a starting system configuration based on low order aberration theory (e.g. Gaussian optics or Seidel's formulas). Such a design approach ensures that a calculated system is nominally free of these low order aberrations. In the next step, common optimization is used to reach a final system layout, where a balancing of all aberrations takes place.

Thus, embodiments of the present invention allow for a rapid calculation of sophisticated starting systems with a standard optimization process as the final step. This allows to save a considerable amount of time and effort (and thus costs) that can be used to address additional product relevant questions such as manufacturability, tolerances and assembly. Importantly, the calculated ray mapping functions and clear apertures allow to immediately assess important parameters such as the angles of incidence for all optical surfaces and different fields.

In another embodiment according to the present invention, the method further comprises the step of inputting to a computer system at least a second set of system specifications, wherein each set corresponds to a different configuration of a zoom system. Said at least second set of system specifications comprising at least imaging system parameters, comprising surface coefficients and surfaces vertices, pupil characteristics, and object and image spaces, the computer based method of the present invention being executed for each second set of system specifications.

In case of monochromatic zoom systems, it is necessary to define at least two zoom configurations besides the above-defined system description; each zoom configuration is characterized by a set of surface positions (which allows movement between the different zoom stages) and an object to image relationship (e.g. focal length changes between two zoom configurations). Fermat's principle is applied as before, leading to sets e.g. two sets, of differential equations for each zoom configuration. In case all surfaces coefficients and zoom configurations are well defined, the proposed power series method enables to calculate all mapping functions and aberration coefficients for the defined sequence of pupil plane cross sections and in ascending order and for the zoom configurations simultaneously. In another embodiment of this method, a number of available and not yet known surfaces coefficients are used to select an equal number of aberration coefficients to cancel nominally and distributed among the zoom configurations.

Optionally this can be done by following the well-defined Selection-Consistency-Distribution (SCD) rules for zoom systems. Very similar to static systems, the unknown mapping, surfaces and/or aberration coefficients are calculated by using a power series method for zoom systems consisting of spherical and/or aspherical surfaces for the zoom configurations simultaneously.

In a further aspect of the present invention, the method is used for calculating ray aberrations at a first design wavelength and up to a highest order in an optical system comprising a plurality of optical surfaces, each optical surface being defined by a set of surface coefficients $f_{i,j}$, said method comprising the steps of
- using a power series method to calculate all aberration coefficients $\epsilon_{x,p,k,l}$ and $\epsilon_{y,p,k,l}$ for arbitrary pupil plane cross sections and in ascending aberration order,
- solving the linear system of equations for each aberration order, by
  - applying all derivatives for each order and for each pupil plane cross section to the differential equations to derive algebraic equations, e.g. to two sets of differential equations,
  - solving the linear system of equations,
- repeating each step until the highest order is reached.

In an embodiment, the method is applied for at least two configurations of a zoom system.

In another embodiment, the method is repeated for at least a second design wavelength to calculate the monochromatic aberrations for the first and the second design wavelength.

In another embodiment, the method further comprises the step of expressing each optical path length $d_i$ as a function of the wavelength by means of the refractive index distribution $n_{N_s}(\lambda)$ of each material for the at least one design wavelength so as to further calculate chromatic aberrations of the optical system.

It is an advantage that the method of the present invention can also be used to calculate the aberrations in an existing optical system, wherein the optical system can be a static or zoom system. Optionally for a zoom system the equations related to zoom systems can be used. The calculated aberrations can also be evaluated at different wavelengths, but also the method of the present invention permits the calculation of the chromatic aberrations.

In a further aspect, the method is for use with an optics design program.

In a further aspect, it is provided a method for manufacturing an optical element having at least one optical surface defined by at least one surface coefficient. Said optical element can be for use in an imaging system in which at least one ray aberration is nominally cancelled, wherein the at least one surface coefficient is obtained by the method according to the present invention. Optionally the method is for use in a rotationally symmetric system but the present invention is not limited thereto.

Thus, in a further aspect of the present invention, it is provided a computer based method for generating an electronic file for a numerically controlled machine for the manufacture of a rotationally symmetric imaging system having optical surfaces, the method comprising:
- inputting to a computer a first set of system specifications comprising:
  - imaging system parameters,
  - wavelength dependency,
  - types and number of surface coefficients of the optical surfaces,
  - pupil characteristics (e.g. stop position),
  - object and image spaces,
- translating using the computer the system specifications to a set of differential equations by applying Fermat's principle,
- translating using the computer the differential equations to algebraic equations by using the power series method up to a given order, to seek power series solutions to the derived differential equations
- inputting at least one ray aberration coefficient to be zero;
  - for each ray aberration coefficient set to zero, select one surface coefficient to be unknown, whereas said pair(s) of ray aberration and surface coefficient must appear simultaneously in at least one of the algebraic equations
- inputting to a computer values for the remaining surface coefficients that have not been applied to cancel aberrations in the previous step
- solving the differential equations to calculate at least one surface coefficient for the optical surfaces, and all mapping function, which define the ray trace and their intersection with the optical surfaces and therefore each clear aperture therefrom, and aberration coefficients up to the given order It is an advantage that the method of the present invention is used as a method for manufacturing an optical element such as a lens or a mirror. In fact, the method provides as output in the electronic file the surface coefficients of the optical elements of the imaging system, these surface coefficients can be directly provided as inputs for the manufacturing of an optical element. The manufactured optical element, when implemented in the imaging system, using the mapping function coefficients, will allow the system to be nominally free of the at least one ray aberration. Thus, the surface coefficients calculated by the method of the present invention can be directly provided as an electronic file to a manufacturing process of lenses, mirrors, etc. The mapping functions coefficients further define the ray trace and their intersection with the optical surfaces.

The present invention also provides a computer program product, which when executed on a processing engine executes any of the methods of the invention.

The computer program can be stored on a non-transitory signal storage medium such as an optical disk (CD-ROM or DVD-ROM), a magnetic disk, and a solid-state memory such as a flash memory or similar.

The technical effects and advantages of embodiments of according to the present invention correspond mutatis mutandis to those of the corresponding embodiments of the method according to the present invention.

BRIEF DESCRIPTION OF THE FIGURES

These and other technical aspects and advantages of embodiments of the present invention will now be described in more detail with reference to the accompanying drawings, in which:

FIG. 3 shows the x-components in the tangential plane according to embodiments of the present invention.

FIG. 4 shows the x-components in the sagittal plane according to embodiments of the present invention.

FIG. 5 shows the y-components in the sagittal plane according to embodiments of the present invention.

FIG. 6 shows the x-components in the ($\pi/3$)-skew ray plane according to embodiments of the present invention.

FIG. 7 shows the y-components in the ($\pi/3$)-skew ray plane according to embodiments of the present invention.

FIG. 8 shows the joint matrix for the combined x- and y-components in sagittal plane.

FIG. 9 illustrates a visualization of the required planes and corresponding black-font matrix elements by shaded rectangles, which can be extended readily to arbitrary higher aberration orders, according to an embodiment of the present invention.

DETAILED DESCRIPTION OF EMBODIMENTS

Figure 1:
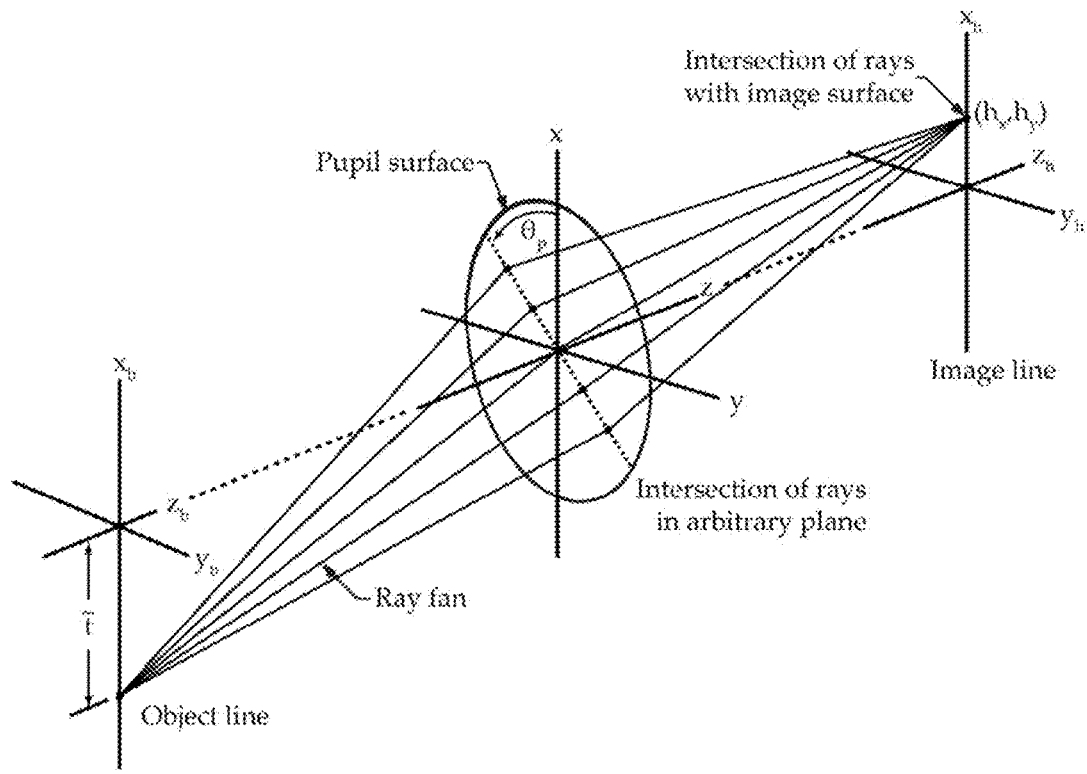
FIG. 1 illustrates different coordinate systems in object, pupil and image planes. The optical system is aligned along the z-axis and the object points as a function of t are along the x-axis, making the x-z-plane the tangential plane and the y-z-plane the sagittal plane.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The present invention provides methods to design (centered) imaging systems by solving differential equations derived from Fermat's principle. These imaging systems consist of a sequence of (moveable or fixed) spherical, aspherical or freeform surfaces, or combinations thereof. The power series solution approach follows a clear set of rules that allow calculating a predefined number of surfaces parameters equal to a number of selected aberration terms to vanish nominally. In addition, the methods provide mapping functions coefficients that allow describing exactly where arbitrary rays intersect each individual surface (e.g. without requiring ray tracing).

Definitions

Imaging system parameters are parameters, which define the properties of the imaging system. These comprise at least one wavelength or bandwidth for which the imaging system is designed, the number and types of optical surfaces (i.e. spherical, aspherical and/or freeform). The materials of the optical surfaces, the medium in which the light propagates in the imaging system, the position of each or at least one optical surface (e.g. surface vertices), the object and image space, the field of view, the effective f-number, etc. The imaging system is designed for at least one design wavelength and the performance of the imaging system can be and usually is wavelength dependent.

An optical surface can be expressed as a function $z=f_i(x,y)$ (with or without symmetry), which can further be decomposed into a finite series, each term of the series being weighted by a surface coefficient. For example, the finite series can be a polynomial sequence or truncated power series expansion. An example of a polynomial sequence is an even order rotationally symmetric power series in the general polynomial form:

$$f_i(x, y) = \sum_{j=0}^{N_i} \frac{1}{(2j)!} f_{i,2j} r^{2j} =$$

$$f_{i,0} + \frac{1}{2}x^2 f_{i,2} + \frac{1}{2}y^2 f_{i,2} + \frac{1}{24}x^4 f_{i,4} + \frac{1}{12}x^2 y^2 f_{i,4} + \frac{1}{24}y^4 f_{i,4} + \cdots$$

when the term pupil is used throughout the text, it is equivalent to the exit pupil, as known in the literature by the skilled person. The definitions of exit pupil and of entrance pupil are dependent on the aperture or aperture stop.

The entrance pupil is the optical image of the aperture stop as seen from a point on the optical axis in the object plane. The exit pupil is the optical image of the aperture stop as seen from a point on the optical axis in the image plane.

The pupil plane cross section is the cross section of the pupil plane and a second plane (characterized by the angle $\theta_p$) that contains the optical axis z, and which can be used to evaluate optical aberrations. FIG. 1 illustrates a pupil plane cross section for an arbitrary but fixed angle $\theta_p$, which corresponds to the plane comprising the light rays, which intersect the pupil plane at said fixed angle $\theta_p$.

The pupil plane cross section can be chosen according to the following relationship for the polar angle $$\theta_p = \frac{\pi}{p} \text{ for } p = 1 \ldots m_p$$

where the integer value $m_p$ describes the overall number of considered pupil plane cross sections and the index p then distributes the angles $\theta_p$ within the angle domain $[0, \pi/2]$. The case p=1 corresponds to the first, the so-called tangential plane given by angle $\theta_p=\pi=0$ (the direction changes sign from $\pi$ to 0 but it describes the same plane). For p=2, the second plane is given by $\theta_2=\pi/2$, typically referred to as sagittal plane. For every increment p=3, 4, . . . , there is one extra skew ray plane added that is defined by the angle $\theta_p$.

The aperture or aperture stop is an opening, which limits the amount of light passing through an imaging system. The aperture or aperture stop has a diameter and a position along the local optical axis. The diameter of the aperture stop defines the clear aperture for each surface. The clear aperture defines the unobscured portion of an optic through which light will pass. It is the diameter or size of an optical component that should meet specifications. In some cases, the stop might have elliptical or rectangular shape.

The optical axis is an imaginary line in an imaging system from object to image space, which passes through the center of curvature of each optical surface and coincides with the axis of symmetry for rotationally symmetric optical systems. In case of tilted optical elements, the local optical axes are typically defined by the chief ray of the on-axis field.

The characteristics of the entrance pupil and exit pupil (or pupil) are the shape and size, their position (e.g. optionally along the optical axis) and, by definition, further depend on the position and diameter of the aperture stop.

The object space is the plane, shaped surface or volume, which comprises the real or virtual object to be imaged by the imaging system. It is usually perpendicular to the optical axis e.g. of the first optical element. The object can be on or off axis, at infinite distance or finite distance, real or virtual and punctual, extended or three-dimensional.

The object point can be any point, which belongs to the object if it is extended, or is the object if it is punctual.

The object plane is either at a finite or infinite distance and is described by a variable t, e.g. along the x-axis, as $(t, 0, z_0)$ wherein $z_0$ is either a fixed position along the optical axis or a function of t (in which case it is not the object plane but the object space), or by a direction vector $(\sin(t), 0, \cos(t))$ for infinite distance, respectively. In case of non-rotationally symmetric systems, the single variable t extends to $t_x$ and $t_y$, in both the finite case as $(t_x, t_y, z_0)$, and for the infinite case as direction vector $(\sin(t), \sin(t_y), \sqrt{(1-\sin(t_x)^2-\sin(t_y)^2)})$.

The image plane is the plane in which the image produced by the imaging system is formed. If the object plane is perpendicular to a common optical axis, the image plane will also be perpendicular to this axis. The image can be on or off axis, tilted, at infinite distance or finite distance, real or virtual and punctual, shaped or three-dimensional. If it is three-dimensional, then the concept of image space is used instead of image plane. The image point can be any point, which belongs to the image if it is extended, or is the image if it is punctual.

The deviations of a wave front from being spherical are called wave aberrations. The distances of the points of intersection of the rays from the center of curvature of a spherical wave front in an image plane are called ray aberrations. In the presence of aberrations in an optical system, an imperfect image is formed. If all aberrations are zero, the wave front is spherical, all rays converge to its center of curvature, and a perfect geometrical point image is obtained. Various equivalent representations of ray and wave aberrations series and conversion rules between them do exist, known from literature by the skilled person (e.g., see J. L. Rayces, "*Exact Relation between Wave Aberration and Ray Aberration*", Optica Acta, 11:2, 85-88 (1964)).

The ray aberration expansions represent the displacement of the real (traced) rays from the ideal image point at an image plane (or surface). The intersection with the image plane of a ray coming from an object point having coordinates $(\tilde{t}, 0, z_0)$ along the x-axis can be written in vector form $h=\tilde{h}_0+\epsilon^{(3)}+\epsilon^{(5)}+\epsilon^{(7)}+ \ldots$ where $\tilde{h}_0$ denotes the paraxial ray intersection. The introduction of $t=\tilde{t}/z_0$ allows handling the case of an infinitely distant object plane easily. For an infinitely distant object, t becomes $\tan(\alpha)$, with $\alpha$ being the field angle of parallel rays entering the optical system. Here, the epsilons $\epsilon^{(i)}$ are Buchdahl's aberration polynomials of the $3^{rd}$, $5^{th}$, $7^{th}$ . . . order, respectively. For systems with single or dual plane symmetry, or without any given symmetry, similar expansions do exist that include additional aberrations that do not exist in rotationally symmetric systems.

The wave aberration expansion for a certain field angle or point object represents the deviations of its wave front at the exit pupil from being spherical. Without loss of generality, the object can be oriented along the x-axis in case of rotationally symmetric systems. The wave aberration function can then be written as (V. Mahajan, "*Optical Imaging and Aberrations: Ray Geometrical Optics*," SPIE press (1998))

$$W(t,r,\theta)=\Sigma_{l=0}^{\infty}\Sigma_{n=1}^{\infty}\Sigma_{m=0}^{\infty} a_{(2l+m)nm} t^{2l+m} r^n \cos^m(\theta)$$

with wave aberration coefficients $a_{(2l+m)nm}$. The order of a wave aberration term is equal to $i=2l+m+n$ and always even in case of rotational symmetry. The overall number of independent aberration coefficients of the $i^{th}$ order is given by the formula $N_i=(i+2)(i+4)/8-1$.

If all wave aberrations are zero, the wave front is spherical, all rays converge to its center of curvature, and a perfect geometrical point image is obtained. In the presence of aberrations in an optical system, an imperfect image is formed. Very similarly, ray aberrations represent the displacement of the rays from the ideal image point at an image plane (surface), as illustrated in FIG. 1.

For systems with plane symmetry/ies, or without any given symmetry (these are included within the scope of the present invention), similar expansions do exist that include additional aberrations that do not exist in rotationally symmetric systems (e.g., see Richard Barakat, Agnes Houston, "*The Aberrations of Non-rotationally Symmetric Systems and Their Diffraction Effects*", Optica Acta, 13:1, 1-30 (1966)).

Methods according to embodiments of the present invention relate to rotationally symmetric, plane(s) symmetric and non-symmetric optical systems. Thus, the respective aberration functions are hereby described.

Output of any of the computer based methods according to any of the embodiments of the present invention is an input to a further optics design program. The output of any of the embodiments of the present invention can be an electronic file defining the design achieved; i.e. the shapes or surfaces of the optical elements that make up the design. The output of any of the embodiments of the present invention can be an electronic file for a numerically controlled machine defining the components of the design ready for the manufacture of an imaging system having optical surfaces. An output can be a computer program product comprising software, which executed on one or more processing engines, performs any of the methods of embodiments of the present invention. Output can be a non-transitory signal storage medium storing the computer program product.

1.1 Aberration Functions of Rotationally Symmetric Systems

The intersection with the image plane of a ray coming from an object point having coordinates $(\tilde{t}, 0, z_0)$ along the x-axis can be written in vector form $h = \tilde{h}_0 + \epsilon^{(3)} + \epsilon^{(5)} + \epsilon^{(7)} + \ldots$ where $\tilde{h}_0$ denotes the paraxial ray intersection. The introduction of $t = \tilde{t}/z_0$ allows handling the case of an infinitely distant object plane easily. For an infinitely distant object, t becomes $\tan(\alpha)$, where $\alpha$ denotes the field angle of parallel rays entering the optical system. The epsilons are Buchdahl's aberration polynomials of the $3^{rd}$, $5^{th}$, $7^{th}$ ... order, respectively or similar. Well-known from literature, the x- and y-coordinate components can be written as $$\epsilon_x^{(1)} = r\cos[\theta]\nu_1 + t\nu_2$$

$$\epsilon_y^{(1)} = r\sin[\theta]\nu_1$$

$$\epsilon_x^{(3)} = r^3\cos[\theta]\sigma_1 + r^2t(2 + \cos[2\theta])\sigma_2 + rt^2\cos[\theta](3\sigma_3 + \sigma_4) + t^3\sigma_5$$

$$\epsilon_y^{(3)} = r^3\sin[\theta]\sigma_1 + r^2t\sin[2\theta]\sigma_2 + rt^2\sin[\theta](\sigma_3 + \sigma_4)$$

$$\epsilon_x^{(5)} = r^5\cos[\theta]\mu_1 + r^4t(\mu_2 + \cos[2\theta]\mu_3) + r^3t^2\cos[\theta](\mu_4 + \cos[\theta]^2\mu_6) + r^2t^3(\mu_7 + \cos[2\theta]\mu_8) + rt^4\cos[\theta]\mu_{10} + t^5\mu_{12}$$

$$\epsilon_y^{(5)} = r^5\sin[\theta]\mu_1 + r^4t\sin[2\theta]\mu_3 + r^3t^2\sin[\theta](\mu_5 + \cos[\theta]^2\mu_6) + r^2t^3\sin[2\theta]\mu_9 + rt^4\sin[\theta]\mu_{11}$$

$$\epsilon_x^{(7)} = r^7\cos[\theta]\tau_1 + r^6t(\tau_2 + \cos[2\theta]\tau_3) + r^5t^2\cos[\theta](\tau_4 + \cos[\theta]^2\tau_6) + r^4t^3(\tau_7 + \cos[2\theta]\tau_8 + \cos[4\theta]\tau_{10}) + r^3t^4\cos[\theta](\tau_{11} + \cos[\theta]^2\tau_{12}) + r^2t^5(\tau_{15} + \cos[2\theta]\tau_{16}) + rt^6\cos[\theta]\tau_{18} + t^7\tau_{20}$$

$$\epsilon_y^{(7)} = r^7\sin[\theta]\tau_1 + r^6t\sin[2\theta]\tau_3 + r^5t^2\sin[\theta](\tau_5 + \cos[\theta]^2\tau_6) + r^4t^3(\sin[2\theta]\tau_9 + \sin[4\theta]\tau_{10}) + r^3t^4\sin[\theta](\tau_{13} + \cos[\theta]^2\tau_{14}) + r^2t^5\sin[2\theta]\tau_{17} + rt^6\sin[\theta]\tau_{19}$$

Given up to seventh order, with indexed aberration coefficients $\sigma$, $\mu$ and $\tau$. The two coefficients $\nu_1$ (defocus) and $\nu_2$ (tilt) are added for the sake of completeness and are zero in the case where $h_0$ denotes the paraxial ray intersection point, but these lowest order terms will be also considered here later on. The five coefficients from $\sigma_1$ to $\sigma_5$ are the coefficients of third order spherical aberration, coma, astigmatism, field curvature, and distortion, respectively. Only nine of the fifth order aberration coefficients from $\mu_1$ to $\mu_{12}$ are independent, and there are three additional relationships existing $\mu_2 = 3/2 * \mu_3$, $\mu_7 = \mu_8 + \mu_9$ and $\mu_4 = \mu_5 + \mu_6$. Similarly, only 14 of the 20 seventh order coefficients from $\tau_1$ to $\tau_{20}$ are independent and six additional relationships do exist. Any higher aberration orders can be derived in a similar manner. Optionally in some embodiments, ray aberration coefficients can be also expressed in terms of the wave front aberration coefficients. In general, the overall number of independent ray aberration coefficients of the $i^{th}$ order is given by the formula $N_i = (i+1)(i+7)/8$, where the aberration order i is always an odd number in case of rotational symmetry.

The intersection of a ray coming from an object point (finite distance) or field angle (object at infinity) described by t along the x-axis can be written in vector form $h = (h_x, h_y) = h_0 + \epsilon^{(1)} + \epsilon^{(3)} + \epsilon^{(5)} + \epsilon^{(7)} + \ldots$ where $h_0$ denotes the ideal image point. In Cartesian coordinates, the vector components are given as $h = (T(t), 0, D)$, where $T(t)$ describes the ideal image point location as a function of t at the image plane D. In the most general case, this image plane can be also a function $D(t)$, describing a curved image surface. When evaluating optical aberrations, it is common to do so in different pupil plane cross sections that can be chosen according to the following relationship for the polar angle $$\theta_p = \frac{\pi}{p} \text{ for } p = 1 \ldots m_p \tag{1.1}$$

where the integer value $m_p$ describes the overall number of considered pupil plane cross sections and the index p then distributes the angles $\theta_p$ within the angle domain $[0, \pi/2]$. Optionally, the case when p=1 corresponds to the first, i.e. the so-called tangential plane given by angle=$\pi$=0 (the direction changes sign from $\pi$ to 0 but it describes the same plane). For p=2, the second plane is given by =$\pi/2$, typically referred to as sagittal plane. For every increment p+1, there is one extra plane added that is defined by the angle.

For each pupil plane cross section given by $\theta_p$, the Cartesian pupil coordinates $(x, y) = (r \cos[\theta], r \sin[\theta])$ that are element of this plane can be described by a single pupil variable $q_p$, that is $(q_1, 0)$ in tangential plane, $(0, q_2)$ in sagittal plane, $(q_3/2, \sqrt{3}q_3/2)$ in a first skew ray plane $(\theta_3 = \pi/3)$, or in general as $$(q_{p,x}, q_{p,y}) = (q_p \cos[\theta_p], q_p \sin[\theta_p]). \tag{1.2}$$

Optionally, in some embodiments, this applies for all planes for given values p=1 . . . . Let us consider the case $m_p = 3$ in more detail, the x- and y-coordinate components of the ray aberration expansion $\epsilon_{x,p}^{(i)}$ and $\epsilon_{y,p}^{(i)}$ can be evaluated in different planes, where the second lower index p denotes the considered plane for the angle $\theta_p$. For the tangential plane (p=1), the aberrations (here with $x = q_1$) result in $$\epsilon_{x,1}^{(1)} = x\nu_1 + t\nu_2$$

$$\epsilon_{x,1}^{(3)} = x^3\sigma_1 + 3t^2\sigma_2 + t^2x(3\sigma_3 + \sigma_4) + t^3\sigma_5$$

$$\epsilon_{x,1}^{(5)} = x^5\mu_1 + tx^4(\mu_2 + \mu_3) + t^2x^3(\mu_4 + \mu_6) + t^3x^2(\mu_7 + \mu_8) + t^4x\mu_{10} + t^5\mu_{12}$$

$$\epsilon_{x,1}^{(7)} = x^7\tau_1 + tx^6(\tau_2 + \tau_3) + t^2x^5(\tau_4 + \tau_6) + t^3x^4(\tau_7 + \tau_8 + \tau_{10}) + t^4x^3(\tau_{11} + \tau_{12}) + t^5x^2(\tau_{15} + \tau_{16}) + t^6x\tau_{18} + t^7\tau_{20}$$

Please note that all y-components $\epsilon_{y,1}^{(i)}$ for the tangential plane are zero due to symmetry. For the sagittal plane (p=2), the aberrations (here with $y = q_2$) result in $$= t\nu_2, \epsilon_{x,2}^{(3)} = ty^2\sigma_2 + t^3\sigma_5$$

$$\epsilon_{x,2}^{(5)} = ty^4(\mu_2 - \mu_3) + t^3y^2(\mu_7 - \mu_8) + t^5\mu_{12}$$

$$\epsilon_{x,2}^{(7)} = = ty^6(\tau_2 - \tau_3) + t^3y^4(\tau_7 - \tau_8 + \tau_{10}) + t^5y^2(\tau_{15} - \tau_{16}) + t^7\tau_{20}$$

For the x-coordinate components and in $$= y\nu_1, \epsilon_{y,2}^{(3)} = y^3\sigma_1 + (\sigma_3 + \sigma_4)$$

$$= y^5\mu_1 + t^2y^3\nu_5 + t^4y\mu_{11}, \epsilon_{y,2}^{(7)} = y^7\tau_1 + t^2y^5\tau_5 + t^4y^3\tau_{13} + t^6y\tau_{19}$$

For the y-coordinate components. For the first skew ray plane (p=3), the aberrations in $(q_3, t)$ result in $$\epsilon_{x,3}^{(1)} = tv_2$$

$$\epsilon_{x,3}^{(3)} = \frac{1}{2}q_3^3\sigma_1 + \frac{3}{2}tq_3^2\sigma_2 + \frac{1}{2}t^2q_3(3\sigma_3 + \sigma_4) + t^3\sigma_5$$

$$\epsilon_{x,3}^{(5)} = \frac{1}{2}q_3^5\mu_1 + tq_3^4\left(\mu_2 - \frac{\mu_3}{2}\right) +$$
$$\frac{1}{2}t^2q_3^3\left(\mu_4 + \frac{\mu_6}{4}\right) + t^3q_3^2\left(\mu_7 - \frac{\mu_8}{2}\right) + \frac{1}{2}t^4q_3\mu_{10} + t^5\mu_{12}$$

$$\epsilon_{x,3}^{(7)} = \frac{1}{2}q_3^7\tau_1 + tq_3^6\left(\tau_2 - \frac{\tau_3}{2}\right) + \frac{1}{2}t^2q_3^5\left(\tau_4 + \frac{\tau_6}{4}\right) + t^3q_3^4\left(\tau_7 - \frac{\tau_8}{2} - \frac{\tau_{10}}{2}\right) +$$
$$\frac{1}{2}t^4q_3^3\left(\tau_{11} + \frac{\tau_{12}}{4}\right) + t^5q_3^2\left(\tau_{15} - \frac{\tau_{16}}{2}\right) + \frac{1}{2}t^6q_3\tau_{18} + t^7\tau_{20}$$

for the x-coordinate components and in $$\epsilon_{y,3}^{(1)} = \frac{\sqrt{3}}{2}q_3v_1$$

$$\epsilon_{y,3}^{(3)} = \frac{\sqrt{3}}{2}(q_3^3\sigma_1 + tq_3^2\sigma_2 + t^2q_3(\sigma_3 + \sigma_4))$$

$$\epsilon_{y,3}^{(5)} = \frac{\sqrt{3}}{2}\left(q_3^5\mu_1 + tq_3^4\mu_3 + t^2q_3^3\left(\mu_5 + \frac{\mu_6}{4}\right) + t^3q_3^2\mu_9 + t^4q_3\mu_{11}\right)$$

$$\epsilon_{y,3}^{(7)} = \frac{\sqrt{3}}{2}\left(q_3^7\tau_1 + tq_3^6\tau_3 + t^2q_3^5\left(\tau_5 + \frac{\tau_6}{4}\right) +$$
$$t^3q_3^4(\tau_9 - \tau_{10}) + t^4q_3^3\left(\tau_{13} + \frac{\tau_{14}}{4}\right) + t^5q_3^2\tau_{17} + t^6q_3\tau_{19}\right)$$

for the y-coordinate components.

Advantageously, if more than these three planes are considered ($m_p \geq$), all additional skew ray planes (with $\theta_p$) can be used the same way to express the x- and y-coordinate components of the ray aberration series expansions $\epsilon_{x,p}^{(i)}$ and $\epsilon_{y,p}^{(i)}$ as a function of the corresponding variable $q_p$. It is an advantage of the present invention that by using such different planes, it is possible to determine and isolate the original ray or wave aberration coefficients. This can be preferably done by applying the partial derivative(s) for the given dependency on the single variable $q_p$ ($q_1=x$, $q_2=y$, $q_3$ and so on) and/or t to the corresponding aberration components, evaluated at $q_p=t=0$. For example, $\partial x^2\partial t\epsilon_{x,1}^{(3)}$ is proportional to the coefficient $\sigma_2$, whereas $\partial x\partial t^2\epsilon_{x,1}^{(3)}$ is proportional to the coefficients ($3\sigma_3+\sigma_4$). Following this concept, all aberration coefficients (or combinations thereof) for different planes can be expressed by the related partial derivatives, evaluated at $q_p=t=0$ and visualized in different matrices. For example wherein the columns represent the partial derivatives with respect to x, starting from the $0^{th}$ order in column a to the $7^{th}$ order in column h, and wherein the rows represent the partial derivatives with respect to t, for the $0^{th}$ order in row 1 to the $7^{th}$ order in row 8. Using this formalism, the following figures show the derivatives that corresponds to ray aberrations in said pupil plane with the same dependency on variables $q_p$ and t. Thus, FIG. 3 shows the partial derivatives associated to the x-components in the tangential plane, FIG. 4 shows the partial derivatives with respect to the x-components in the sagittal plane and FIG. 5 shows the partial derivatives related to the y-components in the sagittal plane.

FIG. 6 shows the partial derivatives related to the x-components in the ($\pi/3$)-skew ray plane and FIG. 7 shows the partial derivatives associated to the y-components in the ($\pi/3$)-skew ray plane.

The crossed-out derivatives matrix elements express that the respective aberrations x- or y-components in the considered plane do not depend on these derivatives due to symmetry. The grey-font matrix elements express that the respective aberrations x- or y-components in the considered plane do depend on these derivatives, but do not provide independent aberrations expressions when following the plane order. For example, $\partial x^2\partial t\epsilon_{x,1}^{(3)}$ provides the coma coefficient $\sigma_2$, and so does $\partial y^2\partial t\epsilon_{x,2}^{(3)}$ in grey-font, both evaluated at $x=y=t=0$. As there is no overlapping of existing matrix elements for the x- and y-components in sagittal plane, the two matrices $\epsilon_{x,2}$ and $\epsilon_{y,2}$ can be combined in a single joint matrix $\epsilon_{x,y,2}$, shown in FIG. 8.

As stated previously, $\partial x\partial t^2\epsilon_{x,1}^{(3)}$ is proportional to the combined astigmatism and field curvature coefficients ($3\sigma_3+\sigma_4$), thus it is necessary to consider one additional plane to determine both aberrations independently. With $\partial y\partial t^2\epsilon_{y,2}^{(3)}$ being proportional to the aberrations ($\sigma_3+\sigma_4$), knowing the expressions $\partial x\partial t^2\epsilon_{x,1}^{(3)}$ and $\partial y\partial t^2\epsilon_{y,2}^{(3)}$ is equivalent to knowing aberrations $\sigma_3$ and $\sigma_4$, respectively. The first order aberrations require only the tangential plane, the third order (Seidel) aberrations require the tangential plane and y-components in sagittal plane, the fifth order aberrations require the tangential plane and both x- and y-components in sagittal plane, to determine all aberrations independently. With each four further aberration orders, one additional x- or y-component of a new skew ray plane is required, and therefore, with every eight new orders, one new skew ray plane is required. The relationship between the ray aberration order i and the required number of matrices can be given as $$N_p = \left\lfloor \frac{i+1}{4} + 1 \right\rfloor,$$

where floor(x)=$\lfloor x \rfloor$ is the largest integer less than or equal to x. This sequence of planes ensures that the number $N_i$=(i+1)(i+7)/8 of independent aberration series coefficients for a given aberration order i is equal to the number of black-font matrix elements on the diagonal of the same combined order i in the matrices for the required planes and respective x- and y-components.

Figure 9:
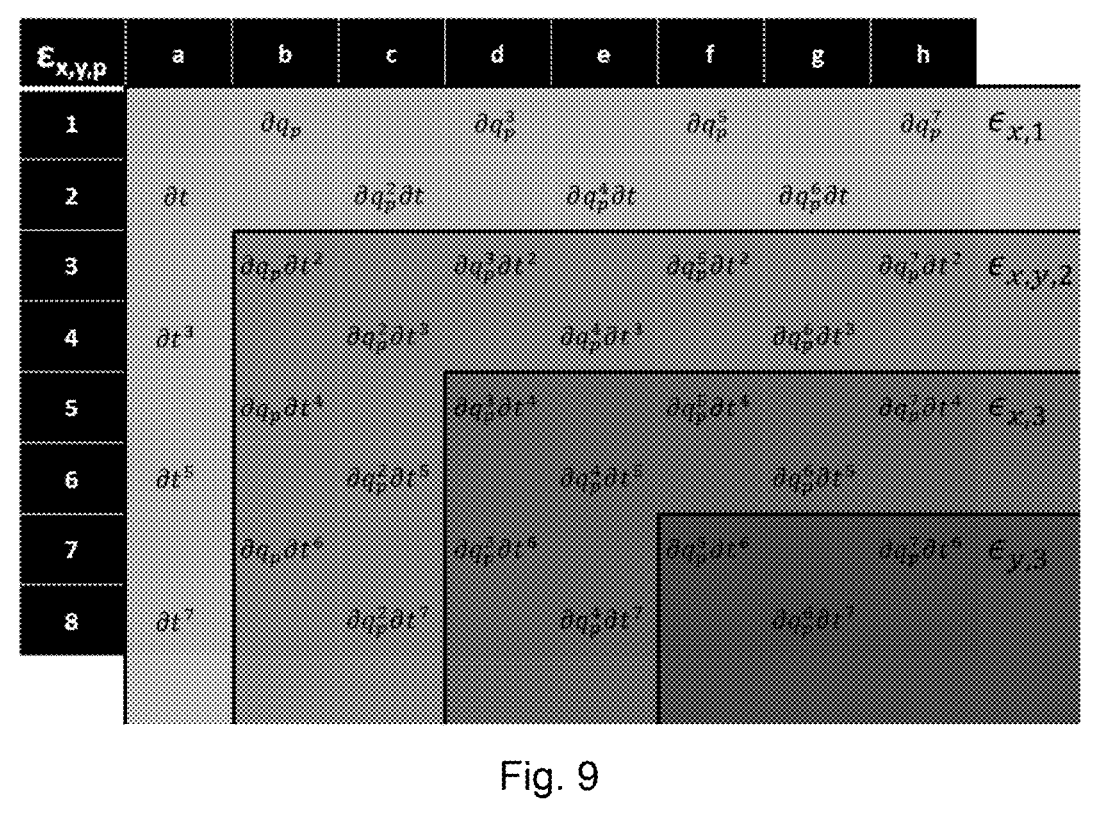

Visualization of the required planes and corresponding black-font matrix elements by shaded rectangles, which can be extended readily to arbitrary higher aberration orders, is shown in the matrix of FIG. 9.

As methods according to embodiments of the present invention allow determining all aberrations independently, conversely, this means that if all matrix elements are applied accordingly (at $q_p=t=0$) and set to 0, all related ray and wave aberrations are to vanish too. The here chosen order of planes is mainly for traditional reasons, any other order could be derived in a very similar manner. In comparison to all the other planes, the tangential plane is unique in a sense that there is not any dependency in y-components. This is also the reason why third order aberrations do already require a second plane to determine all aberrations (specifically $\sigma_3$ and $\sigma_4$). In this order, any additional skew ray plane (p≥3) has its first and only black-font matrix element at $\partial q_p^{4p-9}\partial t^{4p-8}$ with aberration order i=8*p−17.

1.2 Aberration Functions of Non-Rotationally Symmetric Systems

The aberration functions of systems having (1) no symmetry, (2) one plane of symmetry, (3) two planes of symmetry, are briefly discussed (for details see Richard Barakat, Agnes Houston, "*The Aberrations of Non-rotationally Symmetric Systems and Their Diffraction Effects*", Optica Acta, 13:1, 1-30 (1966)). Without any symmetry, all combinations of the four independent variables ($x_p$, $y_p$, $t_x$, $t_y$) (for the pupil and object coordinates) are required in the wave aberration series expansion.

In case of one plane of symmetry, not all combinations of the four independent variables appear in the wave aberration expansion. Assuming symmetry about the x-z-plane, the wave aberration function W must be invariant to changes in the signs of $y_p$, $t_y$ and $y_p t_y$, without any further restrictions on $x_p$ and $t_x$.

If there are two orthogonal planes of symmetry, further restrictions on the wave aberration expansion of the four independent variables are imposed. Assuming symmetry about the x-z- and y-z planes, the wave aberration function W must be invariant to changes in the signs of $x_p$, $t_x$ and $x_p t_x$, and of $y_p$, $t_y$ and $y_p t_y$. Because of the invariances, it is not difficult to show that in case of two planes of symmetry, the wave aberration function W contains only even order terms. This statement does not hold for the other two cases.

From the known wave aberration expansion for each of the three cases, it is known from literature by the skilled person how to derive the respective ray aberration expansion. Similar to the rotationally symmetric case, all independent aberration coefficients (or combinations thereof) can be expressed by related partial derivatives $\partial x_p^i \partial y_p^j \partial t_x^k \partial t_y^l \epsilon_x$ (likewise for $\epsilon_y$), evaluated at $x_p = y_p = t_x = t_y = 0$. Due to the four instead of two independent variables, a visualization is not feasible, but possible in principle. For similar reasons, the use of a sequence of pupil planes is possible in principle, but will not be used for any of the non-rotationally symmetric cases throughout this invention.

2.1 Description of Rotationally Symmetric Co-Axial Systems

As the present invention pertains to a computer based method for designing a rotationally symmetric imaging system having optical surfaces, such an optical system is hereby described. This section covers lens-based systems but mirror-based systems can be treated similarly and are included in some embodiments.

Rotationally symmetric, co-axial, lens-based, optical systems are characterized by a sequence of N refractive optical elements that are aligned along a common optical axis z. All optical surfaces $f_i$ are rotationally symmetric and can be thus expressed as a function of a single radial variable $r=\sqrt{x^2+y^2}$, where $f_{i+1}(0) > f_i(0)$ is fulfilled. The surfaces functions $z = f_i(x, y)$ can be expressed as even order power series in the most general polynomial form as $$f_i(x, y) = \sum_{j=0}^{N_i} \frac{1}{(2j)!} f_{i,2j} r^{2j} =$$

$$f_{i,0} + \frac{1}{2}x^2 f_{i,2} + \frac{1}{2}y^2 f_{i,2} + \frac{1}{24}x^4 f_{i,4} + \frac{1}{12}x^2 y^2 f_{i,4} + \frac{1}{24}y^4 f_{i,4} + \cdots$$

(2.1)

with series coefficients $f_{i,2j}$ up to $2N_i$ order. This representation in terms of even order powers in r also allows use of other rotationally symmetric surface functions such as the common aspherical surface description (in many optical design programs with an additional spherical surface term), but also other types of functions of even order. In case of a spherical surface (without conic constant here, which can be treated similarly), these coefficients are described by the radii of curvature $R_i$ that appears in every order, that is $$f_{i,2} = \frac{1}{R_i}, f_{i,4} = \frac{3}{R_i^3}, f_{i,6} = \frac{45}{R_i^5}, \ldots$$

(2.2)

The series expansions about the origin can be also shifted to a different radial offset $r_0$ if needed by replacing $r^{2j}$ by $(r-r_0)^{2j}$ in Eqs. (2.1, 2.2).

Furthermore, it is important to introduce the ray mapping functions ($u_i(x, y, t)$, $v_i(x, y, t)$) in x- and y-direction that describe in this most general form where a ray coming from the object defined by variable t, and going through the pupil coordinate (x, y), will intersect $f_i$ at point ($u_i$, $v_i$). As described previously, if different pupil plane cross sections are used, the ray position at the pupil can be described by a single pupil coordinate $q_p$ (see Eqs. (1.1) and (1.2)). Therefore, it is sufficient to express the ray mapping functions ($u_i$, $v_i$) as series expansions of ($q_p$, t)

$$u_{i,p}(q_p, t) = \sum_{l=0}^{\infty} \sum_{k=0}^{\infty} u_{i,p,k,l} q_p^k t^l$$

(2.3)

$$v_{i,p}(q_p, t) = \sum_{l=0}^{\infty} \sum_{k=0}^{\infty} v_{i,p,k,l} q_p^k t^l$$

Figure 2:
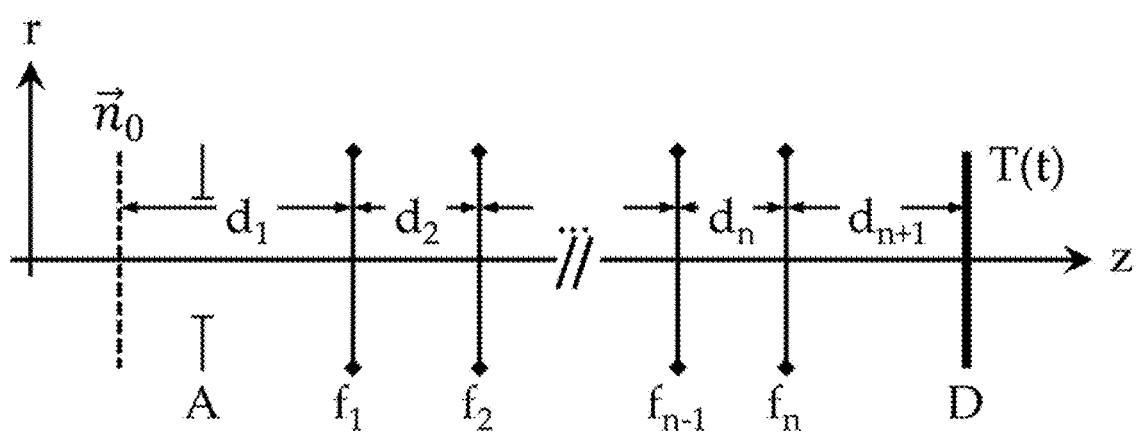
FIG. 2 shows a general system layout of a co-axial rotationally symmetric optical system that is supposed to image an object described by wave fronts $n_0$ to an image described by the relationship T(t) at the image surface D

(2.4)

with coefficients $u_{i,p,k,l}$ and $v_{i,p,l,k}$. All spaces (filled for example, with air, glasses, plastics . . . ) between neighboring surfaces are described by refractive indices that can be functions of the wavelength $\lambda$, temperature and so on. If only a single wavelength $\lambda_0$ (for fixed temperature, pressure . . . ) is to be considered, these refractive indices become scalar values, which is always the case here until stated otherwise. FIG. 2 illustrates the most general layout of such a lens-based optical system, where the surfaces $f_i(x, y)$ may be defined as polynomial (aspherical) and/or spherical surfaces.

The optical system may or may not include an aperture stop A that can be placed at any position and define the pupil plane within the optical system. For example, in FIG. 2, the stop is placed at the entrance of the optical system in front of the first optical surface.

The ray path from object to image space can be described by (n+1) distances $d_1 \ldots d_{n+1}$, whereas the on-axis distances between two respective surfaces is then given by $d_{i+1} = f_{i+1}(0) - f_i(0)$. In general, the distances between two respective intersecting surfaces along an arbitrary ray path is given by the Pythagorean Theorem and can be written as $$d_i = n_{i-1,i} * \sqrt{(u_{i,p} - u_{i-1,p})^2 + (v_{i,p} - v_{i-1,p})^2 + (f_i(u_{i,p}, v_{i,p}) - f_{i-1}(u_{i-1,p}, v_{i-1,p}))^2}$$

(2.5)

For (i=2 . . . n), where $n_{i-1,i}$ denotes the scalar refractive index between two respective surfaces, and ($u_{i,p}$, $v_{i,p}$, $f_i$) and ($u_{i-1,p}$, $v_{i-1,p}$, $f_{i-1}$) the two respective intersection points. The first and last distance $d_1$ (from object) and $d_{n+1}$ (to image) can be expressed similarly, listed in Table 1.

TABLE 1

Distances from the object and to the image plane in case of an infinite (IOD) or finite (FID) object distance

| | First distance $d_1$ | Last distance $d_{n+1}$ |
|---|---|---|
| 1a IOD | $n_{0,1} * \vec{n}_0 \cdot (\vec{x} - \vec{x}_0)$ | $n_{n,n+1} \sqrt{(h_{x,p} - u_{n,p})^2 + (h_{y,p} - v_{n,p})^2 + (D - f_n)^2}$ |
| 1b FOD | $n_{0,1} \sqrt{(u_{1,p} - t)^2 + v_{1,p}^2 + (f_1(u_{1,p}, v_{1,p}) - z_0)^2}$ | $n_{n,n+1} \sqrt{(h_{x,p} - u_{n,p})^2 + (h_{y,p} - v_{n,p})^2 + (D - f_n)^2}$ |

In the first case (1a) of an infinite object distance (IOD), the distance $d_1$ contains the refractive index $n_{0,1}$ (typically air), $\vec{n}_0$ is the normal vector of the wave front as a function of the field angle t (defined here as $\vec{n}_0=(\sin(t), 0, \cos(t))$). The vector x denotes the intersection point of a ray with the first surface $\vec{x}=(u_{1,p}, v_{1,p}, f_1(u_{1,p}, v_{1,p}))$, and $\vec{x}_0$ can be an arbitrary point on the incident wave fronts, e.g. the origin.

In the second case (1b) of a finite object distance (FOD), the distance $d_1$ depends on the refractive index $n_{0,1}$, the position of the object points given as $(t, 0, z_0)$ and the ray intersection with the first surface, given by the Pythagorean Theorem. Here, t describes the position of an object point in the x-direction instead of the angle with respect to the optical axis. The outgoing wave fronts w from the object are spherical wave fronts. The finite object points can be part of either a plane object where $z_0$ is a constant or a shaped object surface described by $z_0=z_0(t)$.

In both cases 1a and 1b, the last distance $d_{n+1}$ is given by the Pythagorean Theorem between the intersection point on the last surface $(u_{n,p}, v_{n,p}, f_n(u_{n,p}, v_{n,p}))$ and the real image point described by coordinates $(h_{x,p}, h_{y,p}, D)$ for the considered pupil plane cross section, multiplied by the refractive index $n_{n,n+1}$. In both cases, the image can be in a plane with constant D, or on a shaped image where $D=D(t)$. The real image is given by the ideal image $(T(t), 0, D)$ plus aberrations in x- and y-direction $$(h_{x,p}, h_{y,p}, D) = (T(t), 0, D) + (\epsilon_{x,p}^{(1)}, \epsilon_{y,p}^{(1)}, 0) + \qquad (2.6)$$
$$(\epsilon_{x,p}^{(3)}, \epsilon_{y,p}^{(3)}, 0) + (\epsilon_{x,p}^{(5)}, \epsilon_{y,p}^{(5)}, 0) + \ldots$$
$$= (T(t), 0, D) + (\epsilon_{x,p}, \epsilon_{y,p}, 0)$$

The function $T=T(t)$ provides the ideal relationship between the field angle t (case 1a), or the object coordinate t (case 1b) and the correspondent image points at the image plane or image surface. For example in case 1a, the image function $T(t)=f_L\cdot\tan(t)$ corresponds to a distortion-free imaging of different fields with field angle t at their image points $(T(t), 0, D)$. In case 1b, the function $T=M\cdot t$ typically contains the magnification M (for real and inverted images, M is negative).

Similarly to the ray mapping functions described above, the x- and y-components of the ray aberration function $\epsilon_x$ and $\epsilon_y$ can be expressed as series expansions of variables $(q_p, t)$ for an arbitrary pupil plane cross section $$\epsilon_{x,p}(q_p,t)=\Sigma_{l=0}^{\infty}\Sigma_{k=0}^{\infty}\epsilon_{x,p,k,l}q_p^k t^l \qquad (2.7)$$

$$\epsilon_{y,p}(q_p,t)=\Sigma_{l=0}^{\infty}\Sigma_{k=0}^{\infty}\epsilon_{y,p,k,l}q_p^k t^l \qquad (2.8)$$

wherein $\epsilon_{x,p,k,l}$ and $\epsilon_{y,p,k,l}$ are aberration coefficients which can be exactly related to other known representations such as wave aberrations, Buchdahl or others. For example, evaluating $\partial x \partial t^2 \epsilon_{x,1}$ for $x=t=0$ provides $\epsilon_{x,1,1,2}$, which is proportional to the Buchdahl coefficients $(3\sigma_3+\sigma_4)$. This means that several of the coefficients $\epsilon_{x,p,k,l}$ and $\epsilon_{y,p,k,l}$ are zero due to symmetry.

In some embodiments the aberration coefficients $\epsilon_{x,p,k,l}$ and $\epsilon_{y,p,k,l}$ can be exactly related to "matrix aberration coefficients" (MACs). The matrix aberration coefficients correspond to the coefficients obtained from the matrices shown in FIGS. 3 to 9. These can be expressed in terms of the wave aberrations, Buchdahl or ray aberration coefficients as explained above. For example, evaluating $\partial x \partial t^2 \epsilon_{x,1}$ for $x=t=0$ provides $\epsilon_{x,1,1,2}$, which is a MAC proportional to the Buchdahl coefficients $(3\sigma_3+\sigma_4)$. This means that some MACs are zero by definition.

The expressions of Table 1 together with Eq. (2.5) provide the overall sequence of distances $d_i$ along an arbitrary ray path from the (finite or infinite) object to image space. Another case that can be described in a very similar fashion are afocal systems, where both in- and outgoing wave fronts on the object and image side are described by plane wave fronts, and the relationship between the in- and outgoing field angles can be redefined for distance $d_{n+1}$ in a similar fashion to $d_1$ of case 1a.

Thus, the computer-based method for designing a rotationally symmetric imaging system according to embodiments of the present invention comprises the step of inputting to a computer system specifications comprising:
 imaging system parameters,
 wavelength dependency of materials,
 a number of surface coefficients of the optical surfaces,
 pupil characteristics (stop position),
 object and image spaces,
as described here above.

The imaging system parameters, can be for example optionally one or more or all of at least one wavelength or bandwidth for which the imaging system is designed, the number of optical surfaces, the types of optical surfaces, the materials of the optical surfaces, the medium in which the light propagates in the imaging system, the position of each or an at least one optical surface, the object and image space, the field of view, the effective f-number, etc.

Fermat's principle and differential equations for arbitrary pupil plane cross sections are hereby described:

As known to the skilled person, Fermat's principle states that the optical path length between two fixed points is an extremum along a light ray. Consider a fixed but arbitrary point on the wave front w(t) (finite or infinite object distance), and a fixed but arbitrary point on the second surface $(u_{2,p}, v_{2,p}, f_2(u_{2,p}, v_{2,p}))$. A ray emerging from the wave front w and passing through $(u_{2,p}, v_{2,p}, f_2(u_{2,p}, v_{2,p}))$ must be such that the added optical path length $d_1+d_2$ is an extremum. With points at the boundaries kept fix, the only remaining variable to achieve an extremum for $d_1+d_2$ is either $u_{1,p}$ or $v_{1,p}$ at the point $(u_{1,p}, v_{1,p}, f_1(u_{1,p}, v_{1,p}))$ on the first (in-between) surface. Fermat's principle thus implies that $$D_{1x}=\partial_{u_{1,p}}(d_1+d_2)=0 \qquad (3.1)$$

$$D_{1y}=\partial_{v_{1,p}}(d_1+d_2)=0 \qquad (3.2)$$

where the partial derivatives indicate that $(u_{2,p}, v_{2,p}, f_2(u_{2,p}, v_{2,p}))$ is fixed. Following similar arguments, two sets of differential equations can be derived for all defined distances $d_i$ from object to image space.

$$D_{ix}=\partial_{u_{i,p}}(d_i+d_{i+1})=0 (i=1 \ldots n) \qquad (3.3)$$

$$D_{iy}=\partial_{v_{i,p}}(d_i+d_{i+1})=0 (i=1 \ldots n) \qquad (3.4)$$

An optical system comprising n surfaces is described by n differential equations $D_{ix}$ and n differential equations $D_{iy}$ for $i=1 \ldots n$, directly derived from Fermat's principle for a given but arbitrary pupil plane.

Thus, a computer-based method according to embodiments of the present invention further comprises the step of translating using the computer the system specifications provided in the previous step to $2N_s$ differential equations e.g. per pupil plane, by applying Fermat's principle.

The following step of a computer based method according to some embodiments of the present invention comprises, optionally, the step of inputting to the computer a subgroup of optical ray aberration coefficients in one or more pupil plane cross sections to be set nominally to vanish using well defined Selection-Consistency-Distribution (SCD) rules. These optional selection rules are described and well defined further in the description. The selected and nominally cancelled aberration coefficients define which orders and for which pupil plane cross sections the finite power series method is applied to calculate all mapping functions and unknown surfaces coefficients.

The next step of the computer based method according to some optional embodiments of the present invention is to solve the differential equations to obtain surface coefficients for the optical surfaces and mapping function coefficients, which define the ray trace and their intersection with the optical surfaces and each clear aperture therefrom.

Aperture Stop/Pupil Coordinate:

There are, for example, four options where the stop in FIG. 1 can be placed. (A1) If one of the optical surfaces is supposed to act as the stop of the system, its ray mapping functions are replaced by the pupil coordinate from Eq. (1.2). E.g., if the $i^{th}$ surface is the pupil stop, $(u_{i,p}, v_{i,p}, f_i(u_{i,p}, v_{i,p}))$ is replaced by $(q_{p,x}, q_{p,y}, f_i(q_{p,x}, q_{p,y}))$ in all equations (3.3) and (3.4).

If an individual aperture stop A is added, its z-coordinate $z_A$ defines the position of the pupil plane. There are three options for the positioning of such a stop: (A2) an entrance stop, (A3) a stop between two optical surfaces, and (A4) an exit stop in front of the image plane.

(A2-A4) The treatment is always the same. The coordinates $(q_{p,x}, q_{p,y}, z_A)$ describe the position of an arbitrary ray in the pupil plane at the stop. In order to ensure that every ray is passing through the correct position $(q_{p,x}, q_{p,y}, z_A)$, one extra condition has to be fulfilled. The direction vector from the preceding element towards the stop and the direction vector from the stop to the succeeding element have to coincide. One way to ensure this is that the cross product of these two vectors is zero. For example, suppose the system layout has an aperture stop at $z_A$ between two consecutive surfaces with indices j and k. Thus, $$[q_{p,x}-u_{j,p}q_{p,y}-v_{j,p},z_A-f_j(u_{j,p},v_{j,p})]\times[u_{k,p}-q_{p,x},v_{k,p}-q_{p,y}, f_k(u_{k,p},v_{k,p})-z_A]=0 \quad (3.5)$$

has to be fulfilled. The equation (3.5) is thus required to describe system layouts where an aperture stop A is placed between two surfaces. The cross-product of equation 3.5 can be, for example, zero for all its three components simultaneously. By using identical arguments for the two direction vectors to and from the aperture stop, the remaining system layouts (A2) and (A4) also require three additional equations that can be derived using the cross product similar to Eq. (3.5). Thus, all system layouts (IOD or FOD) with an individual aperture stop (A2-A4) lead to three additional equations that are added each to the original Eqs. (3.3) and (3.4).

Algebraic Equations:

Suppose that functions $h_{x,p}$, $h_{y,p}$, $u_{i,p}$, $v_{i,p}$ and $f_i$ are analytic and smooth solutions for the differential equations $D_{ix}$ and $D_{iy}$ for (i=1 ... n) or (i=1 ... n+3, in case of an extra stop) in a given pupil plane cross section, in a preferred embodiment according to the present invention, Taylor's theorem implies that the functions must be infinitely differentiable and have power series representations as defined in Eqs. (2.1), (2.2), (2.3), (2.4) and (2.6). To solve these differential equations, the known power series method can be employed. This method substitutes the power series representations into the differential equations in order to determine the series coefficients. The coefficients of functions $h_{x,p}$, $h_{y,p}$, $u_{i,p}$, $v_{i,p}$ and $f_i$ can be calculated by evaluating equations $$\lim_{q_p \to 0} \lim_{t \to 0} \frac{\partial^k}{\partial q_p^k} \frac{\partial^l}{\partial t^l} D_{ix} = 0 \ (i = 1..n \text{ or } n+3) \quad (3.6)$$

$$\lim_{q_p \to 0} \lim_{t \to 0} \frac{\partial^k}{\partial q_p^k} \frac{\partial^l}{\partial t^l} D_{iy} = 0 \ (i = 1..n \text{ or } n+3, \text{ and } p \geq 2) \quad (3.7)$$

for a given but arbitrary pupil plane cross section, or combinations thereof. These equations can optionally be evaluated in some embodiments in a specific order following a set of selection rules which will be described below. Equations (3.6) and (3.7) are algebraic equations and can be directly linked to the ray aberrations (or optionally linked in some embodiments to aberration matrices):

Equation (3.6) corresponds to the x-components of the aberrations for a given pupil plane cross section. If a black- or grey-font element of the equivalent matrix is applied according to Eqs. (3.6), the selected derivative with exponents k and l defines the leading (highest) series coefficients of all functions. The leading aberration is $\epsilon_{x,p,k,l}$s, the leading coefficient of $u_{i,p}$ is $u_{i,p,k,l}$, and the leading coefficient of $f_i(u_{i,p}, v_{i,p})$ is $f_{i(k+l+1)}$. If a surface is defined as a stop, the leading coefficient of $f_i$ is $f_{i,(k+1)}$.

Equation (3.7) corresponds to the y-components of the aberrations for a given pupil plane cross section. If a black- or grey-font element of the equivalent matrix is applied according to Eq. (3.7), the leading MAC is $\epsilon_{y,p,k,l}$, the leading coefficient of $v_{i,p}$ is $v_{i,p,k,l}$, and the leading coefficient of $f_i(u_{i,p}, v_{i,p})$ is $f_{i,(k+l+1)}$. If it is defined as a stop, the leading coefficient of $f_i$ is $f_{i,(k+1)}$.

The series coefficients $u_{i,p,k,l}$ and $v_{i,p,k,l}$ share the same symmetries of $\epsilon_{x,p,k,l}$ and $\epsilon_{y,p,k,l}$. This means the coefficients of functions $\epsilon_{x,p}$ and $\epsilon_{y,p}$ are directly linked to the coefficients of the ray mapping functions $u_{i,p}$ and $v_{i,p}$ through their identical indices for (k, l) and related to the matrices elements. Thus, any index pair (k, l) that does not correspond to an aberration dependency due to symmetry means $u_{i,p,k,l}=v_{i,p,k,l}=0$ as well.

In another optional alternative embodiment, the method further comprises the step of applying partial derivatives of order k, l to the two sets of differential equations, said orders k, l being provided by using pre-defined aberration matrices for each pupil plane cross section, wherein each pre-defined aberration matrix associates each optical ray aberration of the subgroup to a partial derivative of order k, l of the ray aberration series expansion in said pupil plane cross section, thereby deriving a system of equations for the optical surfaces coefficients and the ray mapping functions coefficients.

2.2 Solution Schemes for Rotationally Symmetric Optical Systems

Here, the solution schemes are derived for all lens systems that can be described by a sequence of aspherical and/or spherical surfaces, for example S-A-A-S- ... to indicate the order. For all rotationally symmetric optical systems, the design process comprises the following steps:

Specify the imaging system as case 1a (IOD) or 1b (FOD)

Define number, types, order and materials of all optical surfaces

Define number of coefficients $f_{i,2j}$ (j=1, 2 ... ) for aspherical surfaces

T(t) according to Eq. (2.6), where T(t) must be a differentiable function of class $C^h$, where h is the highest order derivative that will be applied Define the number of surfaces Define the initial positions of all surfaces vertices $f_{i,0}$, the position of the object plane $z_0$ (or surface $z_0(t)$), the position of the image plane D (or surface D(t)) and the design wavelength $\lambda_0$ Choose one of the options (A1)-(A4) for the stop of the system Define the number of Choose matrix elements considered pupil planes p≥1 and the highest combined order of considered aberrations $o_m$=(k+1) (see Sec. 1.1)

the number and types of surfaces, the pupil planes, the stop option (A1)-(A4) and order $o_m$ then determine the overall number of equations that are calculated according to Eqs. (3.3)-(3.7)

In case of all aspherical surfaces systems, choose at least one ray aberration coefficient to be zero; for each chosen ray aberration coefficient set to zero, select one surface coefficient to be unknown (and to be calculated later on), whereas said pair(s) of ray aberration and surface coefficient must appear simultaneously in at least one of the derived algebraic equations Any remaining surface coefficient(s) that have not been used to cancel aberrations in the previous step have to be inputted as values to the algebraic equations (manually or via optimization).

The selected matrix or matrices elements of the algebraic system of equations using the computer, in order to obtain as an output at least one surface coefficient for the optical surfaces, all mapping function coefficients, and ray aberration coefficients up to the given order. The overall system of (non)-linear equations can be solved The overall combined system of equations for the subgroup can be solved simultaneously for all unknown coefficients by using standard methods such as the Newton-Raphson algorithm or others.

In cases where at least one surface is aspherical, the algebraic system of equations can be divided into non-linear and linear parts of the unknown coefficients, which are then possible to solve consecutively, whereas the linear parts can be solved by using standard methods such as the Gaussian elimination algorithm or others.

In the case of all-aspherical systems, only the first combined order results in a non-linear system that is first solved. Any considered higher combined order than one results in linear equations that can be solved consecutively in ascending order by using standard methods.

3.1 General Description of Rotationally Symmetric Optical Zoom Systems

As in Sec. 2, such optical systems are characterized by a sequence of N optical elements that are aligned along a common optical axis. In a zoom system, the surface shapes remain unchanged; however, the coefficients $f_{i,0}$ are not constant but can vary and need to be specified for at least two different specified zoom positions. Thus, the surfaces are described by $$f_i^c(x, y) = \sum_{j=0}^{N_i} \frac{1}{(2j)!} f_{i,2j}^c r^{2j} = f_{i,0}^c + \frac{1}{2}x^2 f_{i,2} + \frac{1}{2}y^2 f_{i,2} + ... \quad (3.11)$$

where c indicates different zoom configurations in Roman numbers I, II . . . and where the position of each surface $f_i^c(x, y)$ can be shifted to different lateral positions $f_{i,0}^c$. The definition of the ray mapping functions in Eqs. (2.3) and (2.4) remains the same, except for an added index c to indicate the zoom configuration that means ($u_{i,p}^c$, $v_{i,p}^c$) in x- and y-direction are defined in an arbitrary pupil plane cross section as $$u_{i,p}^c(q_p,t) = \Sigma_{l=0}^\infty \Sigma_{k=0}^\infty u_{i,p,k,l}^c q_p^k t^l \quad (3.12)$$

$$v_{i,p}^c(q_p,t) = \Sigma_{l=0}^\infty \Sigma_{k=0}^\infty v_{i,p,k,l}^c q_p^k t^l \quad (3.13)$$

with series coefficients $u_{i,p,k,l}^c$ and $v_{i,p,k,l}^c$. Likewise, the ray aberration functions $\epsilon_{x,p}$ and $\epsilon_{y,p}$ are expressed as series expansions of variables ($q_p$, t) for each zoom configuration and pupil plane cross section as $$\epsilon_{x,p}^c(q_p,t) = \Sigma_{l=0}^\infty \Sigma_{k=0}^\infty \epsilon_{x,p,k,l}^c q_p^k t^l \quad (3.14)$$

$$\epsilon_{y,p}^c(q_p,t) = \Sigma_{l=0}^\infty \Sigma_{k=0}^\infty \epsilon_{y,p,k,l}^c q_p^k t^l \quad (3.15)$$

Some embodiments of the present invention (described below) use "configuration matrix aberration coefficients" (CMACs).

All distances $d_1^c$ . . . $d_{n+1}^c$ are calculated as done previously in Sec. 2 for an IOD or FOD case, only this time the calculations are repeated for each zoom configuration, indicated by index c. In both cases, the image can be on a plane where $D^c$ is constant (but eventually shifted for each zoom configuration), or on a shaped image surface where $D^c = D^c(t)$. The real image point is then given by the ideal image point ($T^c(t)$, 0, $D^c$) plus the aberration power series terms in x- and y-direction, again for each defined zoom configuration $$\begin{aligned}(h_x^c, h_y^c, D^c) &= (T^c(t), 0, D^c) + (\epsilon_x^{c,(1)}, \epsilon_y^{c,(1)}, 0) + \\ &\quad (\epsilon_x^{c,(3)}, \epsilon_y^{c,(3)}, 0) + (\epsilon_x^{c,(5)}, \epsilon_y^{c,(5)}, 0) + ... \\ &= (T^c(t), 0, D^c) + (\epsilon_x^c, \epsilon_y^c, 0)\end{aligned} \quad (3.16)$$

The functions $T^c = T^c(t)$ provide the ideal relationships between the field angle t (case 1a), or the object coordinate t (case 1b) and the correspondent image points at the image plane or image surface for each zoom configuration. For example in case 1a, the image functions $T^c(t) = f_L^c \cdot \tan(t)$ correspond to the case where the different zoom configurations correspond to different focal lengths $f_L^c$. In case 1b, the image functions could describe magnifications $M^c$ for different zoom configurations.

Following Sec. 2, Fermat's principle can be applied in sections to each defined zoom configuration to calculate the differential equations from object to image space $$D_{ix}^c = \partial_{u_{i,p}^c}(d_i^c + d_{i+1}^c) = 0 (i=1 \ldots n) \quad (3.17)$$

$$D_{iy}^c = \partial_{v_{i,p}^c}(d_i^c + d_{i+1}^c) = 0 (i=1 \ldots n) \quad (3.18)$$

for each zoom configuration, indicated by the added index c. The different pupil plane options (A1-A4) are treated as previously. This means, if the $i^{th}$ surface is the pupil stop for a given zoom configuration, ($u_{i,p}^c$, $v_{i,p}^c$, $f_i^c(u_{i,p}^c, v_{i,p}^c)$) is replaced by ($q_{p,x}$, $q_{p,y}$, $f_i^c(q_{p,x}, q_{p,y})$) in all differential equations (3.17) and (3.18). If an individual aperture stop A is added, its z-coordinate $z_A^c$ defines the position of the pupil plane for each zoom configuration, which could also shift. The three individual pupil plane options (A2-A4) are treated as before by using the cross product, leading to additional equations per differential equation component x and y, and per zoom configuration.

Algebraic Equations:

The coefficients of the series expansions of the aberrations and functions $u_{i,p}{}^c$, $v_{i,p}{}^c$ and $f_i{}^c$ can be calculated by evaluating equations $$\lim_{q_p \to 0} \lim_{t \to 0} \frac{\partial^k}{\partial q_p^k} \frac{\partial^l}{\partial t^l} D_{ix}^c = 0 \ (i = 1. \ .n \text{ or } n+3) \quad (3.19)$$

$$\lim_{q_p \to 0} \lim_{t \to 0} \frac{\partial^k}{\partial q_p^k} \frac{\partial^l}{\partial t^l} D_{iy}^c = 0 \ (i = 1. \ .n \text{ or } n+3, \text{ and } p \geq 2) \quad (3.20)$$

Equations (3.19) and (3.20) can be directly linked to the aberration derivatives matrices as before, but now for different zoom configurations. Thus, Eq. (3.19) corresponds to the x-components $\epsilon_{x,p}{}^c$ in a given pupil plane cross section, and Eq. (3.20) corresponds to the y-components $\epsilon_{y,p}{}^c$ in a given pupil plane cross section, for each zoom configuration. The individual relationships between applied derivatives and leading coefficients of the different functions remain the same, except for the added index c for different zoom configurations. As before, any index pair (k,l) that does not correspond to an aberration dependency due to symmetry means $u_{i,p,k,l}{}^c$ and $v_{i,p,k,l}{}^c$ vanish too.

3.2 Solution Schemes for Rotationally Symmetric Optical Zoom Systems

Here, the solution schemes using embodiments of the method according to the present invention are derived for all zoom lens systems that can be described by a sequence of spherical and/or aspherical optical surfaces in a given order. The design process comprises the following steps:

- Specify the zoom system as case 1a (IOD) or 1b (FOD)
- Define number, types, order and materials of all optical surfaces
- Define number of coefficients $f_{i,2j}$ (j=1, 2 . . . ) for aspherical surfaces
- Define two or more zoom configurations described by index c=I, II . . . .
- Define the ideal image point relationships $T^c(t)$ according to Eq. (3.16). The functions $T^c(t)$ must be differentiable of class $C^h$, where h is the highest order derivative that will be applied
- Define the initial positions of all surfaces for all zoom configurations, that is all surface vertices $f_{i,0}{}^c$, the position(s) of the object plane $z_0{}^c$ (or surface $z_0{}^c(t)$), the position(s) of the image plane $D^c$ (or surface $D^c(t)$) and the design wavelength $\lambda_0$
- Choose one of the options (A1)-(A4) for the stop of the system
- Define the number of considered pupil planes $p^c \geq 1$, and the highest combined order of considered aberrations $o_m{}^c$ per zoom configuration
- The number and types of surfaces, the pupil planes, zoom configurations, the stop option (A1)-(A4) and orders $o_m{}^c$ then determine the overall number of equations that are calculated according to Eqs. (3.19)-(3.20)
- Choose at least one ray aberration coefficient to be zero; for each chosen ray aberration coefficient set to zero, select one surface coefficient to be unknown (and to be calculated later on), whereas said pair(s) of ray aberration and surface coefficient must appear simultaneously in at least one of the derived algebraic equations
- Any remaining surface coefficient(s) that have not been used to cancel aberrations in the previous step have to be inputted as values to the algebraic equations (manually or via optimization)

The final step is to solve the algebraic system of equations using the computer, in order to obtain as an output at least one surface coefficient for the optical surfaces, all mapping function coefficients, and ray aberration coefficients up to the given orders. The overall system of (non)-linear equations can be solved simultaneously for all unknown coefficients by using standard methods. In cases where at least one surface is aspherical, the algebraic system of equations can be divided into non-linear and linear parts of the unknown coefficients, which are then possible to solve consecutively. In the case of all-aspherical zoom systems, only the first combined order results in a non-linear system that is initially solved. Any considered higher combined orders result in linear equations that can be solved consecutively in ascending order.

The resulting calculated optical zoom system is nominally free of all ray aberrations (or combinations thereof) for the considered zoom configurations. If more than one solution exists (e.g. for different initial values), every solution corresponds to a different optical zoom system but nominally fulfilling the same imposed conditions.

4.1 General Description of Non-Rotationally Symmetric Systems

Embodiments of the present invention pertain to a computer based method for designing a non-rotationally symmetric imaging system having optical surfaces, such an optical system is hereby described. This section covers lens-based or mirror-based systems; catadioptric systems can be treated similarly. Due to the common nature of the methods for non-rotationally symmetric systems with the rotationally symmetric systems of this invention, only the main differences will be discussed here for three different symmetry cases: systems having (1) no symmetry, (2) one plane of symmetry, (3) two planes of symmetry.

Non-Rotationally Symmetric (Freeform) Optical Surfaces

Freeform optical surfaces $f_i$ are non-rotationally symmetric and are thus expressed as functions of two independent variables, for example x and y. The surfaces $z = f_i(x, y)$ can be expressed as monomial power series as $$f_i(x, y) = \sum_{j=0}^{N_j} \sum_{k=0}^{N_k} \frac{1}{j! k!} f_{i,j,k} x^j y^k \quad (4.1)$$

with series coefficients $f_{i,j,k}$ up to $N_j$ order in x, and $N_k$ order in y. This monomial expansion is used for all freeform surfaces throughout the text until stated otherwise, but can be also translated into various other freeform representations, such as Zernike, Chebyshev, Forbes, or alike. The three symmetry cases also define which coefficients exist:

(1) no symmetry: all series coefficients can be used in principle
(2) one symmetry plane: only even orders in k (x-z-plane)
(3) two symmetry planes: only even orders in j, k (x-z- and y-z-plane)

The ray mapping functions $(u_i, v_i)$ describe an arbitrary ray path as before, but depend now on four variables, that is $$u_i(x_p, y_p, t_x, t_y) = \sum_{j=0}^{\infty} \sum_{k=0}^{\infty} \sum_{l=0}^{\infty} \sum_{m=0}^{\infty} u_{i,j,k,l,m} x_p^j y_p^k t_x^l t_y^m \quad (4.2)$$

$$v_i(x_p, y_p, t_x, t_y) = \sum_{j=0}^{\infty} \sum_{k=0}^{\infty} \sum_{l=0}^{\infty} \sum_{m=0}^{\infty} v_{i,j,k,l,m} x_p^j y_p^k t_x^l t_y^m \quad (4.2)$$

The ray path from object to image is expressed by distances $d_1 \ldots d_{n+1}$ as done previously, with the only difference that the optical surfaces in symmetry cases (1) and (2) can be tilted. This tilt is introduced to rotation matrices $R_i$ for the each surface $f_i$, such that the optical path length sections are expressed by introducing $R_i \cdot (u_i, v_i, f_i)$. The rotations matrices for x-z-plane symmetry only allow rotations about the y-axis, whereas in case of no symmetry, arbitrary rotations about all three axis are possible. In case of two symmetry planes, there are no rotations possible and the system has still one common optical z-axis.

In case of a finite object, the object is given by $(t_x, t_y, z_0)$, and for the infinite case, the directional vector of the incident parallel rays is given as $(\sin(t_x), \sin(t_y), \sqrt{(1-\sin(t_x)^2-\sin(t_y)^2)})$.

Once the object to image relationship is prescribed, all optical path lengths sections can be expressed using Pythagorean Theorem, etc. as done before. The real image is again the sum of the prescribed image plus aberrations in x- and y-direction.

The x- and y-components of the ray aberration function $\epsilon_x$ and $\epsilon_y$ also depend now on four variables (see Sec. 1.2), that is $$\epsilon_x(x_p, y_p, t_x, t_y) = \Sigma_{j=0}^{\infty} \Sigma_{k=0}^{\infty} \Sigma_{l=0}^{\infty} \Sigma_{m=0}^{\infty} \epsilon_{x,j,k,l,m} x_p^j y_p^k t_x^l t_y^m \quad (4.4)$$

$$\epsilon_y(x_p, y_p, t_x, t_y) = \Sigma_{j=0}^{\infty} \Sigma_{k=0}^{\infty} \Sigma_{l=0}^{\infty} \Sigma_{m=0}^{\infty} \epsilon_{y,j,k,l,m} x_p^j y_p^k t_x^l t_y^m \quad (4.5)$$

Wherein $\epsilon_{x,j,k,l,m}$ and $\epsilon_{y,j,k,l,m}$ are ray aberration coefficients defined according to Sec. 1.2, and can be exactly related to alternative and known representations, such as wave aberrations or others.

Using identical arguments as before, Fermat's principle is applied to each pair of two consecutive optical path length sections by mathematically expressing that the optical path length between two fixed points is an extremum along a light ray, resulting in $$D_{x,i} = \partial_{u_i}(d_i + d_{i+1}) = 0 (i=1 \ldots n) \quad (4.6)$$

$$D_{y,i} = \partial_{v_i}(d_i + d_{i+1}) = 0 (i=1 \ldots n) \quad (4.7)$$

Thus, the computer-based method according to embodiments of the present invention further comprises the step of translating using the computer the system specifications provided in the previous step to $2N_s$ differential equations, by applying Fermat's principle.

Aperture Stop/Pupil Coordinate

The four options (A1)-(A4) are identically treated as done before.

(A1)—If the $i^{th}$ surface is the pupil stop, $(u_i, v_i, f_i(u_i, v_i))$ is replaced by $(x_p, y_p, f_i(x_p, y_p))$ in all equations (4.6) and (4.7) (A2)-(A4)—by using identical arguments as previously for the two direction vectors to and from the aperture stop; whereas said stop can be tilted as well through rotation matrix $R_A$, according to the considered symmetry case. All system layouts (IOD or FOD) with an individual aperture stop (A2)-(A4) lead to three additional equations that are added each to the original Eqs. (4.6) and (4.7).

Algebraic Equations:

As before, the known power series method is used to solve the derived differential equations. The coefficients of functions $\epsilon_x$, $\epsilon_y$, $u_i$, $v_i$ and $f_i$ can be calculated by evaluating equations $$\lim_{x_p \to 0} \lim_{y_p \to 0} \lim_{t_x \to 0} \lim_{t_y \to 0} \frac{\partial^j}{\partial x_p^j} \frac{\partial^k}{\partial y_p^k} \frac{\partial^l}{\partial t_x^l} \frac{\partial^m}{\partial t_x^m} D_{x,i} = 0 \ (i=1..n \text{ or } n+3) \quad (4.8)$$

$$\lim_{x_p \to 0} \lim_{y_p \to 0} \lim_{t_x \to 0} \lim_{t_y \to 0} \frac{\partial^j}{\partial x_p^j} \frac{\partial^k}{\partial y_p^k} \frac{\partial^l}{\partial t_x^l} \frac{\partial^m}{\partial t_x^m} D_{y,i} = 0 \ (i=1..n \text{ or } n+3) \quad (4.9)$$

for given but arbitrary combined orders. Equations (4.8) and (4.9) are algebraic equations that can be directly linked to the ray aberration x- and y-components, as before.

The series coefficients $u_{i,j,k,l,m}$ and $v_{i,j,k,l,m}$ share the same symmetries of $\epsilon_{x,j,k,l,m}$ and $\epsilon_{y,j,k,l,m}$, whereas any index tuple (j,k,l,m) that does not correspond to an aberration dependency due to symmetry means $u_{i,j,k,l,m} = v_{i,j,k,l,m} = 0$ as well.

4.2 Solution Schemes for Non-Rotationally Symmetric Optical Systems

Here, the solution schemes for all non-rotationally symmetric optical systems are summarized. For symmetry cases (1) no symmetry and (2) one plane of symmetry, at least one optical element is tilted with respect to the z-axis according to the considered symmetry. For symmetry case (3) with two planes of symmetry, at least one optical surface is of freeform shape.

The design process comprises the following steps:

Specify the imaging system as case 1a (IOD) or 1b (FOD)

Define the symmetry case (1), (2) or (3)

Define number, types, order and materials of all optical surfaces

Define number of coefficients for all optical surfaces

Define the prescribed image point relationship $T_x(t_x, t_y)$ and $T_y(t_x, t_y)$, where $T_x$ and $T_y$ must be a differentiable function of class $C^h$, where h is the highest order derivative that will be applied Define the design wavelength $\lambda_0$, the initial vertices and eventual rotations $R_i$ of all surfaces, the position and eventual rotation $R_{obj}$ of the object plane $z_0$ (or surface $z_0(t_x, t_y)$) in case of (FOD), the position and eventual rotation $R_{IMA}$ of the image plane D (or surface $D(t_x, t_y)$), whereas all introduced rotation matrices match the defined symmetry case Choose one of the options (A1)-(A4) for the stop of the system; in case of (A2)-(A4), define the rotation matrix $R_A$ according to the defined symmetry case Define the highest combined order of considered aberrations $o_m = (j+k+l+m)$ (see Sec. 1.2)

The number and types of surfaces, the pupil planes, the stop option (A1)-(A4) and order $o_m$ then determine the overall number of equations that are calculated according to Eqs. (4.6)-(4.9)

Choose at least one independent ray aberration coefficient to be zero; for each chosen ray aberration coefficient set to zero, select one surface coefficient to be unknown (and to be calculated later on), whereas said pair(s) of ray aberration and surface coefficient must appear simultaneously in at least one of the derived algebraic equations Any remaining surface coefficient(s) that have not been used to cancel aberrations in the previous step have to be inputted as values to the algebraic equations (manually or via optimization)

The final step is to solve the algebraic system of equations using the computer, in order to obtain as an output at least one surface coefficient for the optical surfaces, all mapping function coefficients, and ray aberration coefficients up to the given combined order. The overall system of (non)-linear equations can be solved simultaneously for all unknown coefficients by using standard methods such as the Newton-Raphson algorithm or others.

In cases where at least one surface is aspherical or freeform, the algebraic system of equations can be divided into non-linear and linear parts of the unknown coefficients, which are then possible to solve consecutively, whereas the linear parts can be solved by using standard methods such as the Gaussian elimination algorithm or others.

In the case of all-aspherical and/or all-freeform systems, only the first combined order results in a non-linear system that is first solved. Any considered higher combined order than one results in linear equations that can be solved consecutively in ascending combined order by using standard methods such as Gaussian elimination algorithm or others.

5. Extended Polychromatic Solution Schemes

So far, all derived methods according to the present invention have only considered a single wavelength $\lambda_0$ in cases of systems with at least one refractive optical surface, whereas the refractive indices have been scalar values depending on the choices of materials. If an extended wavelength domain $\lambda=[\lambda_1, \lambda_2]$ is considered, the refractive index of the lens' materials (like glasses or plastics) becomes a function of the wavelength, that is $n_{i-1,i}=n_{i-1,i}(\lambda)$, or which is referred to as the refractive index distribution of the material. There are three possible methods of how the polychromatic performance of the before defined monochromatic optical design methods according to any of the embodiments of the present invention can be taken into consideration and controlled during the design process for a specified wavelength domain.

5.1 Apply Existing Monochromatic Solution Schemes Using Multiple Lens' Materials This first possible solution is to make use of at least two different lens materials (such as Flint and Crown glasses, for example). The monochromatic design methods from previous sections can be directly used and remain unchanged at a single reference wavelength $\lambda_0$ somewhere within the considered wavelength domain. This solution makes use of the well-known balancing effects of different dispersion relationships for different materials, if chosen properly. The system design is then obtained via one of the previously defined monochromatic design methods by using a polychromatic evaluation (for example ray tracing), where the initial values of the monochromatic design method are selected to ensure a good polychromatic performance for the considered wavelength domain. The selection of materials and/or the initial values of the design method can be automated, for example, by using a polychromatic-based optimization of these initial degrees of freedom.

5.2 Combined Monochromatic Solution Schemes for Multiple Wavelengths

The second possible solution is to use one of the monochromatic design methods of the present invention and to solve the systems of equations simultaneously for at least two (or more) distinct wavelengths $\lambda_{01}, \lambda_{02} \ldots$ within the considered wavelength domain. For all static systems (without zoom), the solution approach is very similar to the zoom systems described in Sec. 3, and comprises:

Instead of multiple zoom configurations, the configurations with Roman numbers index c correspond to multiple wavelength configurations here. For each distinct wavelength $\lambda_{01}, \lambda_{02} \ldots$ the distances $d_i^c$ only contain changed scalar values for each wavelength and different materials (at least two). In contrast to zoom systems, the original positions of all surfaces $f_{i,0}^c = f_{i,0}$ remain constant, as no lens element is moving. Accordingly, Eqs. (3.12)-(3.20) are defined in an identical manner, now for different wavelength configurations. The only further difference is that the functions $T^c = T^c(t) = T(t)$ which provide the ideal relationships between the field angle t (case 1a), or the object coordinate t (case 1b) and the correspondent image points at the image plane or image surface, are typically the same for all wavelength configurations, as the optical system should work the same for all considered wavelengths. The general solution schemes for two (or more) configurations and for systems that can be described by a sequence of spherical and/or aspherical optical surfaces then works exactly as defined in Sec. 3.2, but for wavelengths configurations.

The resulting calculated optical system is nominally free of all ray aberrations (or combinations thereof) for each considered wavelength. If more than one solution does exist (for different initial values), every solution corresponds to a different optical system but nominally fulfilling the same imposed conditions.

In case of achromatized zoom systems for multiple distinct wavelengths, the solution approach is an extension of the monochromatic zoom systems design approach in Sec. 3, e.g. by using two upper Roman indices, but following identical arguments and solution schemes as described before. Similar arguments apply for any rotationally and non-rotationally symmetric system alike.

5.3 Solution Schemes Including Chromatic Aberrations

The third possible solution is to treat the wavelength dependency of a system with at least one refractive surface in terms of well-known chromatic aberrations series expansions in any of the methods according to embodiments of the present invention. As before, the wave aberrations for a certain field angle or point object represent the deviations of its wave front at the exit pupil from being spherical, this time depending on the wavelength as well. Without loss of generality, the object is oriented along the x-axis. The wave aberration function can then be written as $$W(t,r,\theta)=\Sigma_{l=0}^{\infty}\Sigma_{n=1}^{\infty}\Sigma_{m=0}^{\infty}\Sigma_{o=0}^{\infty}a_{(2l+m)nmo}t^{2l+m}r^n\cos^m(\theta)\lambda^o$$

With aberration coefficients $a_{(2l+m)nmo}$, whereas the case o=0 denotes the monochromatic case discussed previously. If all wave aberrations are zero, the wave front is spherical, all rays converge to its center of curvature, and a perfect geometrical point image is obtained for all wavelengths. Similarly, all ray mapping functions and aberration series in x- and y-direction are now expressed as functions of $(q_p, t, \lambda)$ for an arbitrary pupil plane cross section, that is $$u_{i,p}(q_p,t,\lambda)=\Sigma_{m=0}^{\infty}\Sigma_{l=0}^{\infty}\Sigma_{k=0}^{\infty}u_{i,p,k,l,m}q_p^k t^l \lambda^m \quad (8.1)$$

$$v_{i,p}(q_p,t,\lambda)=\Sigma_{m=0}^{\infty}\Sigma_{l=0}^{\infty}\Sigma_{k=0}^{\infty}v_{i,p,k,l,m}q_p^k t^l \lambda^m \quad (8.2)$$

$$\epsilon_{i,p}(q_p,t,\lambda)=\Sigma_{m=0}^{\infty}\Sigma_{l=0}^{\infty}\Sigma_{k=0}^{\infty}\epsilon_{i,p,k,l,m}q_p^k t^l \lambda^m \quad (8.3)$$

$$\epsilon_{y,p}(q_p,t,\lambda)=\Sigma_{m=0}^{\infty}\Sigma_{l=0}^{\infty}\Sigma_{k=0}^{\infty}\epsilon_{y,p,k,l,m}q_p^k t^l \lambda^m \quad (8.4)$$

The mathematical description of the surfaces remains as defined previously. All distances $d_i$ are expressed accordingly, now with the refractive indices $n_{i-1,i}=n_{i-1,i}(\lambda)$ as functions of the wavelength (for example using the Sellmeier equation or others). The ideal image point (T(t), 0, D) is defined as in Sec. 2, as it should not depend on the wavelength typically, but could be also a function $T(t,\lambda)$ if a specific dispersion at the image side is desired. Fermat's principle can be applied as done in Sec. 2, leading to two sets of differential equations like Eqs. (2.3) and (2.4), but with the use of expressions (8.1)-(8.4) here. Again, an individual aperture stop/pupil plane can be treated exactly as introduced in Sec. 3 by using the cross product.

Algebraic Equations:

Following similar arguments as in Sec. 2, the coefficients of the power series of functions $u_{i,p}$, $v_{i,p}$ and $f_{i,j}$ are calculated in an arbitrary pupil plane cross section by evaluating equations $$\lim_{q_p \to 0} \lim_{t \to 0} \lim_{\lambda \to \lambda_0} \frac{\partial^k}{\partial q_p^k} \frac{\partial^l}{\partial t^l} \frac{\partial^m}{\partial \lambda^m} D_{ix} = 0 \ (i = 1. \ .n \text{ or } n+1) \quad (8.5)$$

$$\lim_{q_p \to 0} \lim_{t \to 0} \lim_{\lambda \to \lambda_0} \frac{\partial^k}{\partial q_p^k} \frac{\partial^l}{\partial t^l} \frac{\partial^m}{\partial \lambda^m} D_{iy} = 0 \ (i = 1. \ .n \text{ or } n+1) \quad (8.6)$$

The initial reference wavelength $\lambda_0$ is typically selected somewhere within the wavelength domain $\lambda=[\lambda_1,\lambda_2]$.

Achromatic Aberration Orders:

The original sequence of aberrations $\epsilon_{x,1}$, $\epsilon_{x,y,2}$, $\epsilon_{x,3}$, $\epsilon_{y,3} \ldots \epsilon_{x,p}$, $\epsilon_{y,p}$ (ordered as specified in Sec. 1) describes the monochromatic aberrations at the reference wavelength $\lambda_0$ as before. The dependency on the wavelength is introduced through additional aberrations $\epsilon_{x,1}^{\lambda^m}$, $\epsilon_{x,y,2}^{\lambda^m}$, $\epsilon_{x,3}^{\lambda^m}$, $\epsilon_{y,3}^{\lambda^m} \ldots \epsilon_{x,p}^{\lambda^m}$, $\epsilon_{y,p}^{\lambda^m}$ per considered order m of chromatic aberrations. The first order in $\lambda$ is described by the same sequence of aberrations where all elements are multiplied by a term $\partial\lambda$. Similarly, the second order in $\lambda$ corresponds to a sequence of aberrations where all elements are multiplied by a term $\partial\lambda^2$. In general, for the $m^{th}$ order in $\lambda$, all elements of the original sequence of aberrations are multiplied by a term $\partial\lambda^m$.

For almost all imaging systems, it is typically sufficient to correct few aberration coefficients with linear dependency on the wavelength (m=1). For this case, the general solution schemes are given in the following two subsections. For all higher orders (m≥2), the solution schemes can be derived in a very similar manner, and for all design methods disclosed in this invention, including zoom and non-rotationally symmetric systems.

5.3.1 General Solution Schemes for Achromatic Rotationally Symmetric Optical Systems The design processes comprise all defined steps from Sec. 2 with only few adjustments: the aberration coefficients to be zero are now selected according to Sec. 5.3 from $\epsilon_{x,1}^{\lambda^m}$, $\epsilon_{x,y,2}^{\lambda^m}$, $\epsilon_{x,3}^{\lambda^m}$, $\epsilon_{y,3}^{\lambda^m} \ldots \epsilon_{x,p}^{\lambda^m}$, $\epsilon_{y,p}^{\lambda^m}$ (for m=0 and 1) for a given number of degrees of freedom for the chosen aspherical and/or spherical surfaces. The calculations from Secs. 5.1-5.3 are extended to include the chromatic aberrations (for m=1), and adapted by using Eqs. (8.1)-(8.6).

The resulting calculated optical systems are nominally free of all monochromatic and chromatic ray aberrations (or combinations thereof) that have been selected. If more than one solution exists, every solution corresponds to a different optical system nominally fulfilling the same imposed conditions.

5.3.2 General Solution Schemes for Achromatic Rotationally Symmetric Optical Zoom Systems The design processes comprise the description of Sec. 3.1 and all defined steps from Sec. 3.2 with only few adjustments: the matrices elements are now defined and selected for at least two different zoom configurations from $\epsilon_{x,1}^{\lambda^m}$, $\epsilon_{x,y,2}^{\lambda^m}$, $\epsilon_{x,3}^{\lambda^m}$, $\epsilon_{y,3}^{\lambda^m} \ldots \epsilon_{x,p}^{\lambda^m}$, $\epsilon_{y,p}^{\lambda^m}$ (for m=0 and 1) according to Secs. 3.1 and 5.3 for a given number of degrees of freedom for the chosen aspherical and/or spherical surfaces. Eqs. (8.1)-(8.4) are extended by the upper index c for (at least two) different zoom configurations and Eqs. (8.5)-(8.6) can be then used to calculate all power series coefficients for each zoom configuration. The calculations from Secs. 7.1-7.3 are extended accordingly to include the chromatic matrix/ces (for m=1), and adapted by using Eqs. (8.1)-(8.6).

The resulting calculated optical zoom systems are nominally free of all monochromatic and chromatic ray aberrations (or combinations thereof) that have been selected for each considered zoom configuration. If more than one solution exists, every solution corresponds to a different optical system nominally fulfilling the same imposed conditions.

6. Additional System Features

The following features and possible extensions apply to all previous embodiments of the invention.

6.1 Afocal Systems

An afocal system (without a focus) is a system that does not yield any net convergence or divergence of fields for an object at infinity, and thus forming an image at infinity. Its properties are described by the angular and lateral magnifications $M_\alpha$ and $M_L$. The angular magnification $\tan(\alpha_{in})=M_\alpha \tan(\alpha_{out})$ links the incoming and outgoing field angles (object to image relationship), whereas the lateral magnification $M_L=h_{in}/h_{out}$ links the object and image ray heights with respect to the optical axis. Afocal systems impose (1) minor changes and (2) further conditions to the previously described methods:

(1) The last distance $d_{n+1}$ is expressed the same way as $d_1$ for an infinite object distance when deriving the differential equations. The normal vector of the outgoing wave front in $d_{n+1}$ is related to the ingoing wave front defined by the angle $t=\alpha_{in}$ through the angular magnification.

(2) Fulfilling a defined lateral magnification requires additional conditions that relate the mapping functions $u_{1,p}$ and $v_{1,p}$ on the first surface to the mapping functions $u_{n,p}$ and $v_{n,p}$ on the last surface, that is (a) $u_{1,p}=M_L u_{n,p}$ and (b) $v_{1,p}=M_L v_{n,p}$.

These two equations are added to the original differential equations, and then solved as described in the previous sections.

6.2 Telecentric Systems

An imaging system is telecentric in object space and/or image space, if the chief rays of all fields are parallel to the optical axis in front and/or behind the optical system. Thus, the object and/or the image has to be at a finite distance. Telecentric systems impose one additional condition per telecentric space that are added to the original set of differential equations for the x-component:

(1) In object space: the mapping function on the first surface has to fulfill $u_{1,1}=t$ (2) In image space: the mapping function on the last surface has to fulfill $u_{n,1}=T(t)$ This is because both conditions need to be fulfilled only in a single cross section of the pupil plane cross section, for example, the tangential plane, as all chief rays pass through the center of the pupil plane. The equation(s) for the telecentric condition are added to the original sets of differential equations. They only depend on the object variable t without depending on the pupil variable $p_q$ and are therefore closely related to distortion and treated together. For each nominally cancelled distortion aberration in ascending order, it is possible to fulfill one or both conditions by selecting one or two corresponding surfaces coefficients for each considered order. The additional equation(s) are added to the original sets of differential equations, and then solved as described in the previous sections.

6.3 Mirror-Based or Catadioptric Imaging Systems

So far, for all refractive optical systems, the condition $f_{i+1}(0) > f_i(0)$ has been required. If at least one reflection occurs, this condition is not necessary anymore. In case of one (or multiple) reflective surfaces, the $f_i(0)$ values define the sequence of any lens-mirror-based optical system. Besides the changes in the surface vertices sequence, the sets of differential equations are solved as described in the previous sections. The same treatment can be used for surfaces where total internal reflection (TIR) occurs.

6.4 Odd-Order Surface Coefficients

Typically, rotationally symmetric surfaces are described by only even order surface coefficients in r. With the introduction of odd order surface coefficients, that is $$f_i(x, y) = \sum_{j=0}^{N_i} \frac{1}{(j)!} f_{i,j} r^j$$

in the most general case, it is possible to adapt the methods described in the previous sections accordingly.

6.5 Surface Vertices as Design Parameters

In some cases, it can prove beneficial to make use of at least one of the surface vertices $f_{i,0}$ to cancel nominally at least one aberration term. This applies for all the methods described in the previous sections accordingly.

6.6 Calculate Aberrations for Known Systems

In general, if all surfaces coefficients are given, all derived solution schemes allow calculating the ray aberrations analytically. Conversely, any method that allows calculating aberrations can be used to set certain aberrations to zero and calculate the unknown surfaces coefficients accordingly, as shown in this invention.

Suppose that all surface coefficients $f_{i,j}$ for a system consisting of N refractive surfaces are well defined and given, the proposed power series methods enable to calculate all (mono)-chromatic aberration coefficients in ascending combined aberration orders. This applies for all possible systems, including but not limited to static or zoom (non)-rotationally symmetric systems.

Suppose that all coefficients $f_i$ for a zoom system consisting of N refractive surfaces are well defined and given, the proposed power series method enables to calculate all aberration coefficients $\epsilon_{x,p,k,l}^c$ and $\epsilon_{y,p,k,l}^c$ for all zoom configurations, for arbitrary pupil plane cross sections and in ascending aberration order. The same arguments apply for static and zoom systems where chromatic imperfections are evaluated according to Sec. 5.2 (monochromatic aberrations at different wavelengths) and 5.3 (chromatic aberrations).

The solutions schemes to calculate ray aberration coefficients for a known optical system follows always the solution schemes for all-aspherical systems. As all surface coefficients are known (spherical and/or aspherical), all essential matrix elements (see FIG. 9) are applied order by order and for all required planes. The resulting systems of equations for each combined aberration order are always linear in the mapping and aberration coefficients and can be solved using for example Gaussian elimination. For each combined aberration order, eventual zoom configuration and wavelength(s), the corresponding derivatives for each combined order is applied to $D_{i,x}$ and $D_{i,y}$ accordingly, and the resulting linear system of equations is solved. This calculation is repeated with incremented combined aberration order until the maximum order $o_m$ (typically not higher than 20) is reached. As the result, all ray mapping functions and ray aberration coefficients up to that order are calculated for any given system according to any of the embodiments of the present invention. In contrast, prior art direct calculation methods are only able to calculate a limited number of low order aberration coefficients (typically up to $3^{rd}$ order). For higher orders, ray tracing is required to calculate the values of the aberration coefficients. The fully known aberrations up to high orders can be used to estimate the imaging quality of the optical system or as a figure of merit for optimization. Furthermore, it is possible to evaluate derivatives of the aberration coefficients with respect to surfaces coefficients, which provides a direct measure of the impact of said coefficients on individual aberrations.

7. Alternative Embodiment

In an alternative embodiment, a method of the present invention further comprises the step of applying partial derivatives of order k, l to the two sets of $N_s$ differential equations, said orders k, l being provided by using pre-defined aberration matrices for each pupil plane cross section, wherein each pre-defined aberration matrix associates each optical ray aberration of the subgroup to a partial derivative of order k, l of the ray aberration series expansion in said pupil plane cross section, thereby deriving a system of equations for the optical surfaces coefficients and the ray mapping functions coefficients.

7.1 Matrix Selection Rules for Arbitrary Pupil Plane Cross Sections

There are, for example two general types of surfaces according to Eqs. (2.1) and (2.2). Polynomial (aspherical) surfaces that are described by one series coefficient per even order in r, and spherical surfaces that are described by a single variable, the radius of curvature, that appears in every even order in r. Any rotationally symmetric system can consist of a combination of these two types of surfaces described as $A_A S_S$, where indices A and S represent the number of each surface type, respectively.

In an embodiment, the following matrix element selection rules apply for all matrices $\epsilon_{x,p}$ and $\epsilon_{y,p}$:

Each aspherical surface with index i and highest order $2N_i$ allows selecting maximally one black-font matrix element per available coefficient $f_{i,2j}$, where the even number 2j has to be equal to the combined order plus one of this matrix element $\partial q_p^a \partial t^b$, that is $2j = a+b+1$.

In case one aspherical surface (with index $i_0$) acts as the stop (A1), this allows to select maximally one black-font matrix element per available coefficient $f_{i_0,2j}$, where $2j = a+1$ is fulfilled.

Each spherical surface described by a radius of curvature R allows selecting maximally one individual black-font matrix element $\partial q_p^a \partial t^b$.

In case one spherical surface (with index $i_0$) acts as the stop (A1), this allows to select maximally one black-font matrix element, where $a \neq 0$ is fulfilled.

In this embodiment, the following matrix elements consistency rules apply for all pupil plane cross sections (and thus, all grouped matrices $[\epsilon_{x,1}], [\epsilon_{x,y,2}], [\epsilon_{x,3}, \epsilon_{y,3}] \ldots [\epsilon_{x,p}, \epsilon_{y,p}]$):

For each selected black-font matrix element $\partial q_p^a \partial t^b$ in a pupil plane cross section, each neighboring black-font matrix element with indices (a−2, b) and (a, b−2) has to be selected as well, if it does exist.

In this further embodiment of the present invention, the following matrix elements distribution rules apply for a given system $A_p S_q$ and for matrices $\epsilon_{x,1}, \epsilon_{x,y,2}, \epsilon_{x,3}, \epsilon_{y,3} \ldots \epsilon_{x,p}, \epsilon_{y,p}$ (ordered as specified in the present specification):

The maximum number of matrix elements can be fully used to select only elements from the tangential plane matrix $\epsilon_{x,1}$ according to the selection and consistency rules.

The maximum number of matrix elements can be distributed among the ordered matrices according to the selection and consistency rules. Then, the highest combined order (a+b) of selected matrix elements for each row and each column from matrix $\epsilon_{x/y,p}$ (with $p \geq 2$), cannot exceed the highest combined order for each respective row and column of the preceding matrix.

These selection rules, consistency rules and distribution rules are, in a preferred embodiment according to the present invention, implemented in the computer based method.

7.3 Solution Schemes for Rotationally Symmetric Optical Systems

Here, further solution schemes are derived for all lens systems that can be described by a sequence of aspherical and/or spherical optical surfaces, described by $A_A S_S$, and for example S-A-A-S- . . . to indicate the order. For all rotationally symmetric optical systems, the design process comprises the following steps:

Specify the imaging system as case 1a or 1b with an infinite (IOD) or finite (FOD) object distance.

Define the ideal image point relationship T(t) according to Eq. (2.6). The function T(t) must be a differentiable function of class $C^h$, where h is the highest order derivative that will be applied.

Define the number of surfaces $A_A S_S$, their order and the materials from object to image space.

Define the initial positions of surfaces vertices $f_{i,0}$, the position of the object plane $z_0$ (or surface $z_0(t)$), the position of the image plane D (or surface D(t)) and the design wavelength $\lambda_0$.

Choose one of the options (A1)-(A4) for the aperture stop or surface as the stop of the system.

Specify the number of available surface coefficients $f_{i,j}$ (j=2, 4, . . . ) for each aspherical surface.

Choose matrix elements according to selection, consistency and distribution rules.

The number and type of surfaces, the chosen stop option (A1)-(A4) and the selection of matrix elements then determine the overall number of corresponding equations that can be calculated according to Eqs. (3.3)-(3.7).

7.4 General Solution Scheme for all Aspherical Systems ($A_A S_0$)

A further method according to an embodiment of the present invention provides a general solution scheme for all aspherical systems.

In case of all aspherical surfaces systems, the calculation scheme follows the orders $o_d$ of the diagonals of the selected elements from the derivative matrix or matrices, which is the $1^{st}, 3^{rd}$ . . . $o_m^{th}$ order, up to the highest combined order $o_m = (a+b)$ according to Sec. 4. The general solution is calculated in ascending order (d=1, 3 . . . ) for $o_1, o_3$ . . . until $o_m$ is reached, by repeating the following calculation routine:

(1) The selected matrix or matrices elements of the $o_d^{th}$ diagonal are applied to the CEQ through Eqs. (3.6) and (3.7), and lead to a nonlinear (d=1) or linear (d>1) system of equations for surface coefficients $f_{i,d+1}$, MACs $\epsilon_{x,p,k,l}$ and $\epsilon_{y,p,k,l}$ and mapping coefficients $u_{i,p,k,l}$ and $v_{i,p,k,l}$.

(2) All appearing MACs $\epsilon_{x,p}$ and $\epsilon_{y,p}$ are set to zero. The number of available surface coefficients $f_{i,d+1}$ minus the number of selected matrix/ces elements gives the number of coefficients $f_{i,d+1}$ that needs to be predefined as initial values. The number of the remaining unknown coefficients $f_{i,d+1}$, $u_{i,p,k,l}$ and $v_{i,p,k,l}$ is then equal to the number of equations, and the (non)linear system of algebraic equations can be solved for the unknown coefficients $f_{i,d+1}$, $u_{i,p,k,l}$ and $v_{i,p,k,l}$.

(3) If there are selected matrix elements $\partial q_p^a \partial t^b$ (with d=a+b) that correspond to grey-font matrix elements with the same indices in any of the other considered matrices and planes, these grey-font matrix elements are applied to the CEQ through Eqs. (3.6) and/or (3.7), and lead to a (non)linear system of equations for mapping coefficients $u_{i,p,k,l}$ and/or $v_{i,p,k,l}$ that can be solved.

Once the highest order $o_m$ has been solved, the calculation routine stops. As the selected matrix/ces elements directly correspond to MACs of the same orders that have all been set to zero, the resulting calculated optical system is nominally free of all ray aberrations (or combinations thereof) that are associated with these MACs. If more than one solution exists (e.g. for different initial values), every solution corresponds to a different optical system but nominally fulfilling the same imposed conditions.

7.5 General Solution Scheme for all Spherical Systems ($A_0 S_S$)

In an embodiment according to the present invention, the general solution scheme for all spherical systems is hereby described.

In case of all spherical surfaces systems, the calculation scheme is as follows:

(1) All selected matrix or matrices elements are applied to the CEQ through Eqs. (3.6) and (3.7), and lead to a first nonlinear system of equations for surface coefficients $R_i$, MACs of $\epsilon_{x,p}$ and $\epsilon_{y,p}$ and mapping coefficients $u_{i,p,k,l}$ and $v_{i,p,k,l}$. All appearing MACs $\epsilon_{x,p,k,l}$ and $\epsilon_{y,p,k,l}$ are set to zero.

(2) The number of available radii $R_i$ minus the number of selected matrix/ces elements gives the number of coefficients $R_i$ that needs to be predefined as initial values. The number of remaining unknown coefficients $R_i$, $u_{i,p,k,l}$ and $v_{i,p,k,l}$ is then equal to the number of equations (in (1)).

(3) If there are selected matrix elements $\partial q_p^a \partial t^b$ (with d=a+b) that correspond to grey-font matrix elements with the same indices in any of the other considered matrices and planes, these grey-font matrix elements are applied to the CEQ through Eqs. (3.6) and/or (3.7), and lead to a second nonlinear system of equations for $R_i$ and mapping coefficients $u_{i,p,k,l}$ and/or $v_{i,p,k,l}$, that is added to the first system of equations.

(4) The overall combined system of nonlinear equations can be solved simultaneously for all unknown coefficients $R_i$, $u_{i,p,k,l}$ and $v_{i,p,k,l}$, typically by using numerical solvers.

(5) The resulting calculated optical system is nominally free of all ray aberrations (or combinations thereof) that are associated with the vanishing MACs through the selected and applied matrix/ces elements. If more than one solution exists, every solution corresponds to a different optical system but nominally fulfilling the same imposed conditions.

7.6 General Solution Scheme for Systems with Aspherical and Spherical Surfaces Combined ($A_A S_S$)

In another embodiment according to the present invention, the present invention provides a general solution method for systems with aspherical and spherical surfaces combined.

In case of "mixed" surfaces systems, the calculation scheme is a modified combination of the two calculation schemes in Sec. 7.4 and 7.5 and works as follows:

(1) Identify the highest combined order $o_S$ where at least one matrix element has been selected for a spherical surface. All selected matrix or matrices elements up to this combined order $o_S$ then form a subgroup of selected matrix or matrices elements.

(2) All elements of this subgroup are applied to the CEQ through Eqs. (3.6) and (3.7), and lead to a first nonlinear system of equations for surface coefficients $R_i$, $f_{i,j}$, MACs of $\epsilon_{x,p}$ and $\epsilon_{y,p}$ and mapping coefficients $u_{i,p,k,l}$ and $v_{i,p,k,l}$. All MACs $\epsilon_{x,p,k,l}$ and $\epsilon_{y,p,k,l}$ are set to zero.

(3) The number of available variables $R_i$ plus $f_{i,j}$ in this subgroup minus the number of selected matrix/ces elements of this subgroup gives the number of coefficients $R_i$ and/or $f_{i,j}$ that needs to be predefined as initial values. The number of remaining unknown coefficients $R_i$, $f_{i,j}$, $u_{i,p,k,l}$ and $v_{i,p,k,l}$ is then equal to the number of equations (for the subgroup in (2)).

(4) If there are selected matrix elements $\partial q_p^a \partial t^b$ (with d=a+b) in the sub-group that correspond to grey-font matrix elements with the same indices in any of the other considered matrices and planes, these grey-font matrix elements are applied to the CEQ through Eqs. (3.6) and/or (3.7), and lead to a second nonlinear system of equations for $R_i$, $f_{i,j}$, $u_{i,p,k,l}$ and $v_{i,p,k,l}$, that is added to the first system of equations.

(5) The overall combined system of equations for the subgroup can be solved simultaneously for all unknown coefficients $R_i$, $f_{i,j}$, $u_{i,p,k,l}$ and $v_{i,p,k,l}$, typically by using numerical solvers.

(6) Once the subgroup that contained all matrix/ces elements related to spherical surfaces is solved, the eventually remaining unknown aspherical surfaces coefficients are calculated following the exact solution scheme defined in section 7.4, in ascending order, starting at $d=o_s+2$ until the maximum combined order $o_m$ (from aspherical matrix elements) is reached.

As before, the resulting calculated optical system is nominally free of all ray aberrations (or combinations thereof) that are associated with the MACs through the selected and applied matrix/ces elements. If more than one solution exists, every solution corresponds to a different optical system nominally fulfilling the same imposed conditions.

In another embodiment according to the present invention, the method can further be applied for the calculation of rotationally symmetric optical zoom systems, as hereby described.

7.7 General Description of Rotationally Symmetric Optical Zoom Systems

As in Sec. 2, such optical systems are characterized by a sequence of N refractive optical elements that are aligned along a common optical axis z. In a zoom system, the surface shapes in Eqs. (2.1) and (2.2) remain unchanged; however, the coefficients $f_{i,0}$ are not constant but can vary and need to be specified for at least two different specified zoom positions. In case of zoom systems, the surfaces are described by $$f_i^c(x, y) = \sum_{j=0}^{N_i} \frac{1}{(2j)!} f_{i,2j}^c r^{2j} = f_{i,0}^c + \frac{1}{2} x^2 f_{i,2}^c + \frac{1}{2} y^2 f_{i,2}^c + \ldots \quad (6.1)$$

where c indicates different zoom configurations in Roman numbers I, II . . . and where the position of each surface $f_i^c(x, y)$ can be shifted to different lateral positions $f_{i,0}^c$. The definition of the ray mapping functions in Eqs. (2.3) and (2.4) remains the same, except for an added index c to indicate different zoom configurations, that means ($u_{i,p}^c$, $v_{i,p}^c$) in x- and y-direction are defined in an arbitrary pupil plane cross section as $$u_{i,p}^c(q_p, t) = \Sigma_{l=0}^{\infty} \Sigma_{k=0}^{\infty} u_{i,p,k,l}^c q_p^k t^l \quad (6.2)$$

$$v_{i,p}^c(q_p, t) = \Sigma_{l=0}^{\infty} \Sigma_{k=0}^{\infty} v_{i,p,k,l}^c q_p^k t^l \quad (6.3)$$

with series coefficients $u_{i,p,k,l}^c$ and $v_{i,p,k,l}^c$. Likewise, the ray aberration functions $\epsilon_{x,p}$ and $\epsilon_{y,p}$ are expressed as series expansions of variables ($q_p$, t) for each zoom configuration and pupil plane cross section as $$\epsilon_{x,p}^c(q_p, t) = \Sigma_{l=0}^{\infty} \Sigma_{k=0}^{\infty} \epsilon_{x,p,k,l}^c q_p^k t^l \quad (6.4)$$

$$\epsilon_{y,p}^c(q_p, t) = \Sigma_{l=0}^{\infty} \Sigma_{k=0}^{\infty} \epsilon_{y,p,k,l}^c q_p^k t^l \quad (6.5)$$

With the from now on called "configuration matrix aberration coefficients" (CMACs) $\epsilon_{x,p,k,l}$ and $\epsilon_{y,p,k,l}$.

All distances $d_1^c \ldots d_{n+1}^c$ are calculated as done previously in Sec. 2 for an IOD or FOD case, only this time the calculations are repeated for each zoom configuration, indicated by index c. In both cases, the image can be on a plane where $D^c$ is constant (but eventually shifted for each zoom configuration), or on a shaped image surface where $D^c=D^c(t)$. The real image point is then given by the ideal image point ($T^c(t)$, 0, $D^c$) plus the aberration power series terms in x- and y-direction, again for each defined zoom configuration $$\begin{aligned}(h_x^c, h_y^c, D^c) &= (T^c(t), 0, D^c) + (\epsilon_x^{c,(1)}, \epsilon_y^{c,(1)}, 0) + \\ &\quad (\epsilon_x^{c,(3)}, \epsilon_y^{c,(3)}, 0) + (\epsilon_x^{c,(5)}, \epsilon_y^{c,(5)}, 0) + \ldots \\ &= (T^c(t), 0, D^c) + (\epsilon_x^c, \epsilon_y^c, 0)\end{aligned} \quad (6.6)$$

The functions $T^c=T^c(t)$ provide the ideal relationships between the field angle t (case 1a), or the object coordinate t (case 1b) and the correspondent image points at the image plane or image surface for each zoom configuration. For example in case 1a, the image functions $T^c(t)=f_L^c \cdot \tan(t)$ correspond to a distortion-free imaging of different fields with field angle t at their image points ($T^c(t)$, 0, $D^c$), where the different zoom configurations correspond to different effective focal lengths $f_L^c$. In case 1b, the image functions $T^c(t)=M^c \cdot t$, for example, describe different magnifications $M^c$ for different zoom configurations.

Following Sec. 2, Fermat's principle can be applied in sections to each defined zoom configuration to calculate two sets of differential equations from object to image space $$D_{ix}^c = \partial_{u_{i,p}^c}(d_i^c + d_{i+1}^c) = 0 (i=1 \ldots n) \quad (6.7)$$

$$D_{iy}^c = \partial_{v_{i,p}^c}(d_i^c + d_{i+1}^c) = 0 (i=1 \ldots n) \quad (6.8)$$

for each zoom configuration, indicated by the added index c. The different pupil plane options (A1-A4) are treated as previously. This means, if the $i^{th}$ surface is the pupil stop for a given zoom configuration ($u_{i,p}^c$, $v_{i,p}^c$, $f_i^c(u_{i,p}^c, v_{i,p}^c)$) is replaced by ($q_{p,x}$, $q^{p,y}$, $f_i^c(q_{p,x}, q_{p,y})$) in all differential equations (6.7) and (6.8). If an individual aperture stop A is added, its z-coordinate $z_A^c$ defines the position of the pupil plane for each zoom configuration which can also shift. The three individual pupil plane options (A2-A4) are treated as before by using the cross product, leading to additional equations per differential equation component x and y, and per zoom configuration.

Conditional Equations:

The coefficients of the Taylor series of functions $u_{i,p}^c$, $v_{i,p}^c$ and $f_i^c$ can be calculated by evaluating equations $$\lim_{q_p \to 0} \lim_{t \to 0} \frac{\partial^k}{\partial q_p^k} \frac{\partial^l}{\partial t^l} D_{ix}^c = 0 \ (i = 1. \ .n \text{ or } n+3) \quad (6.9)$$

$$\lim_{q_p \to 0} \lim_{t \to 0} \frac{\partial^k}{\partial q_p^k} \frac{\partial^l}{\partial t^l} D_{iy}^c = 0 \ (i = 1. \ .n \text{ or } n+3, \text{ and } p \geq 2) \quad (6.10)$$

in a specific order for all defined zoom configurations following an adapted set of selection rules. Equations (6.9) and (6.10) are referred to as "configuration conditional equations" (CCEQ) from now on and can be directly linked to the aberration derivatives matrices as before, but now for different zoom configurations. That means, Eqs. (6.9) correspond to the x-components in a given pupil plane cross section (matrices $\epsilon_{x,p}^c$), and (6.10) correspond to the y-components in a given pupil plane cross section (matrices $\epsilon_{y,p}^c$), for each zoom configuration. Each zoom configuration has a sequence of matrices as defined in Sec. 1. The individual relationships between applied matrix elements and leading coefficients of the different functions remain the same, except for the added index c for different zoom configurations. As before, all series coefficients $u_{i,p,k,l}^c$ and $v_{i,p,k,l}^c$ that are not linked through these matrices are zero due to symmetry.

7.8 Matrix Selection Rules:

All previously defined selection, consistency and distribution (SCD) rules in Sec. 2.2 remain valid for each individual zoom configuration. Now, the overall degrees of freedom of the spherical/aspherical surfaces of a given zoom system Z: $A_A S_S$ can be distributed among different zoom configurations and among different pupil plane cross section matrices. For each specified zoom configuration (at least two), at least one matrix element(s) can be selected according to the SCD rules, whereas the maximum overall number of selected matrix elements across all zoom configurations is limited by the overall degrees of freedom of the aspherical and spherical surfaces that are used.

8. Solution Schemes for Rotationally Symmetric Optical Zoom Systems

Here, the solution schemes using embodiments of the method according to the present invention are derived for all zoom lens systems that can be described by a sequence of spherical and/or aspherical optical surfaces, described by Z: $A_A S_S$, and for example S-A-S-A-S- . . . to indicate the order. For all rotationally symmetric optical systems, the design process comprises the following steps:

Specify the imaging system as case 1a or 1b with an infinite (IOD) or finite (FOD) object distance.

Define two or more zoom configurations described by index c=I, II . . . .

Define the ideal image point relationships $T^c(t)$ according to Eq. (6.6). The functions $T^c(t)$ must be differentiable functions of class $C^h$, where h is the highest order derivative that will be applied. For IOD, this can be for example different focal lengths $f_L^c$ for all defined zoom configurations. For FOD, this can be for example different magnifications $M^c$ for all defined zoom configurations.

Define the number of surfaces Z: $A_A S_S$, their order and the materials from object to image space.

Define the initial positions of all surfaces for all zoom configurations, that is all optical surface vertices $f_{i,0}^c$, the position(s) of the object plane $z_0^c$ (or surface $z_0^c(t)$), the position(s) of the image plane $D^c$ (or surface $D^c(t)$) and the design wavelength $\lambda_0$.

Choose one of the options (A1)-(A4) for the aperture stop or surface as the pupil of the system.

Specify the number of available surface coefficients $f_{i,j}$ (j=2, 4, . . . ) for each aspherical surface.

Choose matrices elements according to SCD rules defined in Secs. 2.2 and 3.1 for each defined zoom configurations with at least one selected matrix element per zoom configuration.

The number and type of surfaces, the chosen stop option (A1)-(A4), the number of zoom configurations and the selection of matrices elements then determine the overall number of corresponding equations that can be calculated according to Eqs. (6.7)-(6.10).

8.1 General Solution Scheme for all Aspherical Zoom Systems (Z: $A_A S_0$)

In case of all aspherical surfaces zoom systems, the calculation scheme using embodiments of the method according to the present invention is closely related to Sec. 7.4 and follows the orders $o_d^{th}$ of the diagonals of the selected elements from the derivative matrices for all different zoom configurations. The general solution is then calculated for all zoom configurations where matrix elements have been selected in ascending order (d=1, 3 . . . ) for $o_1^c$, $o_3^c$ . . . until $o_m^c$ is reached (for at least one zoom configuration), by repeating the following calculation routine:

(1) The selected matrix or matrices elements of the $o_d^c$ diagonal(s) are applied to the CCEQ through Eqs. (6.9) and (6.10), and lead to a nonlinear (d=1) or linear (d>1) system of equations for surface coefficients $f_{i,d+1}$, CMACs of $\epsilon_{x,p}$ and $\epsilon_{y,p}$ and mapping coefficients $u_{i,p,k,l}^c$ and $v_{i,p,k,l}^c$.

(2) All appearing CMACs $\epsilon_{x,p,k,l}$ and $\epsilon_{y,p,k,l}$ are set to zero. The number of available surface coefficients $f_{i,d+1}$ minus the number of selected matrix/ces elements gives the number of coefficients $f_{i,d+1}$ that needs to be predefined as initial values. The number of the remaining unknown coefficients $f_{i,d+1}$, $u_{i,p,k,l}^c$ and $v_{i,p,k,l}^c$ is equal to the number of equations, and the (non)linear system of equations can be solved for the unknown coefficients $f_{i,d+1}$, $u_{i,p,k,l}^c$ and $v_{i,p,k,l}^c$.

(3) If there exist selected matrix elements $\partial q_p^a \partial t^b$ (with d=a+b) that correspond to grey-font matrix elements with the same indices in any of the other considered matrices for the same zoom configuration, these grey-font matrix elements are applied to the CCEQ through Eqs. (6.9) and/or (6.10), and lead to a (non)linear system of equations for mapping coefficients $u_{i,p,k,l}^c$ and/or $v_{i,p,k,l}^c$ that can be solved for each zoom configuration.

Once the highest order $o_m^c$ is reached, the calculation routine stops. As the selected matrices elements directly correspond to CMACs of the same orders that have been set to zero, the resulting calculated optical zoom system is nominally free of all ray aberrations (or combinations thereof) that are associated with these CMACs for the considered zoom configurations. If more than one solution exists (e.g. for different initial values), every solution corresponds to a different optical zoom system but nominally fulfilling the same imposed conditions.

8.2 General Solution Scheme for all Spherical Zoom Systems (Z: $A_0S_S$)

In case of all spherical surfaces systems, the calculation scheme using embodiments of the method according to the present invention is closely related to Sec. 7.5 and is as follows:

(1) All selected matrix or matrices elements are applied to the CCEQ through Eqs. (6.9) and (6.10), and lead to a first system of equations for surface coefficients $R_i$, CMACs of $\epsilon_{x,p}{}^c$ and $\epsilon_{y,p}{}^c$ and mapping coefficients $u_{i,p,k,l}{}^c$ and $v_{i,p,k,l}{}^c$. All CMACs $\epsilon_{x,p,k,l}{}^c$ and $\epsilon_{y,p,k,l}{}^c$ are set to zero.

(2) The number of available radii $R_i$ minus the number of selected matrix/ces elements gives the number of coefficients $R_i$ that needs to be predefined as initial values. The number of remaining unknown coefficients $R_i$, $u_{i,p,k,l}{}^c$ and $v_{i,p,k,l}{}^c$ is then equal to the number of equations (in (1)).

(3) For each zoom configuration, if there are selected matrix elements $\partial q_p{}^a \partial t^b$ (with d=a+b) that correspond to grey-font matrix elements with the same indices in any of the other considered matrices (different pupil plane cross sections), these grey-font matrix elements are applied to the CCEQ through Eqs. (6.9) and/or (6.10), and lead to a second nonlinear system of equations for $R_i$ and mapping coefficients $u_{i,p,k,l}{}^c$ and/or $v_{i,p,k,l}{}^c$, that is added to the first system of equations.

(4) The overall combined system of equations can be solved simultaneously for all unknown coefficients $R_i$, $u_{i,p,k,l}{}^c$ and $v_{i,p,k,l}{}^c$.

The resulting calculated optical zoom system is nominally free of all ray aberrations (or combinations thereof) that are associated with the vanishing CMACs for each considered zoom configuration through the selected and applied matrices elements. If more than one solution exists, every solution corresponds to a different optical system but nominally fulfilling the same imposed conditions.

8.3 General Solution Scheme for Zoom Systems, Aspherical & Spherical Surfaces Combined (Z: $A_AS_S$)

In the case of "mixed" surfaces zoom systems, the calculation scheme using embodiments of the method according to the present invention is closely related to Sec. 7.6, as a modified combination of the calculation schemes in Sec. 8.1 and 8.2 that works as follows:

(1) Identify the highest combined order $o_S{}^c$ where a single matrix element has been selected for a spherical surface for at least one of the zoom configurations. All selected matrices elements up to this combined order of for all zoom configurations then form a subgroup of selected elements.

(2) All elements of this subgroup are applied to the CCEQ through Eqs. (6.9) and (6.10), and lead to a first nonlinear system of equations for surface coefficients $R_i$, $f_{i,j}$, CMACs of $\epsilon_{y,p}{}^c$ and $\epsilon_{y,p}{}^c$ and mapping coefficients $u_{i,p,k,l}{}^c$ and $v_{i,p,k,l}{}^c$. The CMACs $\epsilon_{x,p,k,l}{}^c$ and $\epsilon_{y,p,k,l}{}^c$ are set to zero.

(3) The number of available variables $R_i$ plus $f_{i,j}$ in this subgroup minus the number of selected matrix/ces elements of this subgroup gives the number of coefficients $R_i$ and/or $f_{i,j}$ that needs to be predefined as initial values. The number of remaining unknown coefficients $R_i$, $f_{i,j}$, $u_{i,p,k,l}{}^c$ and $v_{i,p,k,l}{}^c$ is then equal to the number of equations (for the subgroup in (2)).

(4) For each zoom configuration, if there are selected sub-group matrix elements $\partial q_p{}^a \partial t^b$ (with d=a+b) that correspond to grey-font matrix elements with the same indices in any of the other considered matrices (different pupil plane cross sections), these grey-font matrix elements are applied to the CCEQ through Eqs. (6.9) and/or (6.10), and lead to a second nonlinear system of equations for $R_i$, $f_{i,j}$, $u_{i,p,k,l}{}^c$ and/or $v_{i,p,k,l}{}^c$, that is added to the first system of equations.

(5) The overall combined system of equations of the subgroup can be solved simultaneously for all unknown coefficients $R_i$, $f_{i,j}$, $u_{i,p,k,l}{}^c$ and $v_{i,p,k,l}{}^c$, typically using numerical solvers.

(6) Once this subgroup that contains all matrix elements related to spherical surfaces is solved, the eventually remaining aspherical surfaces coefficients are calculated following the exact solution scheme defined in Sec. 8.1, in ascending order starting at $d=o_S{}^c+2$ until the maximum combined order $o_m{}^c$ (from aspherical matrix/ces elements for at least one zoom configuration) is reached.

As before, the resulting calculated optical zoom system is nominally free of all ray aberrations (or combinations thereof) that are associated with the CMACs for each considered zoom configuration through the selected and applied matrices elements. If more than one solution exists, every solution corresponds to a different optical zoom system nominally fulfilling the same imposed conditions.

EXAMPLES

The following examples illustrate various designs, which have been calculated using a method according to embodiments of the present invention.

Example 1: $A_0S_6$ Cooke Triplet

Figure 10:
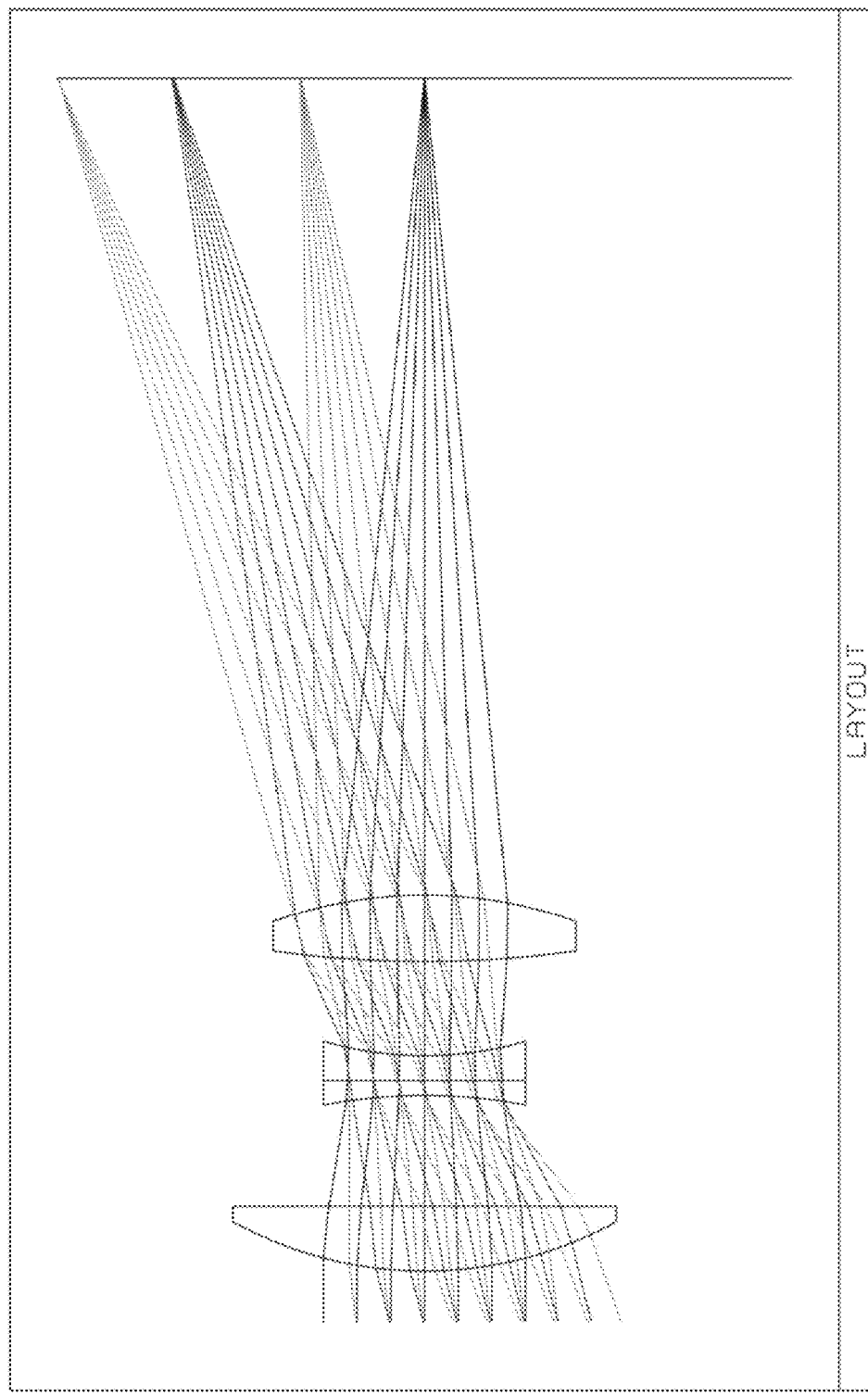
FIG. 10 shows the optical layout of a Cooke triplet obtained with the method of the present invention.

The optical design of the Cooke triplet obtained with a method according to the present invention is illustrated in FIG. 10.

The System specifications comprise: IOD, $f_L$=50 mm, F/#=5, 40° FFOV, designed for $\lambda_0$=587.56 nm.

The aberrations to be nominally cancelled by a method according to the present invention are two $1^{st}$ order and four $3^{rd}$ order aberrations in tangential plane. The six surface curvatures (radii) have been calculated together with the related mapping functions coefficients by solving the derived nonlinear system of equations using for example the Newton-Raphson method (NRM).

Lens Data:

| # | Type | Curvature | Thickness | Glass | Semi-Diameter |
|---|------|-----------|-----------|-------|---------------|
| OBJ | STANDARD | 0 | Infinity | | 0 |
| 1 | STANDARD | 0 | 2.5 | | 9.75380 |
| 2 | STANDARD | 0.05064 | 3.20634 | SK16 | 9.50000 |
| 3 | STANDARD | −0.00046 | 5.48499 | | 9.50000 |
| 4 | STANDARD | −0.03783 | 0.74697 | F2 | 5.00000 |
| STOP | STANDARD | 0.00000 | 1.22965 | F2 | 3.85566 |
| 6 | STANDARD | 0.05565 | 4.67249 | | 5.00000 |
| 7 | STANDARD | 0.01836 | 3.29917 | SK16 | 7.50000 |
| 8 | STANDARD | −0.04555 | 40.46451 | | 7.50000 |
| IMA | STANDARD | 0 | 0 | | 18.20285 |

Figure 11:
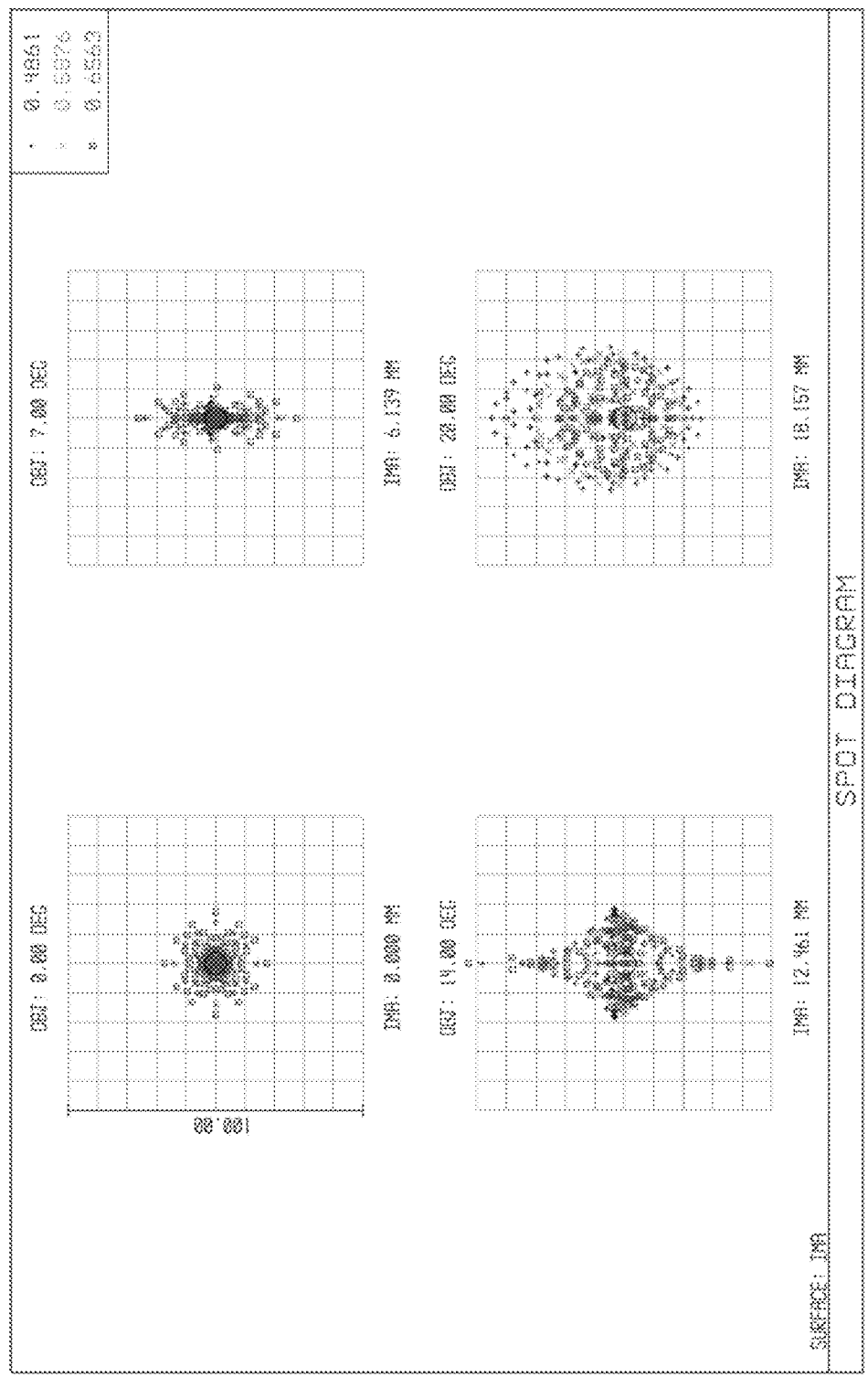
FIG. 11 shows the spot diagram associated with the Cooke triplet layout of FIG. 10 obtained with the method of the present invention.

FIG. 11 shows the spot diagram associated to the optical layout of the Cooke triplet. As known by the skilled person, the spot diagram gives indication of the image of a point object. In the absence of aberrations, a point object will converge to a perfect image point. The spot diagram is shown for three different wavelengths 486.1 nm, 587.6 nm and 656.3 nm. The result has been obtained without any prior knowledge of the Cooke triplet put into the calculations. The obtained result is performing very similarly to known examples in literature and performs equally good or better after a standard optimization in an optical design program.

Example 2: $A_0S_8$ Wide-Angle Lens

Figure 12:
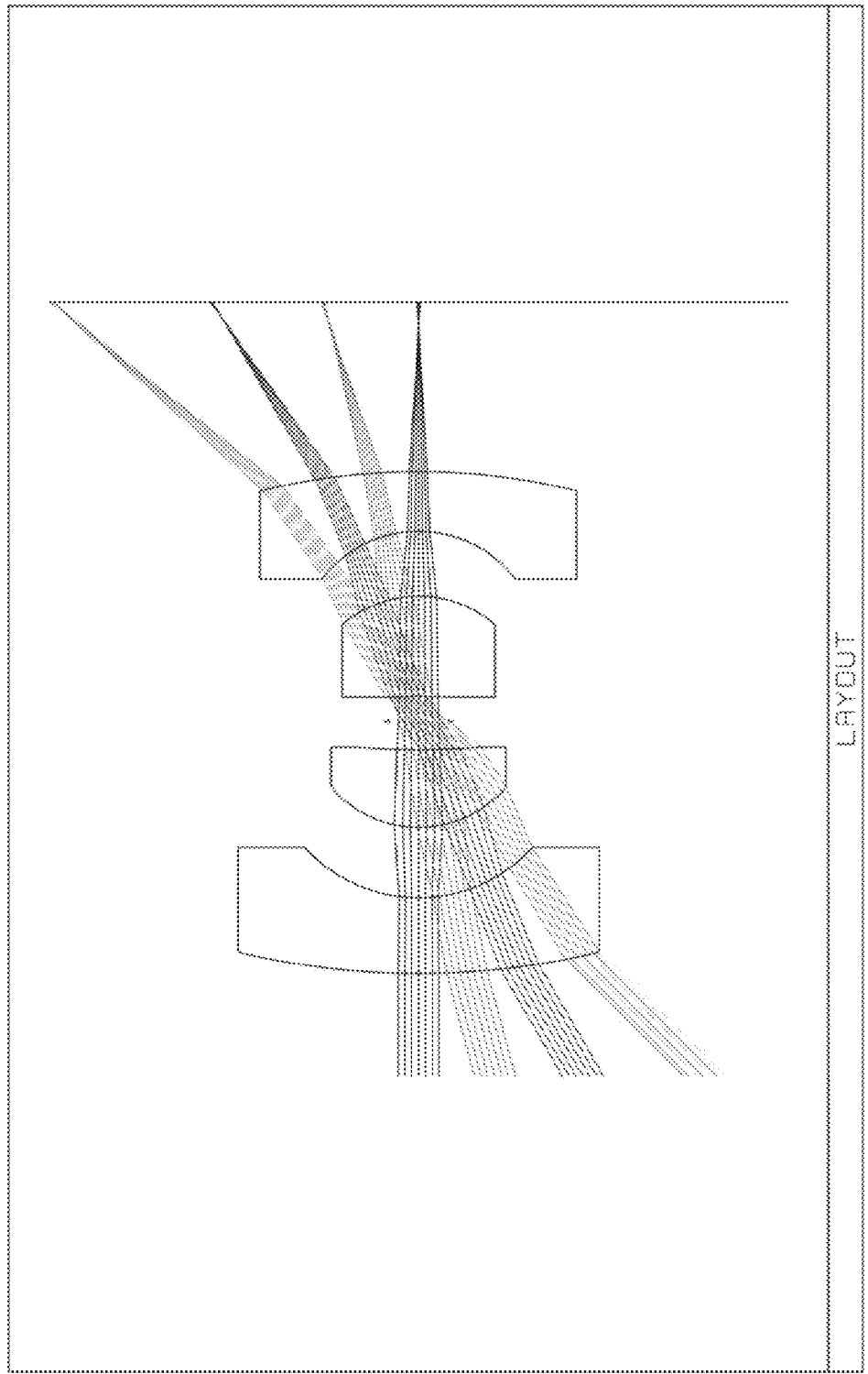
FIG. 12 shows the optical layout of a wide-angle lens obtained with the method according to the present invention.

The optical design of a wide angle lens obtained with a method according to the present invention is illustrated on FIG. 12.

The system specifications are the following: IOD, $f_L$=3.5 mm, F/#=8, 90° FFOV, designed for $\lambda_0$=587.56 nm The aberrations to be nominally cancelled by the method of the present invention are the following: $\partial t^l$ and $\partial q_1 t^{l-1}$ for l=1, 3, 5, 7 (tangential plane). The eight surface curvatures (radii) have been calculated together with the related mapping functions coefficients by solving the derived nonlinear system of equations using the NRM.

Lens Data:

| # | Type | Curvature | Thickness | Glass | Semi-Diameter |
|---|---|---|---|---|---|
| OBJ | STANDARD | 0 | Infinity | | 0 |
| 1 | STANDARD | 0 | 1.00000 | | 2.97903 |
| 2 | STANDARD | 0.13444 | 0.74130 | POLYCARB | 1.76628 |
| 3 | STANDARD | 0.66282 | 0.69130 | | 1.11301 |
| 4 | STANDARD | 0.88629 | 0.75560 | COC | 0.85664 |
| 5 | STANDARD | 0.13969 | 0.28130 | | 0.60689 |
| STOP | STANDARD | 0 | 0.24480 | | 0.29047 |
| 7 | STANDARD | -0.17572 | 0.98040 | COC | 0.33339 |
| 8 | STANDARD | -0.89501 | 0.63120 | | 0.74739 |
| 9 | STANDARD | -0.82912 | 0.58760 | POLYCARB | 0.95122 |
| 10 | STANDARD | -0.15886 | 1.65710 | | 1.54923 |
| IMA | STANDARD | 0 | 0 | | 3.60739 |

Figure 13:
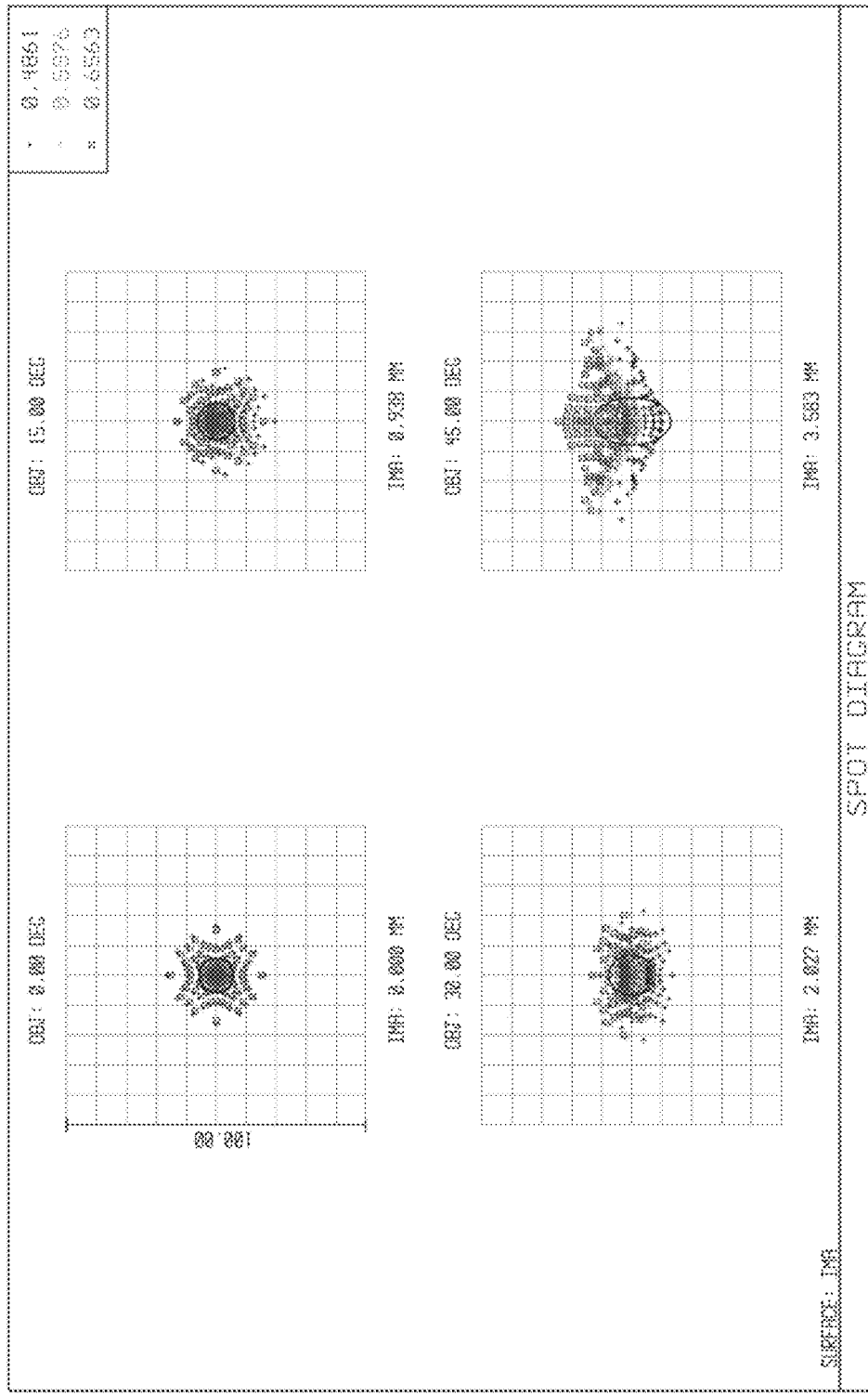
FIG. 13 shows the spot diagram associated with the wide-angle lens of FIG. 12 obtained with the method according to the present invention.

FIG. 13 shows the spot diagram associated to the optical layout of the design. The spot diagram is shown for three different wavelengths 486.1 nm, 587.6 nm and 656.3 nm.

The selected aberrations $\partial t^l$ and $\partial q_1 \partial t^{l-1}$ lay a focus on the angular dependent terms to cancel. It is important to emphasize that this distinct aberration cancellation is impossible to achieve with any of the prior art direct design methods. The present selection ensures a very well balanced performance throughout the full field of view of 90° (as seen in FIG. 13). In a final step, the speed of the lens can be increased (lower f-number) and a standard optimization in an optical design program provides the final system layout. With only two design steps, time, effort and costs can be largely reduced.

Figure 14:
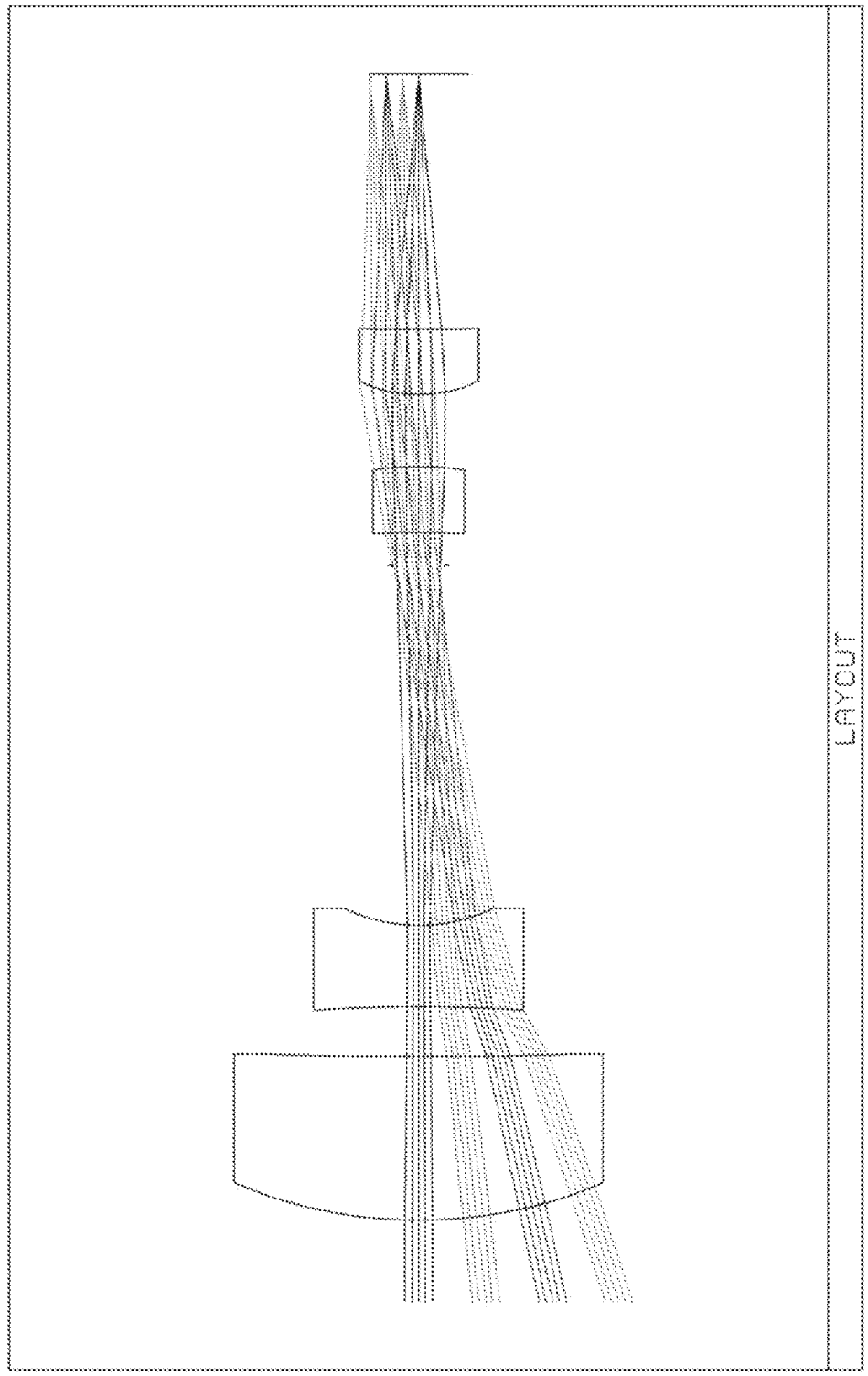
FIG. 14 shows the optical layout of a zoom lens with fixed final image position and overall length of the system obtained with the method according to the present invention.
Figure 15:
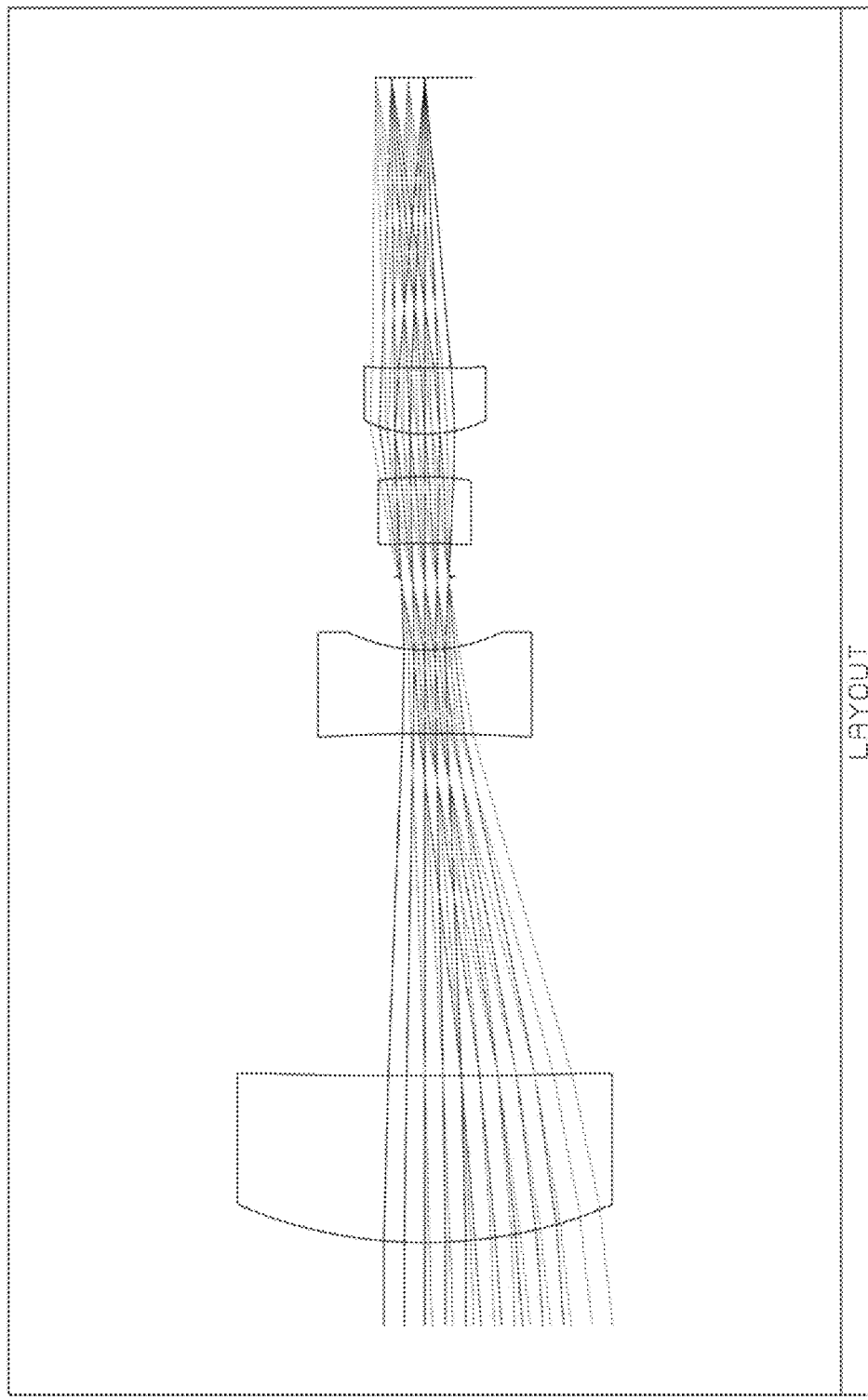
FIG. 15 shows a second optical layout of the zoom lens with fixed final image position and overall length of the system obtained with the method according to the present invention.

Example 3: $A_8S_0$ Zoom Lens with Fixed Final Image Position and Overall Length of the System FIGS. 14 and 15 illustrate two optical configurations of a zoom lens with fixed final image position obtained with a method according to an embodiment of the present invention.

The system specifications are as follows: IOD, F/#=5.6, designed for $\lambda_0$=587.56 nm, total track length 70 mm
Zoom configuration 1: $f_L$=9.24 mm
Zoom configuration 2: $f_L$=27.72 mm (3 times $f_{L1}$)

The aberrations to be nominally cancelled by the method of the present invention for each zoom configuration, respectively are the following two $1^{st}$ order aberrations (non-linear system solved using NRM) plus $\partial t^l$, $\partial q_1 \partial^{l-1}$, $\partial q_1^2 \partial t^{l-2}$, $\partial q_1^3 \partial t^{l-3}$ for l=3, 5 (linear systems of equations), resulting in an overall of 20 aberrations that are nominally cancelled Lens Data [Configuration 1]:

| # | Type | Curvature | Thickness | Glass | Semi-Diameter | 4th order | 6th order |
|---|---|---|---|---|---|---|---|
| OBJ | STANDARD | 0 | Infinity | | 0 | 0 | 0 |
| 1 | STANDARD | 0 | 5.00000 | | 13.04739 | 0 | 0 |
| 2 | EVENASPH | 0.03324 | 10.00000 | K7 | 11.24753 | 4.913E-06 | 1.380E-08 |
| 3 | EVENASPH | 0.00087 | 3.00216 | | 9.24129 | 1.239E-05 | 1.851E-08 |
| 4 | EVENASPH | -0.00971 | 5.00000 | F2 | 6.41658 | -3.125E-05 | 5.681E-07 |
| 5 | EVENASPH | 0.09928 | 21.99784 | | 4.62056 | -1.539E-04 | 2.916E-07 |
| STOP | STANDARD | 0 | 2.00000 | | 1.57088 | 0 | 0 |
| 7 | EVENASPH | -0.02686 | 4.00000 | F2 | 2.07735 | -9.164E-04 | 2.749E-07 |
| 8 | EVENASPH | -0.04429 | 4.41878 | | 2.77463 | -7.703E-04 | -1.987E-06 |
| 9 | EVENASPH | 0.11122 | 4.00000 | K7 | 3.63394 | 2.594E-04 | 7.352E-06 |
| 10 | EVENASPH | -0.01492 | 15.58122 | | 3.41396 | 9.342E-04 | 1.455E-05 |
| IMA | STANDARD | 0 | 0 | | 3.03607 | 0 | 0 |

Zoom Configurations Thickness Changes:

| # | Configuration 1 | Configuration 2 |
|---|---|---|
| 3 | 3.00216 | 20.58425 |
| 5 | 21.99784 | 4.41575 |
| 8 | 4.41878 | 2.56780 |
| 10 | 15.58122 | 17.43220 |

Figure 16:
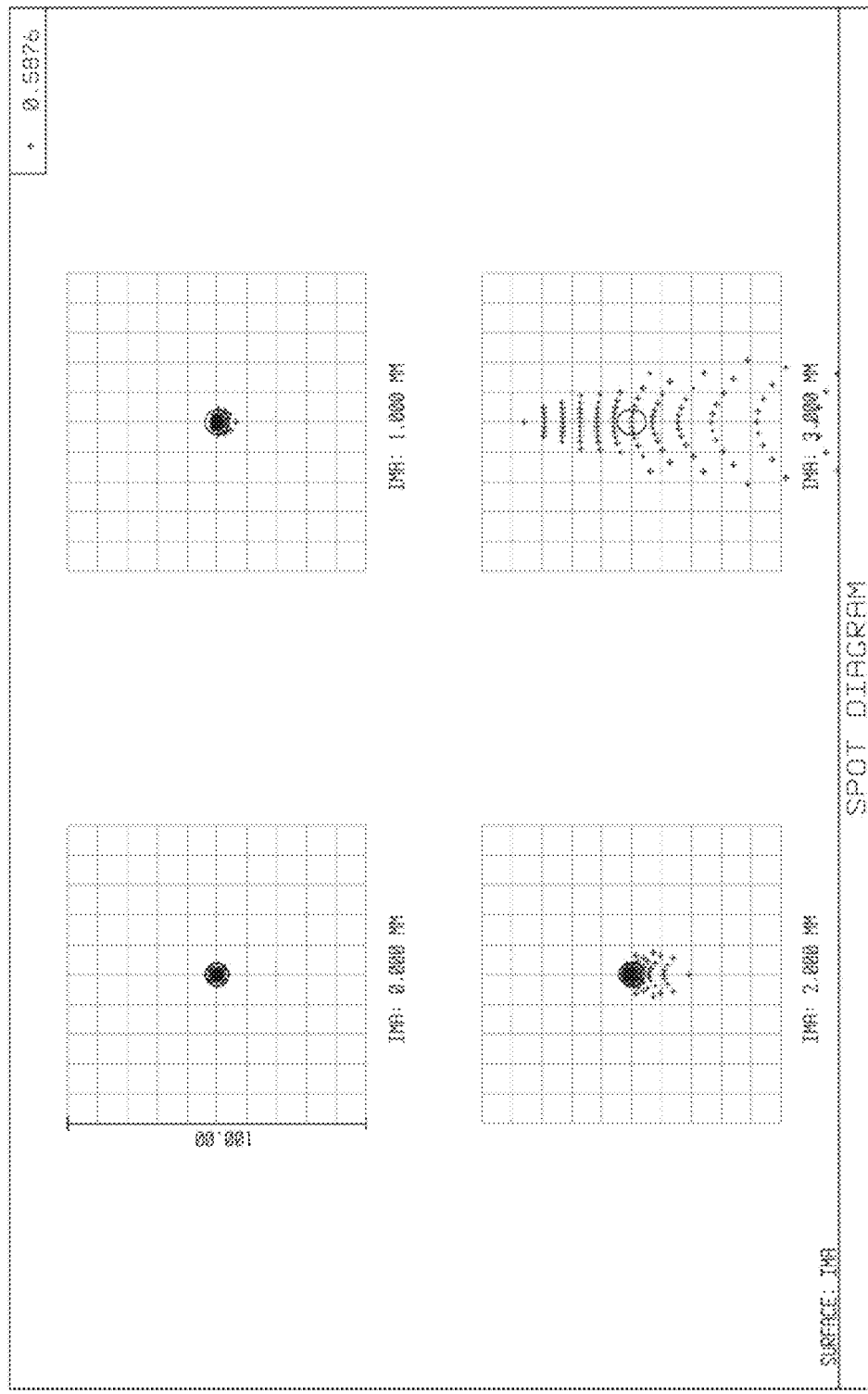
FIG. 16 shows the spot diagram associated with the zoom lens of FIG. 14 obtained with the method according to the present invention.
Figure 17:
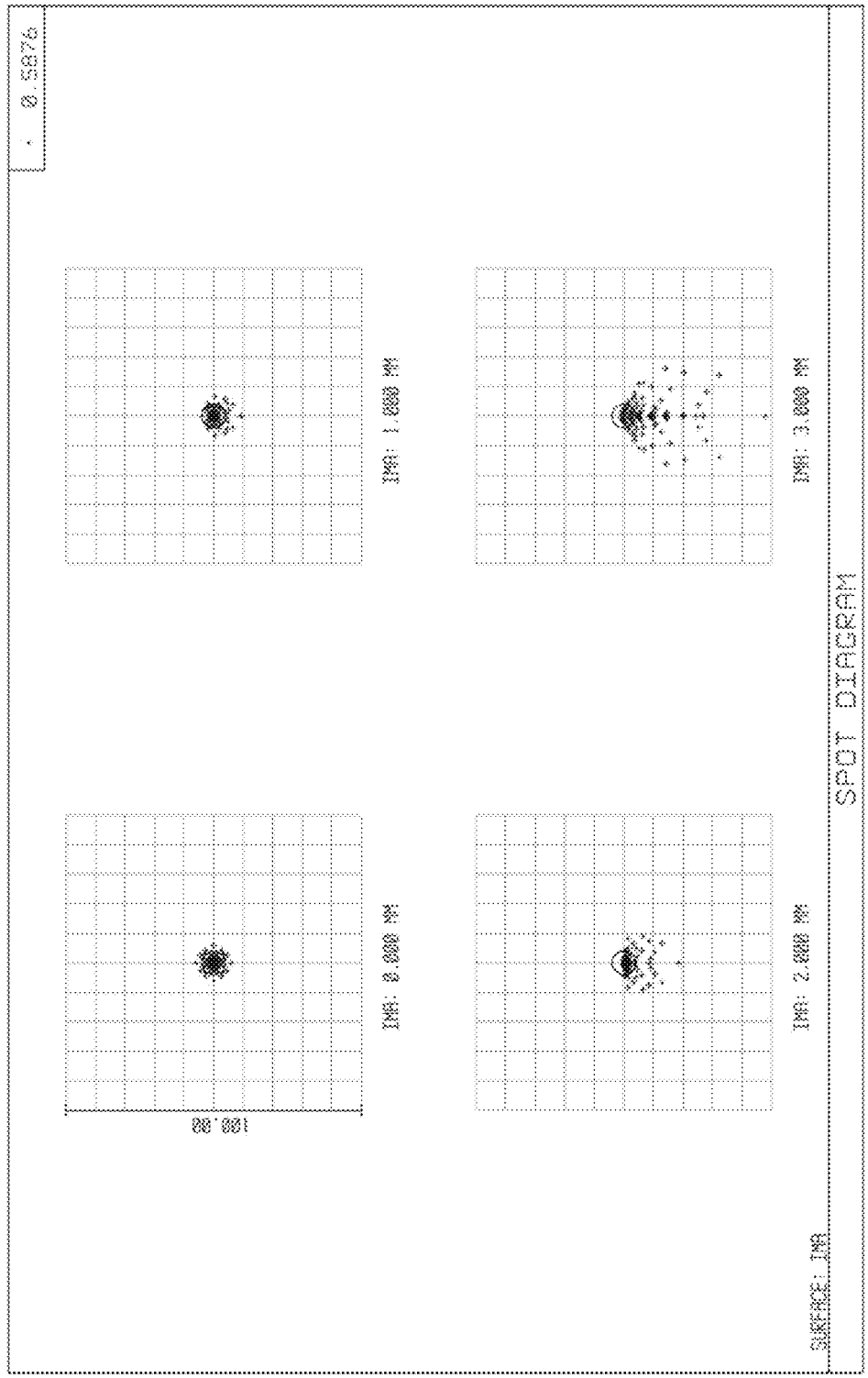
FIG. 17 shows the spot diagram associated with the second zoom lens of FIG. 15 obtained with the method according to the present invention.

The spot diagram of the first and second zoom configurations are illustrated on FIGS. 16 and 17 respectively for a wavelength of 587.6 nm. Already at this stage, the spot diagrams show a quite balanced performance as an immediate result of the calculations.

The selected 20 aberrations (10 per zoom configuration) to cancel are significantly more aberrations than the existing prior art direct design solutions for zoom systems are capable of cancelling. The number of cancelled aberrations could be even further increased for l=7, 9 . . . if desired. The calculated solution provides an excellent starting point at two defined zoom stages in a single calculation scheme, something impossible to achieve with any prior art design method. In a final step, the speed of the lens can be increased (lower f-number) and the overall performance can be balanced using a standard multi-configuration optimization in an optical design program to reach a final zoom system layout. The streamlined design process allows reducing design time, effort and thus costs.

Example 4: $A_4S_0$ Hastings Triplet

Figure 18:
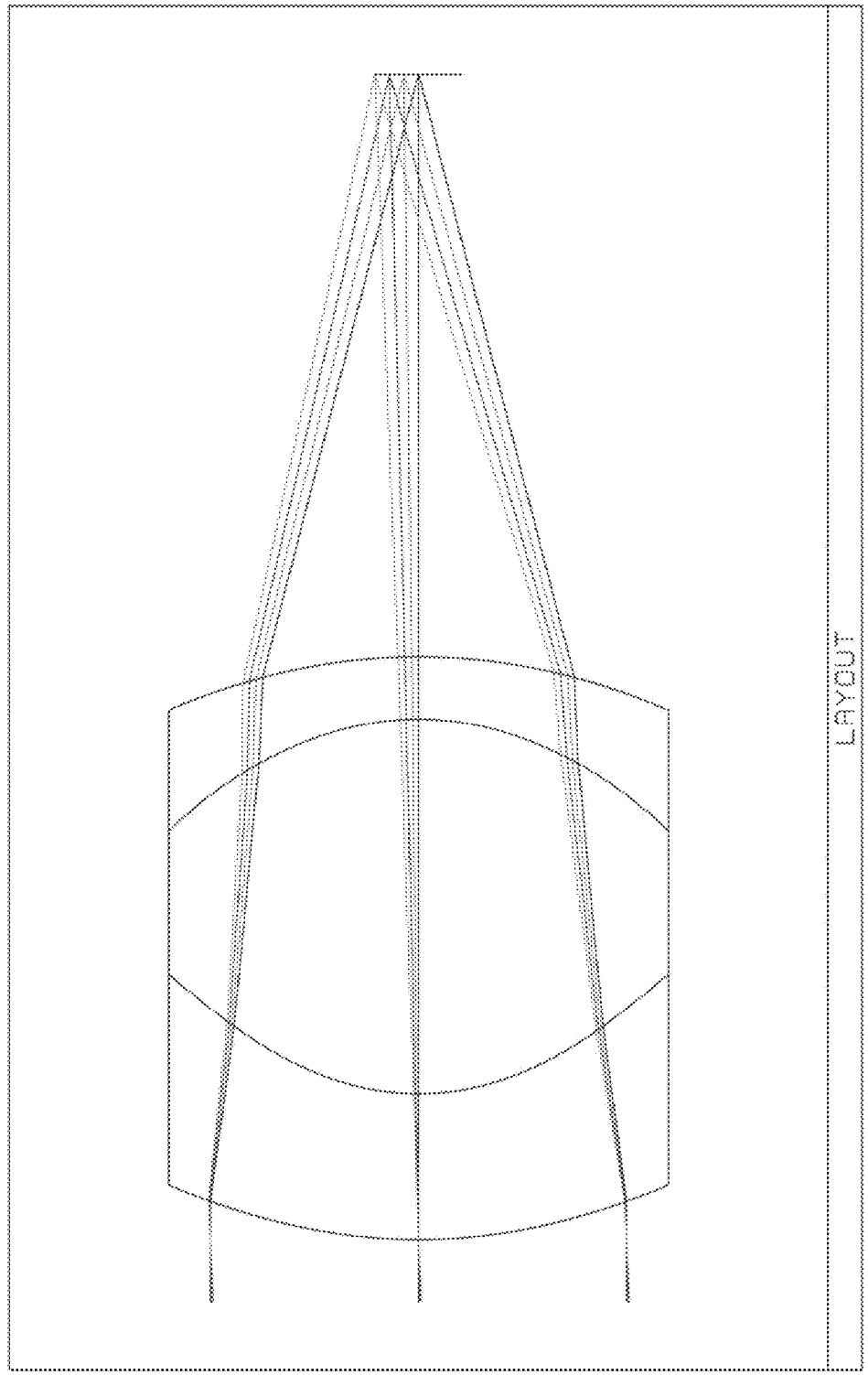
FIG. 18 shows the optical layout of an all-aspherical Hastings triplet obtained with the method according to the present invention.

FIG. 18 shows the optical layout of a Hastings triplet obtained with an embodiment of the method according to the present invention.

The system parameters are as follows IOD, $f_L=20$ mm, F/#=2, 6° FFOV, designed for $\lambda_0=554.2$ nm The aberrations to be nominally cancelled by the method of the present invention are: $\partial q_1^k$, $\partial dq_1^{k-1}\partial t$, $\partial q_1^k\partial\lambda$ and $\partial q_1^{k-1}\partial t\partial\lambda$ for k=1, 3, 5, 7, 9, 11 (tangential plane). All 24 surfaces coefficients ($2^{nd}$ to $12^{th}$ order) have been calculated together with the related mapping functions coefficients using NRM in case of the non-linear system ($1^{st}$ order) and Gaussian elimination in case of the linear systems for all higher orders.

Lens Data:

| # | Type | Thickness | Glass | 2nd order | 4th order | 6th order | 8th order | 10th order | 12th order |
|---|---|---|---|---|---|---|---|---|---|
| OBJ | STANDARD | Infinity | | 0 | 0 | 0 | 0 | 0 | 0 |
| 1 | STANDARD | 1.5 | | 0 | 0 | 0 | 0 | 0 | 0 |
| STOP | EVENASPH | 3.5 | F2 | 0.0375 | −2.380E−05 | −3.795E−07 | −2.473E−09 | −1.167E−11 | −2.050E−14 |
| 3 | EVENASPH | 9.0 | K7 | 0.0817 | 1.005E−04 | −1.992E−06 | −4.431E−08 | −6.034E−10 | −5.896E−12 |
| 4 | EVENASPH | 1.5 | F2 | −0.0746 | 2.096E−04 | −5.732E−06 | 2.746E−08 | −1.024E−09 | 3.405E−12 |
| 5 | EVENASPH | 14.0 | | −0.0358 | 4.637E−05 | −1.332E−06 | 1.222E−08 | −1.341E−10 | 7.216E−13 |
| IMA | STANDARD | 0.0 | | 0 | 0 | 0 | 0 | 0 | 0 |

Figure 19:
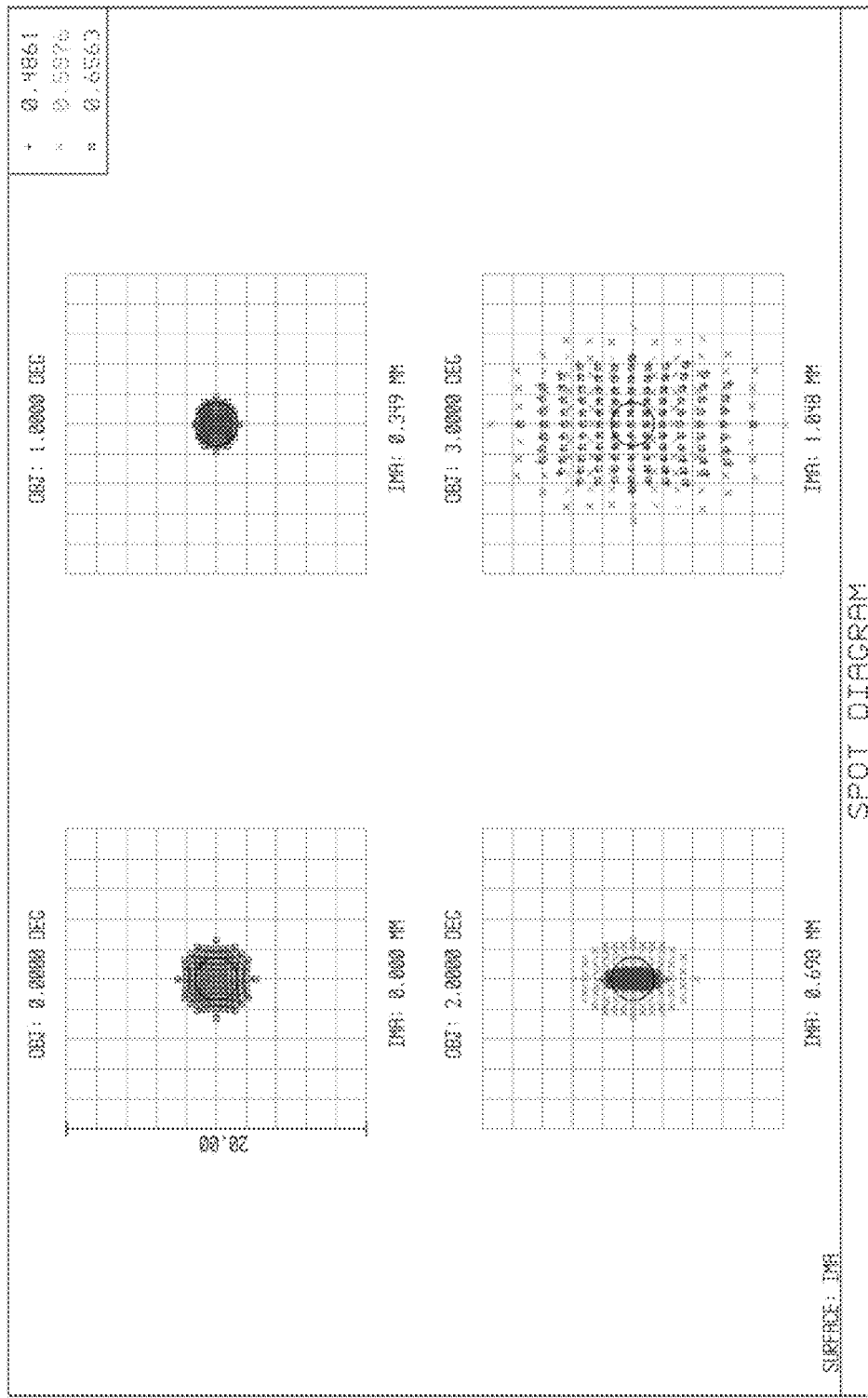
FIG. 19 shows the spot diagram associated with the Hastings triplet obtained with the method according to the present invention.

The spot diagram associated to the optical design obtained with the present invention is shown on FIG. 19 for wavelengths 486.1 nm, 587.6 nm and 656.3 nm.

Figure 20:
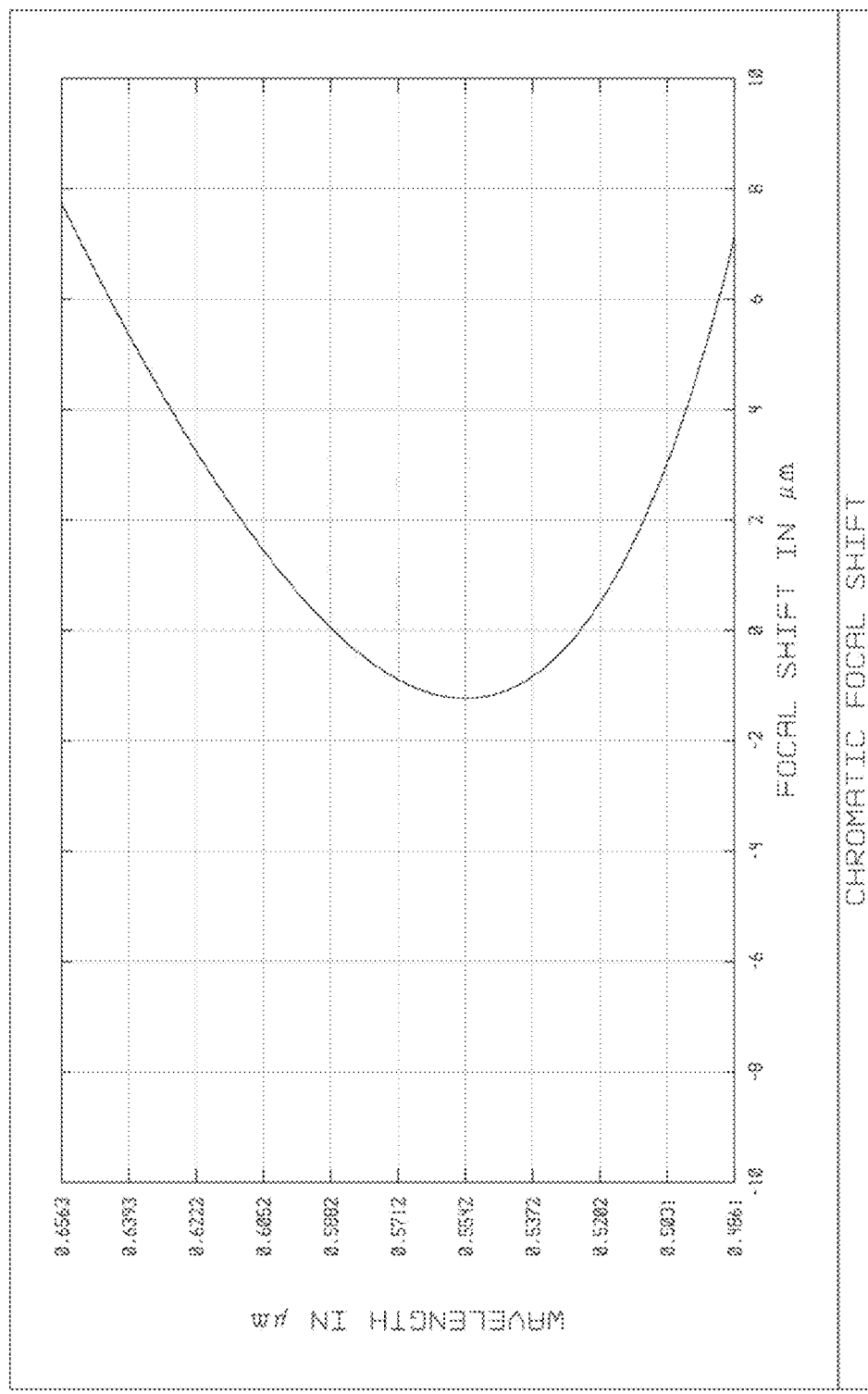
FIG. 20 illustrates the chromatic focal shift obtained with the Hastings triplet obtained with the method according to the present invention.

FIG. 20 further illustrates the shift of the focus in μm as a function of the wavelength in μm.

Example 5: Three Mirrors Imager with Freeform Surfaces

System parameters: IOD, $f_L=600$ mm, F/#=3, 4° FFOV

Nominally cancelled aberrations $\epsilon_{x,j,k,l,m}$ and $\epsilon_{y,j,k,l,m}$ for all indices pairs (j,k,l,m)≥0 with l+m≤1 and j+k+l+m≤5 (aplanatic condition, no spherical aberration, no linear field dependency in x, y)

Out of the 40 surfaces coefficients (without vertices), 38 coefficients have been calculated together with the related mapping functions coefficients. The input comprises the focal lengths in x and y (here, 600 mm), the surfaces and image plane vertex positions, and the curvatures in x and y on mirror 2.

Tilt/Decenter values:

The first mirror is rotated by −16.665° degree about the y-axis (same angle back after surface)

The second mirror is decentered by 218.55 mm in x-direction

The second mirror is rotated by −11.237° degree about the y-axis (same angle back after surface)

The third mirror is decentered by 82.382 mm in x-direction

The third mirror is rotated by −1.2052° degree about the y-axis (same angle back after surface)

The image plane is decentered by 122.48 mm in x-direction

The image plane is rotated by 0.012043° degree about the y-axis (same angle back after surface)

Mirror Data

| # | Type | Radius | Thickness | Material | Terms | Norm Radius |
|---|---|---|---|---|---|---|
| OBJ | STANDARD | Infinity | Infinity | | 0 | 0 |
| 1 | STANDARD | Infinity | 400 | | 0 | 0 |
| STOP | XPOLYNOM | −2524.67 | −332.34 | Mirror | 27 | 1 |
| 3 | XPOLYNOM | −1064.35 | 429.63 | Mirror | 27 | 1 |
| 4 | XPOLYNOM | −825.57 | −519.54 | Mirror | 27 | 1 |
| IMA | STANDARD | Infinity | − | | 0 | 0 |

| # | X2Y0 | X0Y2 | X3Y0 | X1Y2 | X4Y0 | X2Y2 | X0Y4 |
|---|---|---|---|---|---|---|---|
| OBJ | | | | | | | |
| 1 | | | | | | | |
| STOP | 1.565E−006 | −1.565E−006 | −5.067E−008 | −6.916E−008 | 7.808E−011 | 1.647E−010 | 7.746E−011 |
| 3 | −1.263E−006 | 1.263E−006 | 0 | −8.131E−008 | −8.383E−013 | 3.918E−011 | 8.338E−013 |
| 4 | 6.467E−007 | −6.467E−007 | −2.692E−008 | −4.199E−008 | −3.138E−011 | −7.090E−011 | −4.355E−011 |
| IMA | | | | | | | |

| # | X5Y0 | X3Y2 | X1Y4 | X6Y0 | X4Y2 | X2Y4 | X0Y6 |
|---|---|---|---|---|---|---|---|
| OBJ | | | | | | | |
| 1 | | | | | | | |
| STOP | −4.931E−014 | 1.237E−013 | −1.821E−013 | 9.282E−017 | 5.162E−015 | −7.195E−015 | 4.474E−017 |
| 3 | 0 | 2.598E−012 | −1.524E−012 | −6.183E−019 | 8.280E−014 | −1.233E−013 | 6.117E−019 |
| 4 | −5.776E−014 | 1.830E−013 | −2.703E−013 | −7.897E−017 | 7.971E−015 | −1.217E−014 | −5.593E−017 |
| IMA | | | | | | | |

Example 6: Four Mirrors Imager with Freeform Surfaces

System parameters: IOD, $f_L=600$ mm, F/#=3, 6° FFOV

Nominally cancelled aberrations $\epsilon_{x,j,k,l,m}$ and $\epsilon_{y,j,k,l,m}$ for all indices pairs (j,k,l,m)≥0 with l+m≤1 for j+k+l+m≤5, l=2&m=0 for j+k+l+m≤5, and m=2 & l=0 for j+k+l+m≤5

Out of the 56 surfaces coefficients (without vertices), 52 coefficients have been calculated together with the related mapping functions coefficients. The input comprises the focal lengths in x and y (here, 600 mm), the surfaces and image plane vertex positions, and the curvatures in x and y on mirror 1 and 3.

Tilt/Decenter Values:

The first mirror is rotated by −30.462° degree about the y-axis (same angle back after surface)

The second mirror is decentered by 342.83 mm in x-direction

The second mirror is rotated by −39.011° degree about the y-axis (same angle back after surface)

The third mirror is decentered by −125.76 mm in x-direction

The third mirror is rotated by −68.703° degree about the y-axis (same angle back after surface)

The fourth mirror is decentered by 322.41 mm in x-direction

The fourth mirror is rotated by −95.066° degree about the y-axis (same angle back after surface)

The image plane is decentered by −285.23 mm in x-direction

The image plane is rotated by −75.153° degree about the y-axis (same angle back after surface)

Mirror Data

| # | Type | Radius | Thickness | Material | Terms | Norm Radius |
|---|---|---|---|---|---|---|
| OBJ | STANDARD | Infinity | Infinity | | 0 | 0 |
| 1 | STANDARD | Infinity | 400 | | 0 | 0 |
| 2 | XPOLYNOM | 2470.91 | −190.631 | Mirror | 27 | 1 |
| STOP | XPOLYNOM | 1188.102 | 408.854 | Mirror | 27 | 1 |
| 4 | XPOLYNOM | 1656.755 | 188.468 | Mirror | 27 | 1 |
| 5 | XPOLYNOM | 906.196 | 104.814 | Mirror | 27 | 1 |
| IMA | STANDARD | Infinity | — | | 0 | 0 |

| # | X2Y0 | X0Y2 | X3Y0 | X1Y2 | X4Y0 | X2Y2 | X0Y4 |
|---|---|---|---|---|---|---|---|
| OBJ | | | | | | | |
| 1 | | | | | | | |
| 2 | 8.595E−006 | −8.595E−006 | −3.042E−007 | 1.836E−007 | 4.194E−010 | 1.344E−010 | 8.537E−011 |
| STOP | 1.210E−005 | −1.210E−005 | −2.297E−007 | 1.048E−007 | 8.244E−011 | 8.811E−011 | 1.163E−011 |
| 4 | −5.739E−005 | 5.739E−005 | −3.637E−007 | −1.799E−007 | −1.289E−011 | 4.554E−010 | 1.885E−011 |
| 5 | −3.265E−005 | 3.265E−005 | −1.110E−007 | −3.723E−007 | −5.320E−010 | −5.895E−010 | 9.258E−011 |
| IMA | | | | | | | |

| # | X5Y0 | X3Y2 | X1Y4 | X6Y0 | X4Y2 | X2Y4 | X0Y6 |
|---|---|---|---|---|---|---|---|
| OBJ | | | | | | | |
| 1 | | | | | | | |
| 2 | −6.357E−013 | −7.110E−013 | 3.896E−013 | 1.209E−015 | 3.718E−016 | 2.756E−016 | −4.743E−017 |
| STOP | −1.624E−013 | −4.824E−013 | 1.276E−013 | 2.430E−016 | 5.138E−017 | 1.351E−016 | −2.833E−017 |
| 4 | −3.079E−018 | −3.271E−012 | −1.630E−012 | 1.494E−018 | 1.055E−015 | −8.218E−017 | 6.957E−018 |
| 5 | −4.933E−013 | −3.695E−012 | −1.309E−012 | 4.236E−017 | −8.482E−015 | −1.131E−014 | −1.299E−016 |
| IMA | | | | | | | |

All shown results clearly confirm the expected performance according to the selected aberrations to cancel. Prior art design methods are certainly capable of cancelling linear chromatic aberrations, that is $\partial q_1 \partial \lambda$, which is known as axial, and $\partial q_1 \partial t$, which is known as lateral chromatic aberration by the skilled person. The presented example designed with the invented method is capable of cancelling higher orders, that is $\partial q_1{}^k \partial \lambda$ and $\partial q_1{}^{k-1} \partial t \partial \lambda$ (here, k=1, 3 . . . 11) with a strong emphasis on higher order axial chromatic aberrations. This additional control on the chromatic behavior is for example of great importance in fast lenses, such as the f/2 lens in shown here.

Figure 21:
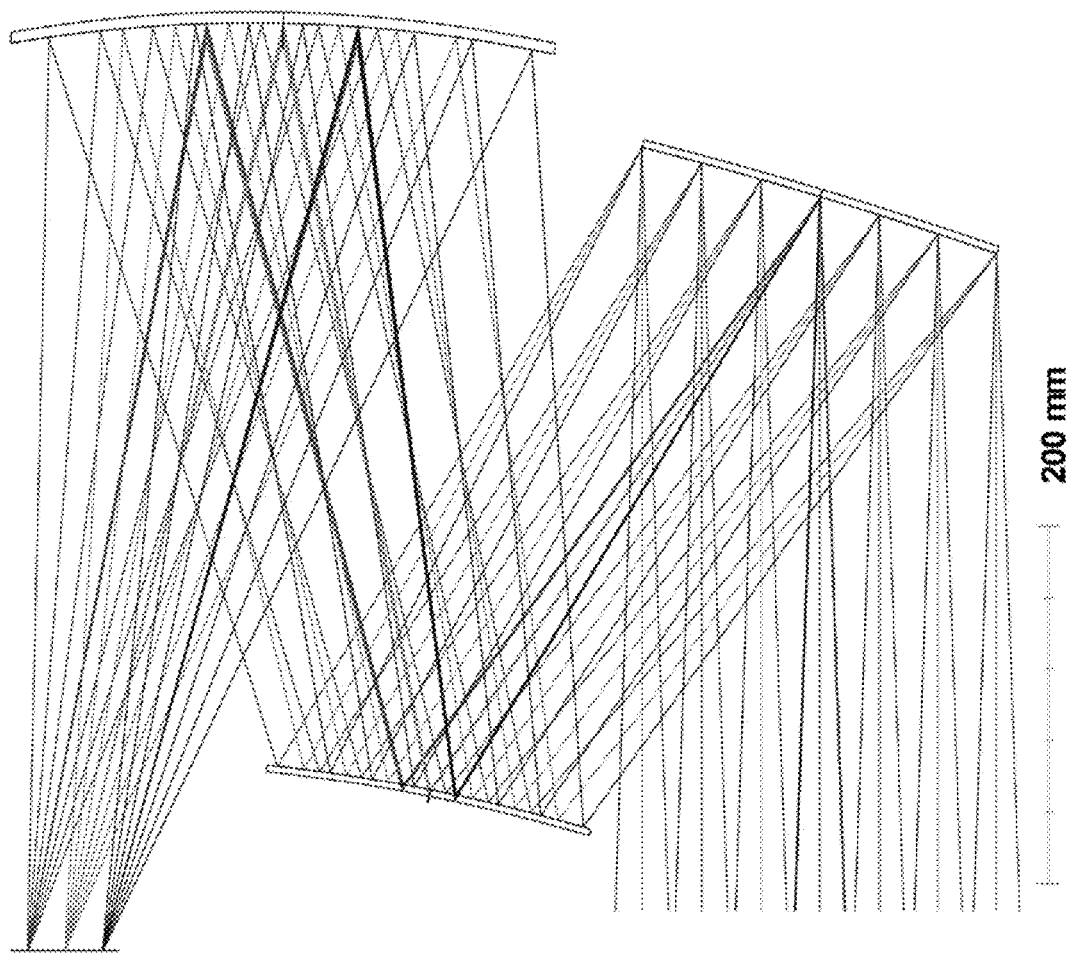
FIG. 21 shows the optical layout of an all-freeform three mirror imaging design obtained with the method according to an embodiment of the present invention.

FIG. 21 shows the optical layout of an all-freeform three mirror imaging design obtained with the method according to an embodiment of the present invention.

Figure 22:
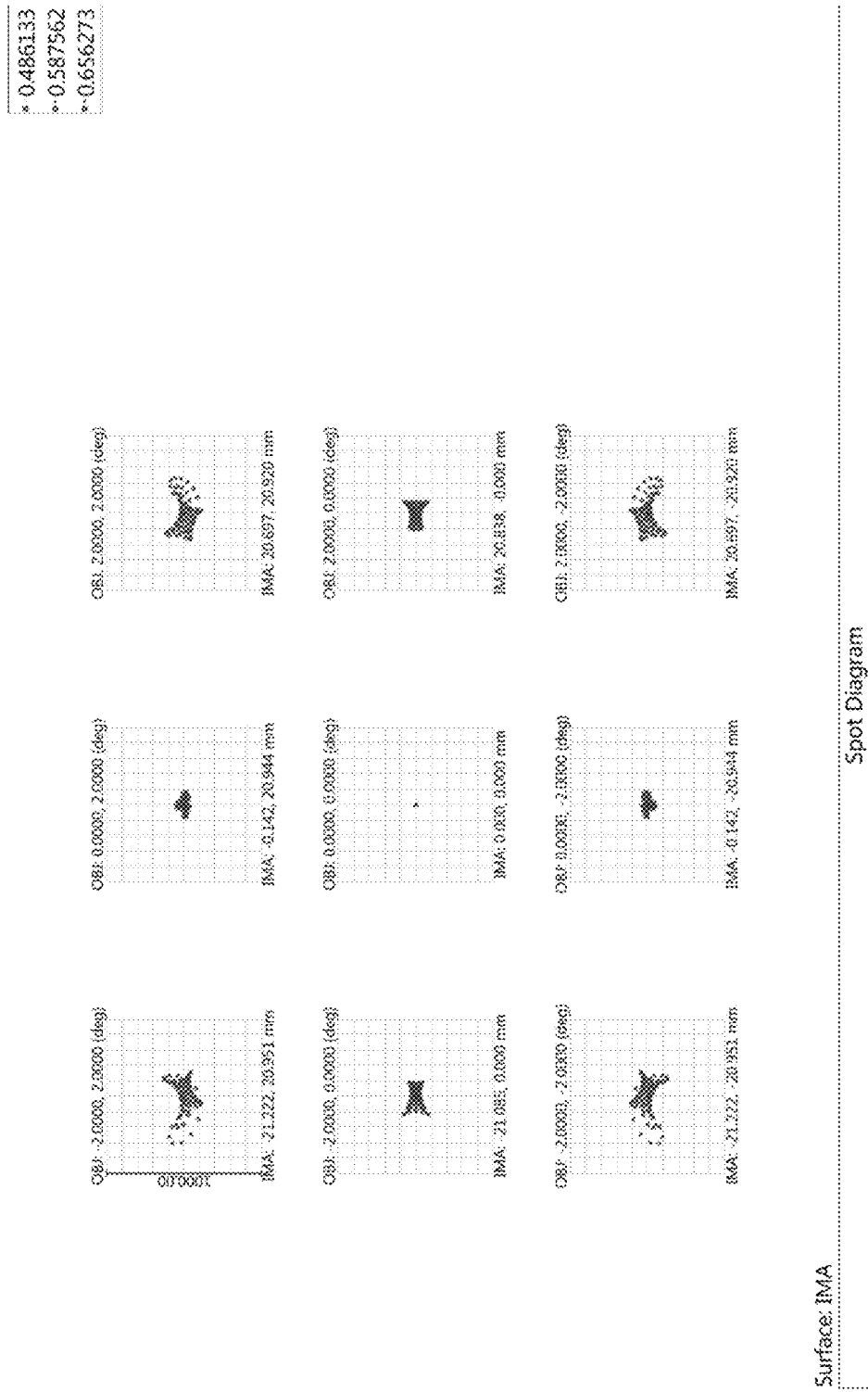
FIG. 22 shows the spot diagram associated with the all-freeform three mirror imaging design obtained with the method of FIG. 21 according to the present invention.

FIG. 22 shows the spot diagram associated with the all-freeform three mirror imaging design obtained with the method of FIG. 21 according to the present invention.

Figure 23:
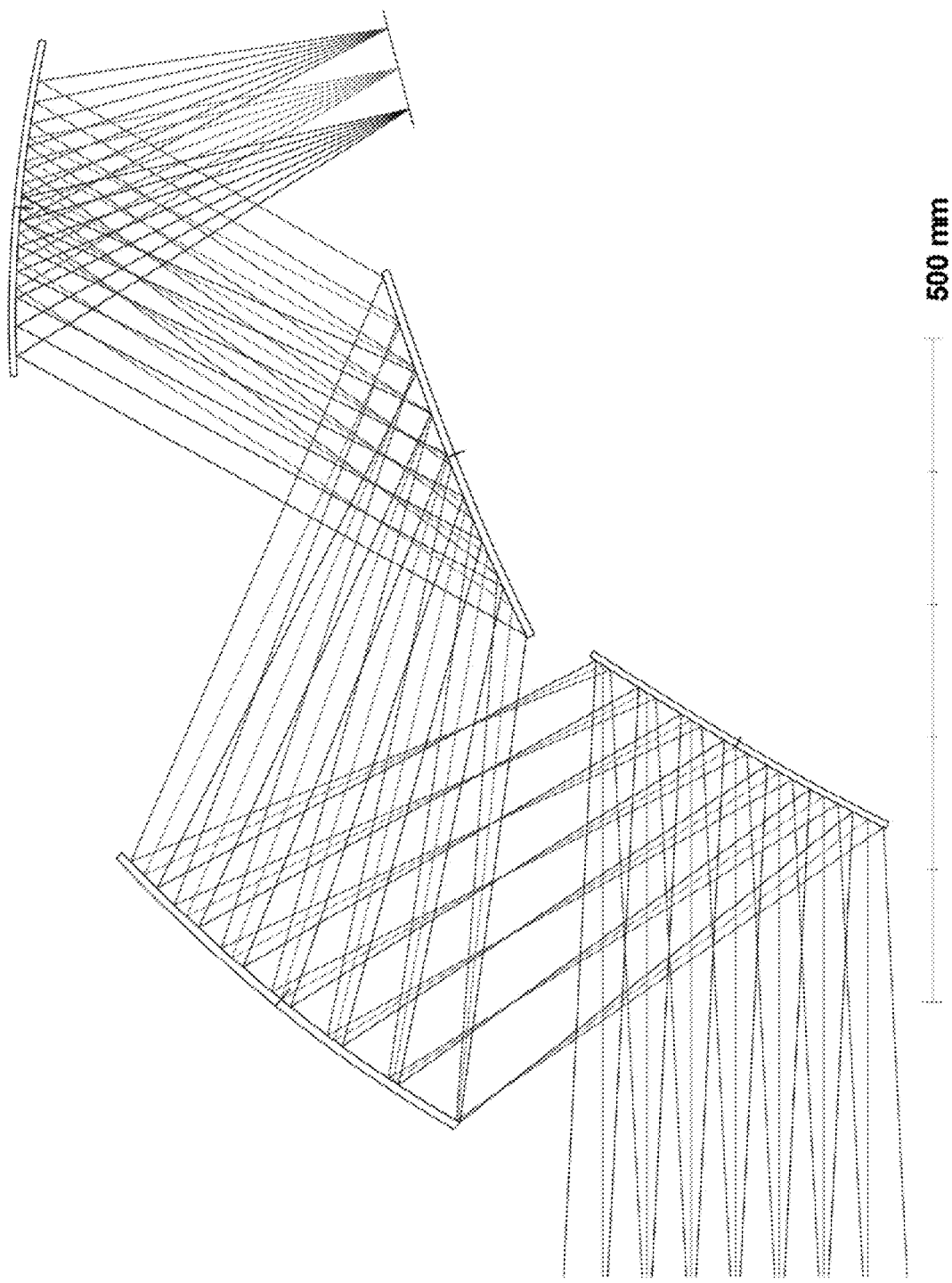
FIG. 23 shows the optical layout of an all-freeform four mirror imaging design obtained with the method according to an embodiment of the present invention.

FIG. 23 shows the optical layout of an all-freeform four mirror imaging design obtained with the method according to an embodiment of the present invention.

Figure 24:
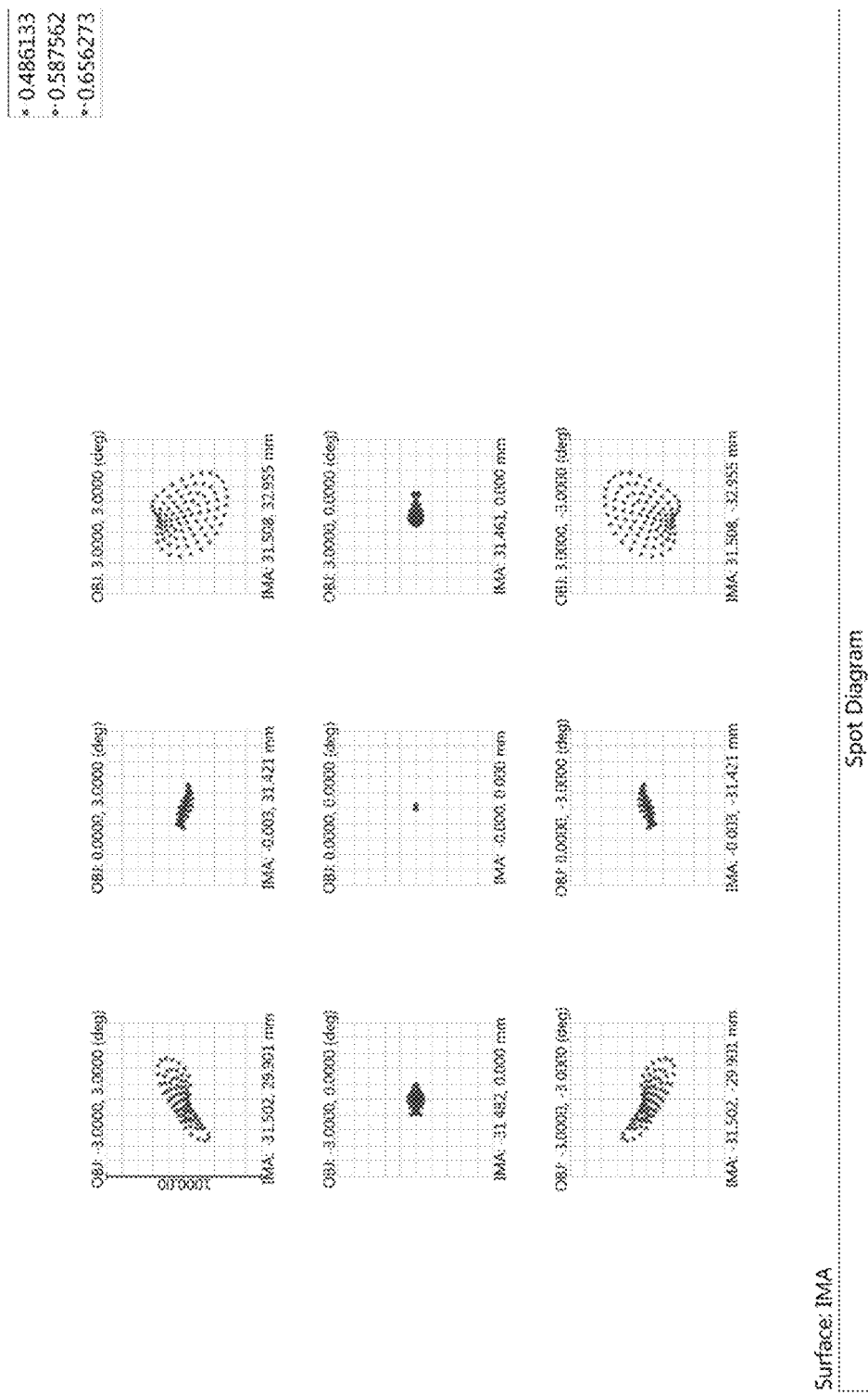
FIG. 24 shows the spot diagram associated with an all-freeform three mirror imaging design obtained with a method according to an embodiment of the present invention.

FIG. 24 shows the spot diagram associated with an all-freeform three mirror imaging design obtained with a method according to an embodiment of the present invention.

It is important to note that the present invention is not limited to homogeneous materials. In fact, embodiments of the present invention can comprise the use of materials having a locally changing refractive index (such as gradient index optics materials (GRIN)). This can be done by taking into account the changing refractive index in the wavelength dependency.

Furthermore, the invention is not limited to smooth, homogeneous surfaces, although the specification has been described for such surfaces. In fact, a discontinuous surface can be seen as a set of portions of smooth surfaces. The method shall then be applied for each smooth portion and the results obtained shall be combined. Thus, the functions $h_{x,p}$, $h_{y,p}$, $u_{i,p}$, $v_{i,p}$ and $f_i$ must be infinitely differentiable and have power series representations as defined in Eqs. (2.1), (2.2), (2.3), (2.4) and (2.6) over a portion, and Taylor's theorem can be applied over each smooth portion, as discussed throughout the specification, for example in section 2.

The present invention can also be used for optical surfaces which are active, i.e. optical surfaces which can have different shapes (with an array of actuators being attached to the rear side of a mirror for example). Such arrays of actuators are usually used for deformable mirrors in the field of adaptive optics to compensate for distortions generated by the atmosphere but also in active optics to prevent deformations on the mirrors due to temperature variations, mechanical stresses, wind turbulence, etc. For such applications, the surface coefficients of the optical surfaces will have different values for each configuration of the optical system, and thus the method according to any of the embodiments of the present invention would be applied for each configuration.

In a system comprising aspherical and/or spherical surfaces, not every surface coefficient of the optical surfaces can be calculated. The number of surfaces coefficients that are calculated, and the eventually remaining coefficients that need to be given as input parameters by the designer depends on the considered optical system and can be directly derived from the relevant SCD-rules by the skilled person. In case of surfaces coefficients that need to be provided as initial value, Monte Carlo optimization, local or global optimization algorithms or any equivalent method can be used with embodiments of the present invention to provide the initial values of the surface coefficients, before applying a method according to the present invention.

In a further aspect according to any of the embodiments of the present invention, an optics design program can be used after the method of the present invention has been applied. Such a design workflow is very commonly used by the skilled person in optical design. An initial system layout is calculated based on certain aberrations to cancel, and in the next step, optimization in an optics design program is used to reach a final system layout. The result of the optimization is a balancing process, where the originally cancelled aberrations will again reach non-zero values whereas higher order aberrations will be reduced for an overall balancing effect. This method has proven its value in many prior art optical designs, but only for a severely restricted number of low order aberrations according to any prior art direct design method. This restriction on few low order aberrations does not exist in the present invention. Together with the optimization in an optics design program, the invention provides a highly effective and streamlined workflow to first calculate excellent starting system layouts, and second, to optimize the starting systems to reach the final system layouts.

In this case, the surfaces coefficients obtained can be used as an input to an optics design program to further adapt the results obtained to the requirements of the application.

The computer based method according to embodiments of the present invention is for designing a rotationally symmetric imaging system for nominally cancelling at least one ray aberration, the method comprising the steps of selecting a design wavelength $\lambda_0$, selecting a number $N_s$ and a sequence of optical surfaces, each optical surface having a profile ft, the sequence of the $N_s$ optical surfaces defining an optical axis of the imaging system, selecting each surface to be spherical or aspherical, wherein each surface is expressed as a function of a single radial variable r, selecting an arbitrary but fixed pupil plane cross section defined by an angle $$\theta_p = \frac{\pi}{p}$$

for P=1 . . . $m_p$, wherein $m_p$ corresponds to the number of pupil plane cross sections to be considered, selecting an object point in an object plane along the optical axis, selecting a candidate image point in an image plane along the optical axis, expressing a real image point in the chosen pupil plane cross section $\theta_p$ to be the sum of the candidate image point incremented by optical aberrations, wherein the aberrations are expressed as a ray aberration expansion, expressing the surface profiles $f_i$ as a function of ray mapping functions which describe where a ray coming from the object point and going through a pupil plane cross section $\theta_p$ intersects each surface $f_i$, selecting a sequence of $N_s$ materials having each a refractive index $n_{N_s}$ at $\lambda_0$, the sequence of the object plane, the $N_s$ optical surfaces and the image plane defining a sequence of $N_s+1$ sections having optical path lengths $d_i$, applying Fermat's principle to each pair of two consecutive sections as a function of the ray mapping functions to derive two sets of $N_s$ differential equations, by mathematically expressing that the optical path length between two fixed points is an extremum along a light ray, selecting a position for a pupil plane along the optical axis, expanding each surface profile as a series expansion, each term of the expansion being a surface coefficient expressed as a function of the ray mapping functions, expanding the ray mapping functions in a series expansion of ray mapping function coefficients, selecting an initial position for each optical surface defined by its vertex $f_{i,0}$ along the optical axis, Identifying the highest aberration order o to be nominally cancelled, wherein said highest aberration order defines a subgroup of aberration orders up to order o, employing the power series method to find solutions to the two sets of $N_s$ differential equations to calculate the series coefficients of the mapping functions and of the optical surfaces by selecting the subgroup of ray aberration coefficients to be nominally cancelled in the imaging system according to a set of selection rules, applying for this subgroup partial derivatives of order k,l, said orders being provided by using pre-defined aberration matrices for each pupil plane cross section, wherein each pre-defined aberration matrix associates each optical ray aberration of the subgroup to a partial derivative of order k, l of the ray aberration series expansion in said pupil plane cross section, to derive a system of equations for the optical surfaces coefficients and the ray mapping functions coefficients, solving the system of equations for the optical surfaces coefficients and the ray mapping functions coefficients, deriving from the calculated series coefficients of the optical surfaces the surface profiles of each optical surface and thereby each clear aperture.

In embodiments of the present invention, the system of equations, which can be linear or non-linear depending on the situation, can be solved using known techniques such as the Newton Raphson technique, the Gaussian elimination technique (for linear systems), etc.

In an embodiment, the number of surface coefficients corresponding to this subgroup minus the number of selected matrix elements of the pre-defined matrices of this subgroup corresponds to the number of surface coefficients to be predefined as initial values and the number of unknown surface and ray mapping coefficients corresponds to the number of equations to be used.

In accordance with another embodiment of the present invention software may be implemented as a computer program product which has been compiled for a processing engine to carry out any of the methods of the present invention or is compiled to execute in an interpretative virtual machine such as the Java™ Virtual Machine. A device may comprise logic encoded in media for performing any step of the steps of the methods according to embodiments of the present invention. Logic may comprise software encoded in a disk or other computer-readable medium and/or instructions encoded in an application specific integrated circuit (ASIC), field programmable gate array (FPGA), or other processor or hardware. A device will also include a CPU and/a GPU and memory, the CPU and/or GPU having a processing engine able to execute software of the present invention.

The computer program product may be stored on a non-transitory signal storage medium such as an optical disk (CD-ROM or DVD-ROM), a digital magnetic tape, a magnetic disk, a solid state memory such as a USB flash memory, a ROM, etc.

The software can be embodied in a computer program product adapted to carry out the following functions when the software is loaded onto the respective device or devices and executed on one or more processing engines such as microprocessors, ASIC's, FPGA's etc.:
  designing a rotationally symmetric imaging system having optical surfaces, for nominally cancelling at least one ray aberration.

The software can be embodied in a computer program product adapted to carry out the following functions when the software is loaded onto the respective device or devices and executed on one or more processing engines such as microprocessors, ASIC's, FPGA's etc.:
  Inputting to a computer system specifications comprising:
    imaging system parameters,
    wavelength dependency,
    a number of surface coefficients of the optical surfaces,
    pupil characteristics
    object and image spaces.

The software can be embodied in a computer program product adapted to carry out the following functions when the software is loaded onto the respective device or devices and executed on one or more processing engines such as microprocessors, ASIC's, FPGA's etc.:
  translating using the computer the system specifications to a set of differential equations by applying Fermat's principle.

The software can be embodied in a computer program product adapted to carry out the following functions when the software is loaded onto the respective device or devices and executed on one or more processing engines such as microprocessors, ASIC's, FPGA's etc.:
  inputting to the computer a subgroup of optical ray aberrations to be set nominally to vanish using a set of selection, consistency and distribution rules.

The software can be embodied in a computer program product adapted to carry out the following functions when the software is loaded onto the respective device or devices and executed on one or more processing engines such as microprocessors, ASIC's, FPGA's etc.:
  solving the differential equations to obtain surface coefficients for the optical surfaces and mapping function coefficients, which define the ray trace and their intersection with the optical surfaces and each clear aperture therefrom.

The software can be embodied in a computer program product adapted to carry out the following functions when the software is loaded onto the respective device or devices and executed on one or more processing engines such as microprocessors, ASIC's, FPGA's etc.:
  in the step of inputting to the computer system specifications the imaging system parameters comprises inputting at least one design wavelength $\lambda_0$ and/or
  in the step of inputting to the computer system specifications imaging system parameters comprises inputting a sequence of $N_s$ optical surfaces, wherein each optical surface has an optical surface profile $f_i$, and wherein the sequence of the $N_s$ optical surfaces defines an optical axis of the imaging system and/or
  in the step of inputting to the computer system specifications the surface coefficients of the optical surfaces comprises defining each optical surface to be spherical or aspherical, and wherein each optical surface is expressed as a function of a single radial variable r.

The software can be embodied in a computer program product adapted to carry out the following functions when the software is loaded onto the respective device or devices and executed on one or more processing engines such as microprocessors, ASIC's, FPGA's etc.:
- in the step of inputting to the computer system specifications the pupil characteristics comprises inputting a position for a pupil plane along the optical axis and/or
- in the step of inputting to the computer system specifications the pupil characteristics further comprises selecting $m_p$ fixed pupil plane cross sections p of the pupil plane, wherein $m_p \geq 1$ and/or
- wherein each pupil plane cross section is defined by an angle $$\theta_p = \frac{\pi}{p}$$

for p=1 ... $m_p$ and/or
- wherein each pupil plane cross section is defined with a single pupil radial variable $q_p$, which expresses where a ray coming from the object space and passing through the pupil plane coordinates at $(x_p, y_p, 0) = (q_p \cos(\theta_p), q_p \sin(\theta_p), 0)$ intersects a first image plane.

The software can be embodied in a computer program product adapted to carry out the following functions when the software is loaded onto the respective device or devices and executed on one or more processing engines such as microprocessors, ASIC's, FPGA's etc.:
- wherein in the step of inputting to the computer system specifications the object and image spaces comprises selecting an object point at infinite distance or finite distance and/or
- wherein the step of selecting an object point at finite distance further comprises the step of selecting an object point in an object plane along the optical axis.

The software can be embodied in a computer program product adapted to carry out the following functions when the software is loaded onto the respective device or devices and executed on one or more processing engines such as microprocessors, ASIC's, FPGA's etc.:
- in the step of translating using the computer the system specifications to a set of differential equations further comprises the step of expressing the optical surface profiles as a function of ray mapping functions which describe where a ray coming from the object point or under a field angle and going through the fixed pupil plane cross section p intersects each optical surface for said pupil plane cross section and/or
- comprising the step of expressing the ray mapping functions as $(u_{i,p}(q_p, t), v_{i,p}(q_p, t))$ wherein variable t defines the object and the fixed pupil plane cross section $\theta_p$ has pupil coordinates $(q_p, \theta_p)$, such that the optical surfaces $f_i$ for said pupil plane cross section are expressed as a function of the ray mapping functions $f_i((u_{i,p}(q_p, t), v_{i,p}(q_p, t)))$.

The software can be embodied in a computer program product adapted to carry out the following functions when the software is loaded onto the respective device or devices and executed on one or more processing engines such as microprocessors, ASIC's, FPGA's etc.:
- wherein in the step of inputting to the computer system specifications the object and image spaces comprises selecting a first image point in an image plane along the optical axis.

The software can be embodied in a computer program product adapted to carry out the following functions when the software is loaded onto the respective device or devices and executed on one or more processing engines such as microprocessors, ASIC's, FPGA's etc.:
- wherein the step of inputting to the computer system specifications the imaging system parameters comprises selecting a sequence of $N_s+1$ materials having each a refractive index distribution $n_{N_s}(\lambda)$ for at least one design wavelength $\lambda_0$, the sequence of the object plane, the $N_s$ optical surfaces and the image plane defining a sequence of $N_s+1$ sections having optical path lengths $d_i$.

The software can be embodied in a computer program product adapted to carry out the following functions when the software is loaded onto the respective device or devices and executed on one or more processing engines such as microprocessors, ASIC's, FPGA's etc.:
- the step of translating using the computer the system specifications to a set of differential equations further comprises the step of applying Fermat's principle to each pair of two consecutive sections as a function of the ray mapping functions to derive two sets of $N_s$ differential equations, by mathematically expressing that the optical path length between two fixed points is an extremum along a light ray.

The software can be embodied in a computer program product adapted to carry out the following functions when the software is loaded onto the respective device or devices and executed on one or more processing engines such as microprocessors, ASIC's, FPGA's etc.:
- wherein the step of inputting to the computer system specifications the object and image spaces comprises the step of expressing a second image point for each fixed pupil plane cross sections to be the sum of the first image point incremented by optical aberrations, wherein the optical aberrations are expressed as a ray aberration series expansion of ray aberration coefficients for each pupil plane cross section.

The software can be embodied in a computer program product adapted to carry out the following functions when the software is loaded onto the respective device or devices and executed on one or more processing engines such as microprocessors, ASIC's, FPGA's etc.:
- wherein the step of inputting to the computer system specifications the surface coefficients of the optical surfaces comprises expanding each optical surface profile as a series expansion with surface coefficients $f_{i,2j}$ for the $i^{th}$ surface and of $2j^{th}$ order.

The software can be embodied in a computer program product adapted to carry out the following functions when the software is loaded onto the respective device or devices and executed on one or more processing engines such as microprocessors, ASIC's, FPGA's etc.:
- wherein the step of translating using the computer the system specifications to two sets of $N_s$ differential equations comprises expanding the ray mapping functions in a series expansion of ray mapping function coefficients.

The software can be embodied in a computer program product adapted to carry out the following functions when the software is loaded onto the respective device or devices and executed on one or more processing engines such as microprocessors, ASIC's, FPGA's etc.:
- wherein the step of solving the differential equations further comprises the step of employing the power series method to find solutions to the two sets of $N_s$ differential equations to calculate the series coefficients of the mapping functions and of the optical surfaces as a function of the subgroup of optical ray aberrations, and/or
- further comprising the step of applying partial derivatives of order k, l to the two sets of $N_s$ differential equations, said orders k, l being provided by using pre-defined aberration matrices for each pupil plane cross section, wherein each pre-defined aberration matrix associates each optical ray aberration of the subgroup to a partial derivative of order k, l of the ray aberration series expansion in said pupil plane cross section, to derive a system of equations for the optical surfaces coefficients and the ray mapping functions coefficients, and/or
- wherein the step of solving the differential equations further comprises the step of deriving from the calculated coefficients of the optical surfaces the surface profiles of each optical surface and/or
- wherein the step of solving the differential equations further comprises the step of deriving from the calculated series coefficients of the mapping functions the clear aperture of each optical surface therefrom.

The software can be embodied in a computer program product adapted to carry out the following functions when the software is loaded onto the respective device or devices and executed on one or more processing engines such as microprocessors, ASIC's, FPGA's etc.:
- wherein the step of inputting to a computer system specifications comprising surface coefficients of the optical surfaces further comprises selecting each surface to be spherical or aspherical further comprises the step of expressing each surface as a function of a single radial variable $r=\sqrt{x^2+y^2}$ and of expanding each surface as a Taylor polynomial having Taylor coefficients $f_{i,2j}$ for j=1, 2 ... up to 30 and i=1, 2, ... 50.

The software can be embodied in a computer program product adapted to carry out the following functions when the software is loaded onto the respective device or devices and executed on one or more processing engines such as microprocessors, ASIC's, FPGA's etc.:
- wherein the step of selecting a first image point further comprises the step of expressing the first image point with a function which prescribes the object to image relationship, and wherein the step of expressing the second image further comprises the step of expressing the second image in the chosen pupil plane cross section as the sum of the first image plus optical ray aberrations in x- and y-direction, wherein the optical ray aberrations are related to known ray aberrations expansions and wave aberrations expansions.

The software can be embodied in a computer program product adapted to carry out the following functions when the software is loaded onto the respective device or devices and executed on one or more processing engines such as microprocessors, ASIC's, FPGA's etc.:
- wherein the step of inputting to the computer system specifications the pupil characteristics comprises inputting a position for an aperture stop along the optical axis, wherein the aperture stop is the entrance pupil, an aperture stop between two optical surfaces, or the exit pupil and/or wherein,
- if the aperture stop coincides with one of the optical surfaces, replacing the coordinates of said optical surface in the ray mapping functions by replacing the coordinates of said surface to the pupil coordinates
- if the aperture stop is between two optical surfaces, expressing that the cross product of the direction vector from the preceding optical surface towards the aperture stop, and the direction vector from the aperture stop towards the succeeding optical surface is zero, thereby adding three additional equations to each of the two sets of differential equations;
- if the aperture stop coincides with the exit pupil, expressing that the cross product of the direction vector from the last surface to the aperture stop and the direction vector from the stop to the image plane coincide, thus the cross product of the two vectors is zero and three additional equations are added to the two sets of differential equations,
- if the aperture stop coincides with the entrance pupil, the direction vector from the object to the stop and the direction vector from the stop to the first surface coincide, thus the cross product of the two vectors is zero and three additional equations are added to the two sets of differential equations.

The software can be embodied in a computer program product adapted to carry out the following functions when the software is loaded onto the respective device or devices and executed on one or more processing engines such as microprocessors, ASIC's, FPGA's etc.:
- repeating the method of the present invention for at least a second design wavelength and/or
- in the step of inputting to the computer system specifications the imaging system parameters further expressing each optical path length $d_i$ as a function of the wavelength by means of the refractive index distribution $n_{N_s}(\lambda)$ of each material for the at least one design wavelength $\lambda_0$.

The software can be embodied in a computer program product adapted to carry out the following functions when the software is loaded onto the respective device or devices and executed on one or more processing engines such as microprocessors, ASIC's, FPGA's etc.:
- selecting at least two different materials for at least two design wavelengths.

The software can be embodied in a computer program product adapted to carry out the following functions when the software is loaded onto the respective device or devices and executed on one or more processing engines such as microprocessors, ASIC's, FPGA's etc.:
- selecting at least two different materials for one design wavelength to nominally cancel one chromatic aberration coefficient.

The software can be embodied in a computer program product adapted to carry out the following functions when the software is loaded onto the respective device or devices and executed on one or more processing engines such as microprocessors, ASIC's, FPGA's etc.:
- the method being for calculating ray aberrations at a first design wavelength and up to a highest order in an optical system comprising a plurality of optical surfaces, each optical surface being defined by a set of surface coefficients $f_{i,j}$, said method comprising the steps of
- using the power series methods to calculate all aberration coefficients $\epsilon_{x,p,k,l}$ and $\epsilon_{y,p,k,l}$ for arbitrary pupil plane cross sections and in ascending aberration order, solving the linear system of equations for each aberration order, by
  applying all derivatives for each order and for each pupil plane cross section to the two sets of differential equations,
  solving the linear system of equations,
  repeating each step until the highest order is reached
and/or
applying said method for at least two configurations of a zoom system
and/or
repeating said method for at least a second design wavelengths so as to calculate the monochromatic aberrations for a first and a second design wavelength
and/or
expressing each optical path length $d_i$ as a function of the wavelength by means of the refractive index distribution $n_{N_s}(\lambda)$ of each material for the at least one design wavelength so as to further calculate chromatic aberrations of the optical system.

The software can be embodied in a computer program product adapted to carry out the following functions when the software is loaded onto the respective device or devices and executed on one or more processing engines such as microprocessors, ASIC's, FPGA's etc.:
  Calculating the system specifications an optimization method, and/or
  selecting an initial position for at least one optical surface defined by its vertex $f_{i,0}$ along the optical axis and/or
  the optimization method is a Monte Carlo optimization.

The software can be embodied in a computer program product adapted to carry out the following functions when the software is loaded onto the respective device or devices and executed on one or more processing engines such as microprocessors, ASIC's, FPGA's etc.:
  inputting to a computer system at least a second set of system specifications, wherein each set corresponds to a different configuration of a zoom system, said at least second set of system specifications comprising at least imaging system parameters, pupil characteristics, and object and image spaces, the computer based method being evaluated for each second set of system specifications.

The software can be embodied in a computer program product adapted to carry out the following functions when the software is loaded onto the respective device or devices and executed on one or more processing engines such as microprocessors, ASIC's, FPGA's etc.:
  A computer based method for generating an electronic file for a numerically controlled machine for the manufacture of a rotationally symmetric imaging system having optical surfaces, the method comprising:
  Inputting to a computer system specifications comprising:
  imaging system parameters,
  wavelength dependency,
  a number of surface coefficients of the optical surfaces,
  pupil characteristics
  object and image spaces,
  translating using the computer the system specifications to a set of differential equations by applying Fermat's principle,
  inputting to the computer a subgroup of optical ray aberrations to be set nominally to vanish using a set of selection, consistency and distribution rules,
  solving the differential equations to obtain surface coefficients for the optical surfaces and mapping function coefficients, which define the ray trace and their intersection with the optical surfaces and each clear aperture therefrom, and outputting the electronic file comprising the surface coefficients for the optical surfaces and mapping function coefficients, which define the ray trace and their intersection with the optical surfaces and each clear aperture therefrom.

The software can be embodied in a computer program product adapted to carry out the following functions when the software is loaded onto the respective device or devices and executed on one or more processing engines such as microprocessors, ASIC's, FPGA's etc.:
  a computer based method for designing a rotationally symmetric imaging system comprising at least two optical surfaces and an optical axis, with nominal cancelling of:
  at least one ray aberration coefficient, while calculating at least one surface coefficient, all mapping functions coefficients, providing the rays intersect with the at least two optical surfaces, and all non-cancelled aberration coefficients up to a given order, the method comprising:
  inputting to a computer a first set of system specifications comprising:
    a sequence of the at least two $N_s \geq 2$ optical surfaces and their lateral positions along the optical axis in z direction
    each optical surface as either refractive or reflective and of spherical or aspherical shape, and wherein each surface $f_i$ is expressed as a function of a single radial variable $r=\sqrt{x^2+y^2}$, with a total number of $N_c$ not yet known surfaces coefficients of the system a design wavelength $\lambda_0$, and corresponding refractive indices before and after each optical surface
    an object to be at finite or infinite distance, and with a flat or curved shape in case of a finite distance
    a prescribed image as a function of an object variable t, which describes an object to image relationship
    a real image being the sum of the prescribed image plus a ray aberration series expansion a number $m_p \geq 1$ of pupil planes at a system's stop, each defined by an angle $$\theta_p = \frac{\pi}{p}$$

for $p=1 \ldots m_p$, expressing where a ray from the object and passing through the pupil plane at $(x_p, y_p, 0) = (q_p \cos(\theta_p), q_p \sin(\theta_p), 0)$ intersects with image plane
    expressing each surface as a function of ray mapping functions $f_i((u_{i,p}(q_p, t), v_{i,p}(q_p, t)))$ in (x, y), which describe where a ray from the object and going through the fixed pupil plane p intersects each optical surface, whereas said ray mapping functions are series in the pupil and object variables $(q_p, t)$
    translating using the computer the first set of system specifications to differential equations by applying Fermat's principle to each pair of two consecutive optical path length sections expressed in terms of the object, surfaces functions $f_i$, mapping functions $u_{i,p}$ and $v_{i,p}$ and the real image, to derive $2N_s$ differential equations $D_{i'}$, ($i'=1 \ldots 2N_s$)($N_s$ in $u_{i,p}$, and $N_s$ in $v_{i,p}$ direction)

defining the pupil characteristics wherein
  if the stop coincides with one of the surfaces $f_{i_o}$, replacing $u_{i_o,p}$ and $v_{i_o,p}$ in $f_{i_o}$ by $(x_p, y_p)$ as stop location
  if an aperture stop is placed either at the entrance, between two optical surfaces, or at the exit (before the image), expressing that the cross product of the vector that describes an arbitrary ray path towards the aperture stop and the vector that describes an arbitrary ray path from the aperture stop is zero, thereby adding three additional equations to the previously derived differential equations, resulting in $D_{i'}$ equations ($i'=1 \ldots 2N_s+3$) Translating using the computer said $2N_s$ or $(2N_s+3)$ equations to algebraic equations by using a power series solution method by evaluating $$\lim_{q_p \to 0} \lim_{t \to 0} \frac{\partial^k}{\partial q_p^k} \frac{\partial^l}{\partial t^l} D_{i'} = 0,$$

with k,l=0, 1, 2, 3 ..., and combined orders k+l=1, 3, 5 ... $o_m$ resulting in $$\frac{o_m+1}{2} * \left(\frac{o_m+1}{2} + 1\right) * 2N_s$$

or $* 2(N_s+3)$ algebraic equations for all defined series coefficients,
Choosing at least one ray aberration coefficient to be zero; for each aberration coefficient set to zero, select one surface coefficient to be part of a (sub)-group $M_c$, whereas each said pair(s) of ray aberration and surface coefficient appear simultaneously in at least one of the algebraic equations
Inputting to a computer values for any surface(s) coefficient that have not been used to cancel aberrations in the previous step, which is all surfaces coefficients that are not part of group $M_c$,
Solving using the computer the algebraic system of equations to obtain as an output at least one surface coefficient for the optical surfaces, all mapping function coefficients, and non-cancelled ray aberration coefficients up to the given combined order.

The software can be embodied in a computer program product adapted to carry out the following functions when the software is loaded onto the respective device or devices and executed on one or more processing engines such as microprocessors, ASIC's, FPGA's etc.:
  the step of inputting to the computer system at least a second set of system specifications, wherein each set corresponds to a different configuration of a zoom system, and each set (c=1, 2 ... ) of zoom system specifications comprises:
  lateral positions $f_{i,0}^c$ of all surfaces describing zoom movements
  mapping functions $u_{i,p}^c(q_p, t)$, $v_{i,p}^c(q_p, t)$ for each zoom configuration
  aberration functions $\epsilon_{x,p}^c(q_p, t)$, $\epsilon_{y,p}^c(q_p, t)$ for each zoom configuration
  a prescribed image as function of the object for each zoom configuration the method comprising:
Translating using the computer the system specifications to differential equations by applying Fermat's principle to each pair of two consecutive optical path length to derive $2N_s$ differential equations for each zoom system configuration
Defining the pupil characteristics wherein
  if the stop coincides with one of the surfaces $f_{i_o}$, replacing $u_{i_o,p}$ and $v_{i_o,p}$ in $f_{i_o}$ by $(x_p, y_p)$ as stop location
  if an aperture stop is placed, expressing that the cross product of the vector that describes an arbitrary ray path towards the stop and the vector that describes an arbitrary ray path from the stop is zero, thereby adding three additional equations to the previously derived differential equations for each zoom system configuration
Translating using the computer said $2cN_s$ or $c(2N_s+3)$ equations to algebraic equations by using a power series solution method by evaluating $$\lim_{q_p \to 0} \lim_{t \to 0} \frac{\partial^k}{\partial q_p^k} \frac{\partial^l}{\partial t^l} D_{i'}^c = 0,$$

with k,l=0, 1, 2, 3 ..., and combined orders k+l=1, 3, 5 ... $o_m$ resulting in $$\frac{o_m+1}{2} * \left(\frac{o_m+1}{2} + 1\right) * 2cN_s \text{ or } * 2c(N_s+3)$$

algebraic equations for all defined series coefficients and all zoom system configurations
Choosing at least one ray aberration coefficient for each zoom system specification to be zero; for each aberration coefficient set to zero, select one surface coefficient to be part of a (sub)-group $M_c$, whereas each said pairs of ray aberrations and surface coefficients appear simultaneously in at least one of the algebraic equations,
Inputting to a computer values for any surface(s) coefficient that has or have not been used to cancel aberrations in the previous step (whereas the input can be manually done or using a computer
Solving using the computer the algebraic system of equations to obtain as an output all surface coefficients that are part of $M_c$ for the optical surfaces, all mapping function and non-cancelled ray aberration coefficients up to the given combined order and for all zoom system configurations.

The software can be embodied in a computer program product adapted to carry out the following functions when the software is loaded onto the respective device or devices and executed on one or more processing engines such as microprocessors, ASIC's, FPGA's etc.:
  a computer based method, wherein the rotational symmetry of the imaging system is broken and wherein the system having either (1) no symmetry, (2) one plane of symmetry, or (3) two planes of symmetry, the method comprising:
  Inputting to a computer system specifications comprising:
    a sequence of $N_s \geq 2$ (max. 30) optical surfaces
    each optical surface as either refractive or reflective and of spherical, aspherical or freeform shape, and wherein each freeform surface is expressed as a function of two variables having not yet known power series coefficients $f_{i,j,k}$ for j,k=1, 2 . . . up to 12 and i=1, 2, . . . $N_s$, with a total number of $N_c$ surfaces coefficients of the system a design wavelength $\lambda_0$, and corresponding refractive indices before and after each optical surface the object to be at finite or infinite distance and with a flat or curved shape in case of a finite distance the prescribed image as a function of two object variables $t_x$ and $t_y$, which describes the object to image relationship the real image as the sum of the prescribed image plus a ray aberration series expansion according to the considered system symmetry expressing the ray mapping functions $u(x_p, y_p, t_x, t_y)$ and $v_i(x_p, y_p, t_x, t_y)$ as series of the pupil $(x_p, y_p)$ and object variables $(t_x, t_y)$ expressing all surfaces positions, and any tilts of the object, the optical surfaces, an eventual aperture stop and the image through rotation matrices (at least one for symmetry case (1) or (2)); whereas said rotation matrices are defined by inputting rotation axes and angles matching the system symmetry, which then defines the chief ray path for the on-axis field and all vertices of the mapping functions Translating using the computer the system specifications to differential equations by applying Fermat's principle to each pair of two consecutive optical path length sections expressed in terms of the object, surfaces functions $f_i$, mapping functions $u_i$ and $v_i$, and the real image, to derive $2N_s$ differential equations $D_{i'}$ (i'=1 . . . $2N_s$) ($N_s$ in $u_i$, and $N_s$ in $v_i$ direction)

Defining the pupil characteristics, wherein
if the stop coincides with one of the surfaces $f_{i_o}$, replacing $u_{i_o}$ and $v_{i_o}$ in $f_{i_o}$ by $(x_p, y_p)$ as stop location
if an aperture stop is placed either at a given position with a defined orientation (rotation matrix), expressing that the cross product of the vector that describes an arbitrary ray path towards the aperture stop and the vector that describes an arbitrary ray path from the aperture stop is zero. Thereby adding three additional equations to the previously derived $D_{i'}$ differential equations (i'=1 . . . $2N_s+3$)

Translating using the computer said $2N_s$ or $2N_s+3$ equations in case of an aperture stop, to algebraic equations by using the power series solution method by evaluating $$\lim_{x_p \to 0} \lim_{y_p \to 0} \lim_{t_x \to 0} \lim_{t_y \to 0} \frac{\partial^j}{\partial x_p^j} \frac{\partial^k}{\partial y_p^k} \frac{\partial^l}{\partial t_x^l} \frac{\partial^m}{\partial t_x^m} D_{i'} = 0,$$

for all possible combinations of indices j, k, l, m,=0, 1, 2, 3 . . . and combined orders j+k+l+m=1, 2, 3 . . . $o_m$ (max. 11), resulting in a set of algebraic equations for all defined series coefficients Choosing at least one ray aberration coefficient to be zero; for each aberration coefficient set to zero, select one surface coefficient to be part of a (sub)-group $M_c$, whereas each said pair(s) of ray aberration and surface coefficient appear simultaneously in at least one of the algebraic equations Inputting to a computer values for any surface(s) coefficient that have not been used to cancel aberrations in the previous step, that is all surfaces coefficients that are not part of group $M_c$, whereas the input can be manually done or using a computer Solving using the computer the algebraic system of equations to obtain as an output at least one surface coefficient (all coefficients that are part of $M_c$) for the optical surfaces, all mapping function coefficients, and non-cancelled ray aberration coefficients up to the given combined order.

The software can be embodied in a computer program product adapted to carry out the following functions when the software is loaded onto the respective device or devices and executed on one or more processing engines such as microprocessors, ASIC's, FPGA's etc.:

computer based method, further comprising simultaneously applying said method for at least a second design wavelength with defined ray mapping and ray aberration functions for each design wavelength, the method further comprising:

Translating using the computer the system specifications to algebraic equations by applying Fermat's principle to each pair of two consecutive optical path length sections for each design wavelength Choosing at least one aberration coefficient per design wavelength to be zero, providing surfaces coefficients group $M_c$ Solving using the computer the algebraic system of equations to obtain as an output at least two surface(s) coefficients (all coefficients that are part of $M_c$), all mapping function and non-cancelled ray aberration coefficients up to the given combined order and for all design wavelengths.

including chromatic aberration coefficients in the aberration series expansions in terms of the wavelength variable $\lambda$ including the wavelength dependency in all mapping functions through an additional series term $(\lambda-\lambda_0)^\Lambda$ expressing each optical path length section by means of a refractive index distribution $n_{i-1,i}(\lambda)$ (e.g., Sellmeier equation)

translating using the computer the system specifications to differential equations by applying Fermat's principle to each pair of two consecutive optical path length sections (with surface stop or an aperture stop)

translating using the computer said equations to algebraic equations, wherein the step of using the power series solution method comprises including an additional term $$\lim_{\lambda \to \lambda_0} \frac{\partial^\Lambda}{\partial \lambda^\Lambda}$$

with $\Lambda$=0, 1, 2 . . . with optionally a maximum of 5, whereas the index $\Lambda$ is added to the summation of the combined order choosing aberration coefficients to be nominally zero, wherein the step comprises choosing at least one monochromatic (that is, for $\Lambda$=0) and one chromatic ($\Lambda \neq 0$) aberration coefficient to be zero, providing surfaces coefficients group $M_c$, whereas each said pairs of ray aberration and surface coefficient appear simultaneously in at least one of the algebraic equations inputting to a computer values for any surface(s) coefficient that are not part of group $M_c$ solving using the computer the algebraic system of equations to obtain as an output at least two surfaces coefficients (all coefficients that are part of $M_c$), all mapping function coefficients, and non-cancelled monochromatic and chromatic aberration coefficients up to the given combined order.

The software can be embodied in a computer program product adapted to carry out the following functions when the software is loaded onto the respective device or devices and executed on one or more processing engines such as microprocessors, ASIC's, FPGA's etc.:

A computer based method, wherein the step of choosing aberration coefficient(s) comprises setting said aberration coefficient(s) to a non-zero value. For each aberration coefficient set to a non-zero value, select one surface coefficient to be part of a (sub)-group $M_c$, whereas each said pair(s) of ray aberration and surface coefficient appear simultaneously in at least one of the algebraic equations.

The software mentioned above can be stored on a non-transitory signal storage medium, such as an optical disk (CD-ROM or DVD-ROM); a magnetic tape, a magnetic disk, a ROM, or a solid state memory such as a USB flash memory or similar.

While the invention has been described hereinabove with reference to a number of embodiments, this is done to illustrate and not to limit the invention, the scope of which is determined by the accompanying claims. The skilled person will appreciate that features disclosed herein in connection with individual embodiments may be combined with features from other embodiments to obtain the same technical effects and advantages, without departing from the scope of the invention.

The invention claimed is:

1. A computer-based method for designing a rotationally symmetric imaging system comprising at least two optical surfaces and an optical axis, with nominal cancelling of at least one ray aberration coefficient, while calculating
   at least one surface coefficient,
   all ray mapping functions coefficients, providing the rays intersect with the at least two optical surfaces, and
   all non-cancelled ray aberration coefficients up to a predetermined aberration order,
the method comprising the following steps:
   inputting to a computer system a first set of system specifications for the imaging system that includes
      a sequence of the at least two $N_s \geq 2$ optical surfaces and their lateral positions along the optical axis in z direction,
      each optical surface as either refractive or reflective and of spherical or aspherical shape, wherein each surface $f_i$ is expressed as a function of a single radial variable $r = \sqrt{x^2 + y^2}$, with a total number of $N_c$ not yet known surfaces coefficients of the imaging system,
      a design wavelength $\lambda_0$, and corresponding refractive indices before and after each optical surface,
      an object to be at finite or infinite distance, and with a flat or curved shape in case of a finite distance,
      a prescribed image as a function of an object variable t, which describes an object to image relationship,
      a real image being the sum of the prescribed image plus a ray aberration series expansion,
      a number $m_p \geq 1$ of pupil planes at a stop of the imaging system, each defined by an angle $$\theta_p = \frac{\pi}{p}$$

for $p=1 \ldots m_p$, expressing where a ray from the object and passing through the pupil plane at $(x_p, y_p, 0) = (q_p \cos(\theta_p), q_p \sin(\theta_p), 0)$ intersects with image plane, expressing each surface as a function of ray mapping functions $f_i((u_{i,p}(q_p, t), v_{i,p}(q_p, t)))$ in (x, y), which describe where a ray from the object and going through the fixed pupil plane p intersects each optical surface, wherein said ray mapping functions are series in the pupil and object variables $(q_p, t)$;

translating, using the computer system, the first set of system specifications to differential equations by applying Fermat's principle to each pair of two consecutive optical path length sections expressed in terms of the object, surfaces functions $f_i$, ray mapping functions $u_{i,p}$ and $v_{i,p}$, and the real image, to derive $2N_s$ differential equations $D_{i'}$ ($i'=1 \ldots 2N_s$)($N_s$ in $u_{i,p}$, and $N_s$ in $v_{i,p}$ direction);

defining the pupil characteristics, wherein
   in a case that the stop coincides with one of the surfaces $f_{i_o}$, replacing $u_{i_o,p}$ and $v_{i_o,p}$ in $f_{i_o}$ by $(x_p, y_p)$ as stop location, and
   in a case that an aperture stop is placed either at the entrance, between two optical surfaces, or at the exit, expressing that the cross product of the vector that describes an arbitrary ray path towards the aperture stop and the vector that describes an arbitrary ray path from the aperture stop is zero, such that three additional equations to the previously derived differential equations, resulting in $D_{i'}$ equations ($i'=1 \ldots 2N_s+3$) are added;

translating, using the computer system, said $2N_s$ equation or said $(2N_s+3)$ equation to algebraic equations by using a power series solution process by evaluating $$\lim_{q_p \to 0} \lim_{t \to 0} \frac{\partial^k}{\partial q_p^k} \frac{\partial^l}{\partial t^l} D_{i'} = 0,$$

with k,l=0, 1, 2, 3 . . . , and combined orders k+l=1, 3, 5 . . . $o_m$ resulting in $$\frac{o_m+1}{2} * \left(\frac{o_m+1}{2}+1\right) * 2N_s$$

or $*2(N_s+3)$ algebraic equations for all defined series coefficients;

choosing at least one ray aberration coefficient to be zero, for each ray aberration coefficient set to zero, selecting one surface coefficient to be part of a subgroup $M_c$, wherein each of said pairs of ray aberration and surface coefficient appears simultaneously in at least one of the algebraic equations;

inputting to the computer system values for any surface coefficient that has not been used to cancel ray aberrations including all surface coefficients that are not part of subgroup $M_c$, solving, using the computer system, the algebraic system of equations and obtaining as an output
   at least one surface coefficient for the optical surfaces,
   all ray mapping function coefficients, and
   non-cancelled ray aberration coefficients up to the predetermined combined aberration order;

wherein
  the method is for use with an optics design program,
  or
  the method is for generating an electronic file for a numerically controlled machine for manufacture of an imaging system having the optical surfaces.

2. The computer-based method of claim 1, wherein the ray aberration series expansion is according to wave aberrations, Buchdahl or ray aberration coefficients.

3. The computer-based method according to claim 1, wherein the inputting to the computer system of values for any surface coefficient that have not been used to cancel ray aberrations including all surfaces coefficients that are not part of subgroup $M_c$, is done manually or by a computer.

4. The computer-based method according to claim 1, further comprising the step of inputting to the computer system at least a second set of system specifications for the imaging system, wherein each of said second set of system specifications corresponds to a different configuration of a zoom system, and each of said second set (c=1, 2 . . . ) of system specifications comprises:
  lateral positions $f_{i,0}{}^c$ of all surfaces describing zoom movements,
  ray mapping functions $u_{i,p}{}^c(q_p, t)$, $v_{i,p}{}^c(q_p, t)$ for each zoom configuration,
  aberration functions $\epsilon_{x,p}{}^c(q_p, t)$, $\epsilon_{y,p}{}^c(q_p, t)$ for each zoom configuration, and
  a prescribed image as a function of the object for each zoom configuration; and
wherein the method further comprises:
translating, using the computer system, the second set of system specifications for the imaging system to differential equations by applying Fermat's principle to each pair of two consecutive optical path length to derive $2N_s$ differential equations for each zoom system configuration;
defining the pupil characteristics wherein
  in a case the stop coincides with one of the surfaces $f_{i_o}$, replacing $u_{i_o,p}$ and $v_{i_o,p}$ in $f_{i_o}$ by $(x_p, y_p)$ as stop location, and
  in a case an aperture stop is placed, expressing that the cross product of the vector that describes an arbitrary ray path towards the stop and the vector that describes an arbitrary ray path from the stop is zero such that three additional equations to the previously derived differential equations for each zoom system configuration are added;
translating, using the computer system, said $2cN_s$ equation or said $c(2N_s+3)$ equation to algebraic equations by using a power series solution process by evaluating $$\lim_{q_p \to 0} \lim_{t \to 0} \frac{\partial^k}{\partial q_p^k} \frac{\partial^l}{\partial t^l} D_{i'}^c = 0,$$

with k,l=0, 1, 2, 3 . . . , and combined orders k+l=1, 3, 5 . . . $o_m$ resulting in $$\frac{o_m+1}{2} * \left(\frac{o_m+1}{2}+1\right) * 2cN_s$$

or $* 2c(N_s+3)$ algebraic equations for all defined series coefficients and all zoom system configurations;
choosing at least one ray aberration coefficient for each zoom system specification to be zero, for each ray aberration coefficient set to zero, selecting one surface coefficient to be part of a subgroup $M_c$, wherein each said pairs of ray aberrations and surface coefficients appear simultaneously in at least one of the algebraic equations;
inputting to the computer system values for any surface coefficient that has not been used to cancel ray aberrations; and
solving, using the computer system, the algebraic system of equations to obtain as an output
  all surface coefficients that are part of the subgroup $M_c$ for the optical surfaces,
  all ray mapping function coefficients, and
  non-cancelled ray aberration coefficients up to the predetermined combined aberration order and for all zoom system configurations.

5. The computer-based method of claim 4, wherein the prescribed image as function of the object for each zoom configuration describes changes in focal length.

6. A computer-based method for designing an imaging system, wherein a rotational symmetry of the imaging system is broken and wherein the imaging system has either no symmetry, one plane of symmetry, or two planes of symmetry, the method comprising:
  inputting to a computer system specifications including
    a sequence of $N_s \geq 2$ optical surfaces,
    each optical surface as either refractive or reflective and of spherical, aspherical or freeform shape, and wherein each freeform surface is expressed as a function of two variables having not yet known power series coefficients $f_{i,j,k}$ for j,k=1, 2 . . . and i=1, 2, . . . $N_s$, with a total number of $N_c$ surfaces coefficients of the system,
    a design wavelength $\lambda_0$, and corresponding refractive indices before and after each optical surface,
    the object to be at finite or infinite distance and with a flat or curved shape in case of a finite distance,
    the prescribed image as a function of two object variables $t_x$ and $t_y$, which describes the object to image relationship,
    the real image as the sum of the prescribed image plus a ray aberration series expansion according to the considered system symmetry,
    an expression of ray mapping functions $u_i(x_p, y_p, t_x, t_y)$ and $v_i(x_p, y_p, t_x, t_y)$ as a series of the pupil $(x_p, y_p)$ and object variables $(t_x, t_y)$,
    an expression of all surfaces positions, and any tilts of the object, the optical surfaces, an eventual aperture stop and the image through rotation matrices, wherein said rotation matrices are defined by inputting rotation axes and angles matching the system symmetry, which then defines the chief ray path for the on-axis field and all vertices of the ray mapping functions;
  translating, using the computer system, the imaging system specifications to differential equations by applying Fermat's principle to each pair of two consecutive optical path length sections expressed in terms of the object, surfaces functions $f_i$, ray mapping functions $u_i$ and $v_i$, and the real image, to derive $2N_s$ differential equations $D_i$, (i'=1 . . . $2N_s$)($N_s$ in $u_i$, and $N_s$ in $v_i$ direction);
  defining the pupil characteristics, wherein
    in a case that the stop coincides with one of the surfaces $f_{i_o}$, replacing $u_{i_o}$ and $v_{i_o}$ in $f_{i_o}$ by $(x_p, y_p)$ as stop location, and
    in a case that an aperture stop is placed either at a position with a defined orientation, expressing that the cross product of the vector that describes an arbitrary ray path towards the aperture stop and the vector that describes an arbitrary ray path from the aperture stop is zero such that three additional equations to the previously derived $D_i$, differential equations ($i'=1 \ldots 2N_s+3$) are added;

translating, using the computer system, said $2N_s$ equation or said $2N_s+3$ equation in case of an aperture stop, to algebraic equations by using a power series solution process by evaluating $$\lim_{x_p \to 0} \lim_{y_p \to 0} \lim_{t_x \to 0} \lim_{t_y \to 0} \frac{\partial^j}{\partial x_p^j} \frac{\partial^k}{\partial y_p^k} \frac{\partial^l}{\partial t_x^l} \frac{\partial^m}{\partial t_x^m} D_{i'} = 0,$$

for all possible combinations of indices j, k, l, m,=0, 1, 2, 3 . . . and combined orders j+k+l+m=1, 2, 3 . . . $o_m$, resulting in a set of algebraic equations for all defined series coefficients;

choosing at least one ray aberration coefficient to be zero, wherein for each ray aberration coefficient set to zero, one surface coefficient is selected to be part of a subgroup $M_c$, wherein each of said pairs of ray aberration and surface coefficient appear simultaneously in at least one of the algebraic equations;

inputting to the computer system values for any surface coefficient that has not been used to cancel ray aberrations, including all surfaces coefficients that are not part of subgroup $M_c$; and solving, using the computer system, the algebraic system of equations to obtain as an output
- at least one surface coefficient of the coefficients that are part of subgroup $M_c$ for the optical surfaces,
- all ray mapping function coefficients, and
- non-cancelled ray aberration coefficients up to the predetermined combined aberration order;

wherein
- the method is for use with an optics design program, or
- the method is for generating an electronic file for a numerically controlled machine for manufacture of an imaging system having the optical surfaces.

7. The computer-based method according to claim 1, further comprising simultaneously applying said method for at least a second design wavelength with defined ray mapping and ray aberration functions for each design wavelength, the method further comprising:

translating, using the computer system, the imaging system specifications to algebraic equations by applying Fermat's principle to each pair of two consecutive optical path length sections for each design wavelength;

choosing at least one ray aberration coefficient per design wavelength to be zero, providing surfaces coefficients subgroup $M_c$; and solving, using the computer system, the algebraic system of equations to obtain as an output
- at least two surface coefficients of the coefficients that are part of subgroup $M_c$,
- all ray mapping function coefficients, and
- non-cancelled ray aberration coefficients up to the predetermined combined aberration order and for all design wavelengths.

8. The computer-based method according to claim 6, further comprising simultaneously applying said method for at least a second design wavelength with defined ray mapping and ray aberration functions for each design wavelength, the method further comprising:

translating using the computer system, the imaging system specifications to algebraic equations by applying Fermat's principle to each pair of two consecutive optical path length sections for each design wavelength;

choosing at least one ray aberration coefficient per design wavelength to be zero, providing surfaces coefficients subgroup $M_c$; and solving, using the computer system, the algebraic system of equations to obtain as an output
- at least two surface coefficients of the coefficients that are part of subgroup $M_c$,
- all ray mapping function coefficients, and
- non-cancelled ray aberration coefficients up to the predetermined combined aberration order and for all design wavelengths.

9. The computer-based method according to claim 1, wherein the method further comprises:

including chromatic ray aberration coefficients in the aberration series expansions in terms of the wavelength variable $\lambda$;

including the wavelength dependency in all ray mapping functions through an additional series term $(\lambda-\lambda_0)^\Lambda$;

expressing each optical path length section by means of a refractive index distribution $n_{i-1,i}(\lambda)$;

translating, using the computer system, the imaging system specifications to differential equations by applying Fermat's principle to each pair of two consecutive optical path length sections;

translating, using the computer system, said equations to algebraic equations, wherein the step of using the power series solution process comprises including an additional term $$\lim_{\lambda \to \lambda_0} \frac{\partial^\Lambda}{\partial \lambda^\Lambda}$$

with $\Lambda=0, 1, 2 \ldots$, wherein the index $\Lambda$ is added to the summation of the combined aberration order;

choosing one or more ray aberration coefficients to be nominally zero, including choosing at least one monochromatic, wherein $\Lambda=0$, and one chromatic, wherein $\Lambda \neq 0$, ray aberration coefficient to be zero, providing surfaces coefficients subgroup $M_c$, wherein each of said pairs of ray aberration and surface coefficient appear simultaneously in at least one of the algebraic equations;

inputting to the computer system values for any surface coefficient that is not part of subgroup $M_c$; and solving, using the computer system, the algebraic system of equations to obtain as an output
- at least two surface coefficients of the coefficients that are part of subgroup $M_c$,
- all ray mapping function coefficients, and
- non-cancelled monochromatic and chromatic ray aberration coefficients up to the predetermined combined aberration order.

10. The computer-based method according to claim 6, wherein the method further comprises:

including chromatic ray aberration coefficients in the aberration series expansions in terms of the wavelength variable $\lambda$;

including the wavelength dependency in all ray mapping functions through an additional series term $(\lambda-\lambda_0)^\Lambda$;

expressing each optical path length section by means of a refractive index distribution $n_{i-1,i}(\lambda)$;

translating, using the computer system, the system specifications to differential equations by applying Fermat's principle to each pair of two consecutive optical path length sections;

translating, using the computer system, said equations to algebraic equations, wherein the step of using the power series solution process comprises including an additional term $$\lim_{\lambda \to \lambda_0} \frac{\partial^\Lambda}{\partial \lambda^\Lambda}$$

with $\Lambda=0, 1, 2\ldots$ wherein the index $\Lambda$ is added to the summation of the combined aberration order;

choosing one or more ray aberration coefficients to be nominally zero, including choosing at least one monochromatic, wherein $\Lambda=0$, and, wherein $\Lambda \neq 0$, ray aberration coefficient to be zero, providing surfaces coefficients subgroup $M_c$, wherein each of said pairs of ray aberration and surface coefficient appear simultaneously in at least one of the algebraic equations;

inputting to the computer system values for any surface coefficient that is not part of subgroup $M_c$;

solving, using the computer system, the algebraic system of equations to obtain as an output
- at least two surface coefficients of the coefficients that are part of subgroup $M_c$,
- all ray mapping function coefficients, and
- non-cancelled monochromatic and chromatic ray aberration coefficients up to the predetermined combined aberration order.

11. The computer-based method according to claim 1, wherein the step of choosing one or more ray aberration coefficients comprises setting said ray aberration coefficients to a non-zero value, wherein for each ray aberration coefficient set to a non-zero value, selecting one surface coefficient to be part of the subgroup $M_c$, wherein each of said pair of ray aberration and surface coefficient appear simultaneously in at least one of the algebraic equations.

12. The computer-based method according to claim 6, wherein the step of choosing ray aberration coefficients comprises setting said ray aberration coefficients to a non-zero value, wherein for each ray aberration coefficient set to a non-zero value, selecting one surface coefficient to be part of the subgroup $M_c$, wherein each said pair of ray aberration and surface coefficient appear simultaneously in at least one of the algebraic equations.

13. The computer-based method according to claim 1, wherein the step of inputting to the computer system specifications and/or surfaces coefficients that are not part of the subgroup $M_c$ is automated using an optimization method.

14. The computer-based method according to claim 6, wherein the step of inputting to the computer system specifications and/or surfaces coefficients that are not part of subgroup $M_c$ is automated using an optimization method.

15. The computer-based method according to claim 1, wherein the step of choosing one or more ray aberration coefficients comprises choosing no coefficient such that the subgroup $M_c$ is an empty set, and solving using the computer system the algebraic system of equations to obtain as an output all ray mapping function coefficients, and all ray aberration coefficients up to the predetermined combined aberration order.

16. The computer-based method according to claim 6, wherein the step of choosing ray aberration coefficients comprises choosing no coefficient such that the subgroup $M_c$ is an empty set, and solving using the computer system the algebraic system of equations to obtain as an output all ray mapping function coefficients, and all ray aberration coefficients up to the predetermined combined aberration order.

17. A computer-based method for designing a rotationally symmetric imaging system having optical surfaces, the method being for nominally cancelling at least one ray aberration, the method comprising:
  inputting to a computer system specifications of the imaging system including
    imaging system parameters,
    wavelength dependency,
    a number of surface coefficients of the optical surfaces,
    pupil characteristics, and
    object and image spaces;
  translating, using the computer system, the specifications to a set of differential equations by applying Fermat's principle;
  inputting to the computer system a subgroup of optical ray aberrations to be set nominally to vanish using a set of selection, consistency and distribution rules; and
  solving, using the computer system, the differential equations to obtain surface coefficients for the optical surfaces and ray mapping function coefficients, which define the ray trace and their intersection with the optical surfaces and each clear aperture therefrom;
wherein
  the method is for use with an optics design program, or
  the method is for generating an electronic file for a numerically controlled machine for manufacture of an imaging system having the optical surfaces.

18. A computer-based method for generating an electronic file for a numerically controlled machine for the manufacture of a rotationally symmetric imaging system having optical surfaces, the method comprising:
  inputting to a computer system specifications of the imaging system including
    imaging system parameters,
    wavelength dependency,
    a number of surface coefficients of the optical surfaces,
    pupil characteristics, and
    object and image spaces;
  translating, using the computer system, the specifications to a set of differential equations by applying Fermat's principle;
  inputting to the computer system a subgroup of optical ray aberrations to be set nominally to vanish using a set of selection, consistency and distribution rules; and
  solving, using the computer system, the differential equations to obtain surface coefficients for the optical surfaces and ray mapping function coefficients, which define the ray trace and their intersection with the optical surfaces and each clear aperture therefrom, and outputting the electronic file comprising the surface coefficients for the optical surfaces and ray mapping function coefficients, which define the ray trace and their intersection with the optical surfaces and each clear aperture therefrom;

wherein
the method is for use with an optics design program,
or
the method is for generating an electronic file for a numerically controlled machine for manufacture of an imaging system having the optical surfaces.

19. The computer-based method according to claim 1, wherein the method is for generating an electronic file for a numerically controlled machine for the manufacture of an imaging system having optical surfaces.

20. A non-transitory computer-readable medium having instructions stored thereon, which when executed on one or more processors of a computing system, cause the computing system to perform the method of claim 1.

21. A computer-based system adapted to implement the method of claim 1.

* * * * *